United States Patent [19]
Ishibashi et al.

[11] Patent Number: 5,107,474
[45] Date of Patent: Apr. 21, 1992

[54] MULTI-MAGAZINE DISC PLAYER

[75] Inventors: Masaya Ishibashi; Yoshitaka Nojima, both of Tokorozawa, Japan

[73] Assignee: Pioneer Electronic Corporation, Tokyo, Japan

[21] Appl. No.: 310,750

[22] Filed: Feb. 15, 1989

[30] Foreign Application Priority Data

| Jul. 15, 1988 | [JP] | Japan | 63-176660 |
| Jul. 16, 1988 | [JP] | Japan | 63-176656 |
| Jul. 20, 1988 | [JP] | Japan | 63-180990 |
| Jul. 20, 1988 | [JP] | Japan | 63-180991 |

[51] Int. Cl.⁵ .................................. G11B 17/22
[52] U.S. Cl. ................................ 369/36; 369/34
[58] Field of Search ............ 369/34, 35, 36, 178, 369/192, 201, 202, 513; 360/92

[56] References Cited

U.S. PATENT DOCUMENTS

| 4,504,936 | 3/1985 | Faber et al. | 369/34 |
| 4,538,253 | 8/1985 | Ishibashi et al. | 369/34 |
| 4,580,254 | 4/1986 | Hojyo et al. | 369/34 |
| 4,685,095 | 8/1987 | Rudy et al. | 369/36 |
| 4,766,581 | 8/1988 | Korn et al. | 369/34 |
| 4,788,673 | 11/1988 | Ikedo et al. | 369/36 |
| 4,928,245 | 5/1990 | May et al. | 369/513 |

Primary Examiner—William M. Shoop, Jr.
Assistant Examiner—John W. Cabeca
Attorney, Agent, or Firm—Fleit, Jacobson, Cohn, Price, Holman & Stern

[57] ABSTRACT

A multimagazine disc player includes an array of magazines removably stored therein each for holding a plurality of discs, and a playback device movable and positionable in alignment with one of the magazines at a time for playing back a selected one of the discs contained in the magazine. The discs stored in the magazines can selectively be played back automatically, and can also easily be replaced with other discs not stored in the disc player. The magazines are arrayed horizontally to make the disc player highly stable. The discs are stored in vertically erected positions so that the magazines can be removed and loaded with ease.

25 Claims, 47 Drawing Sheets

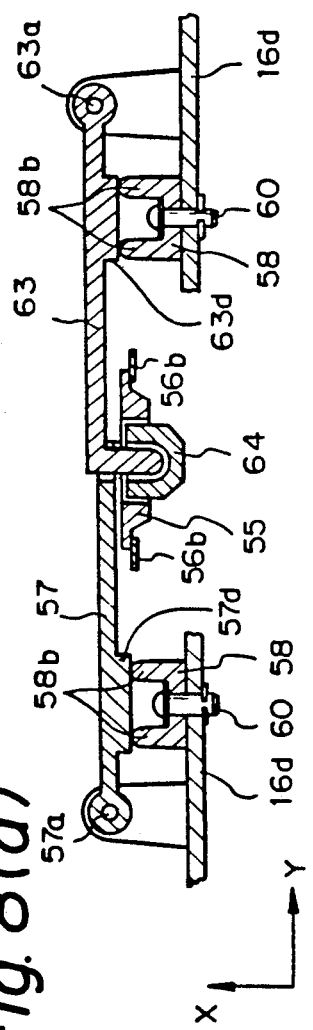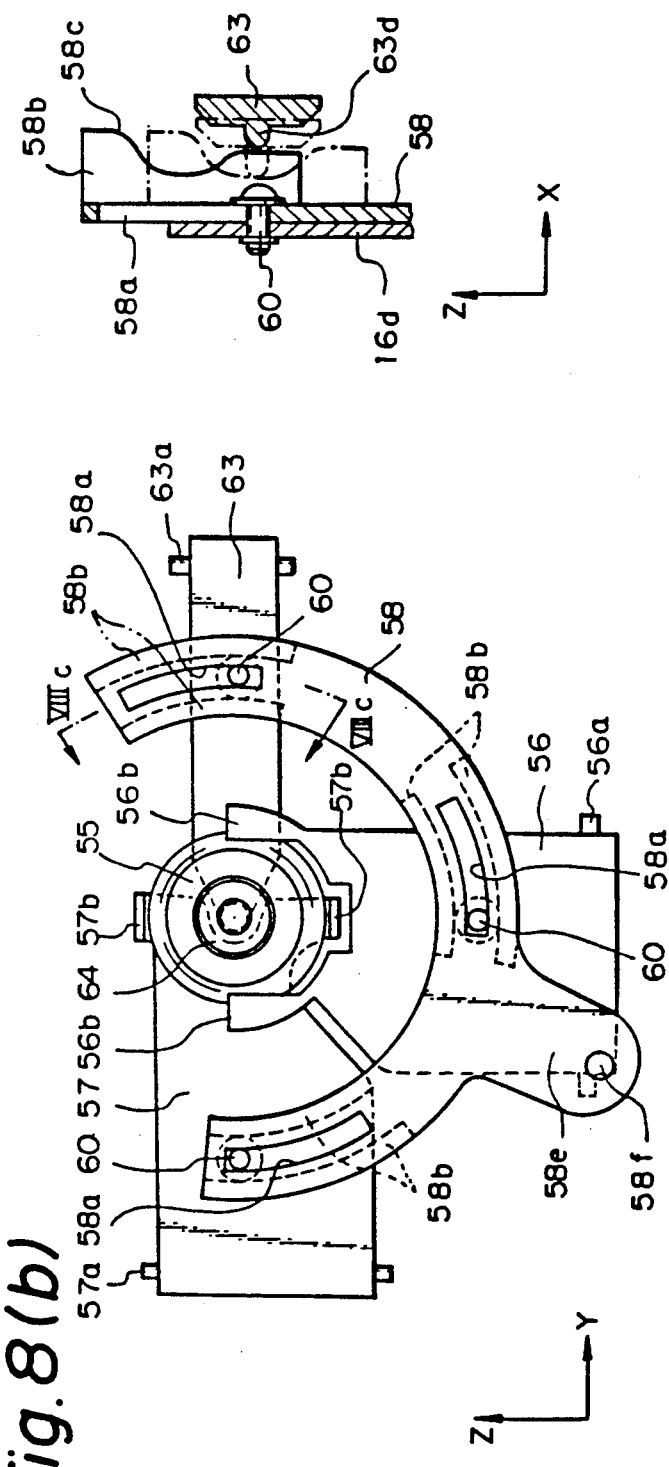

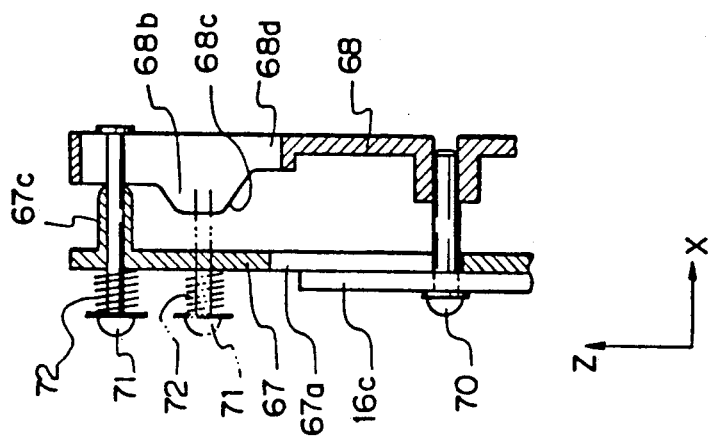
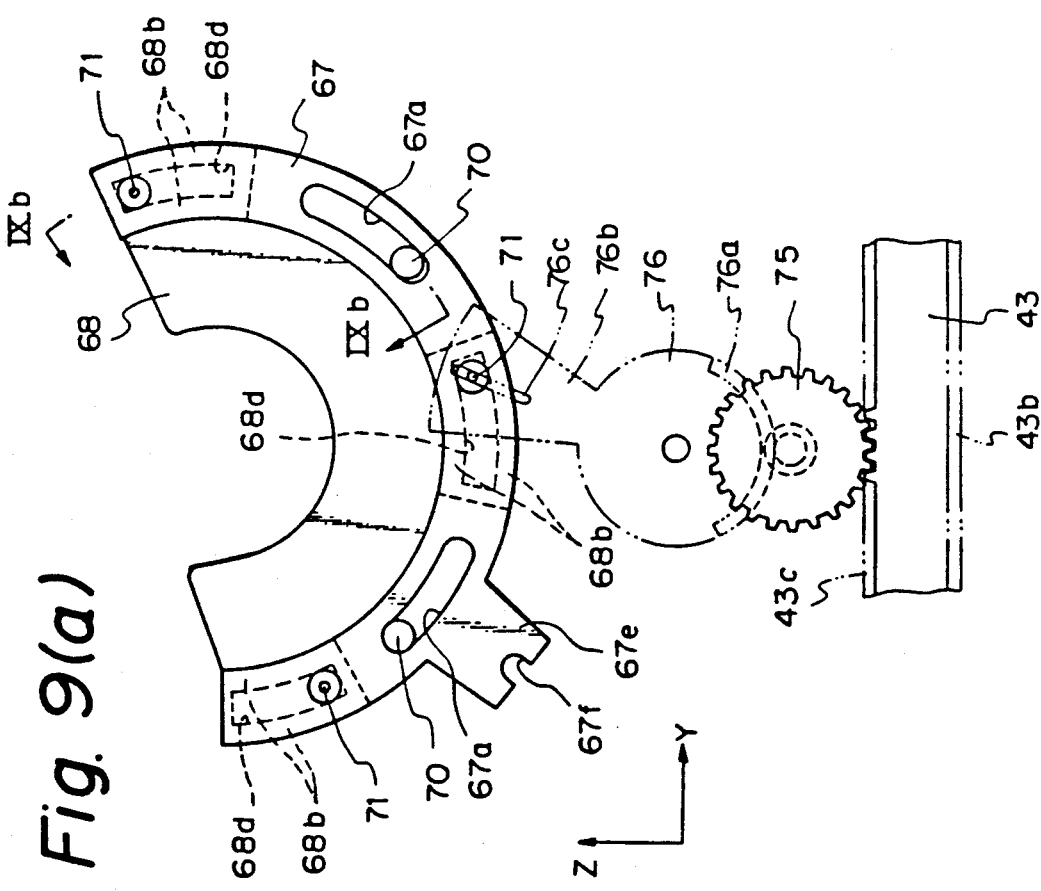

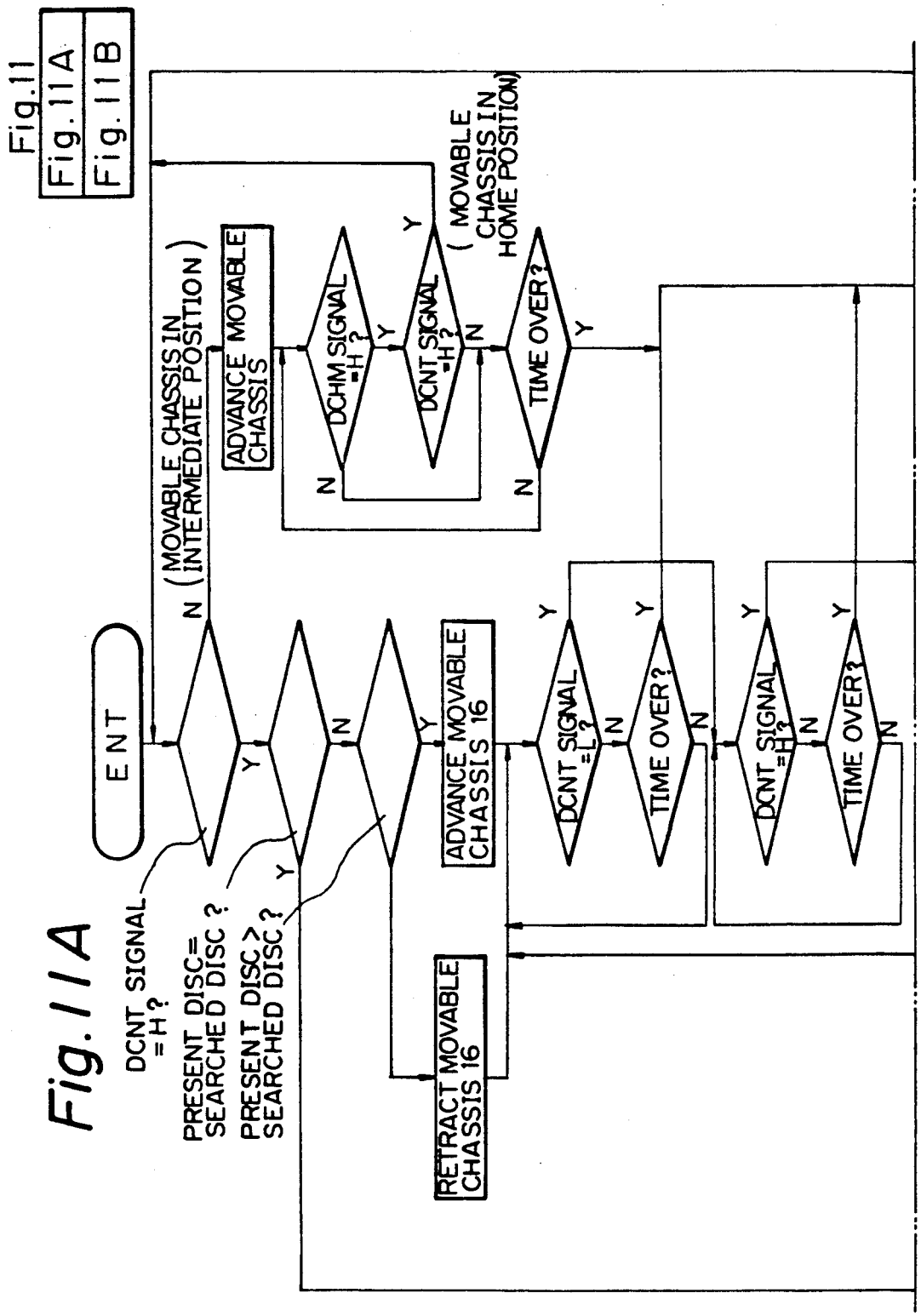

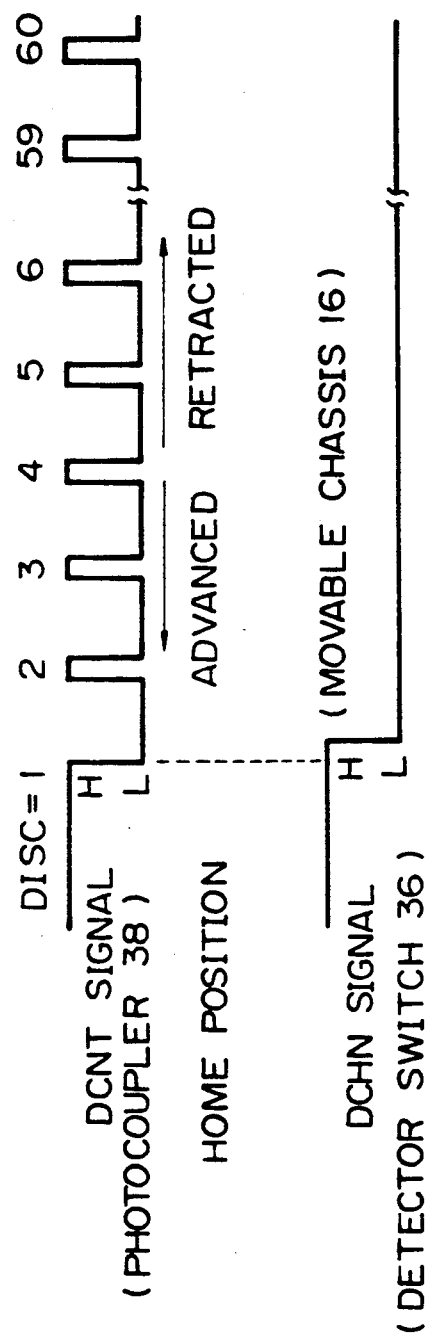

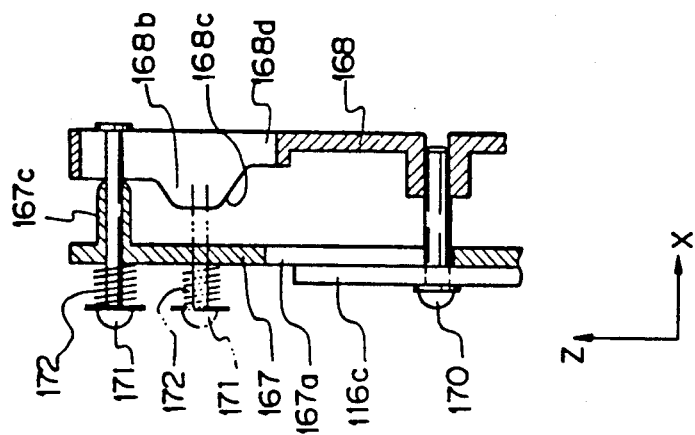
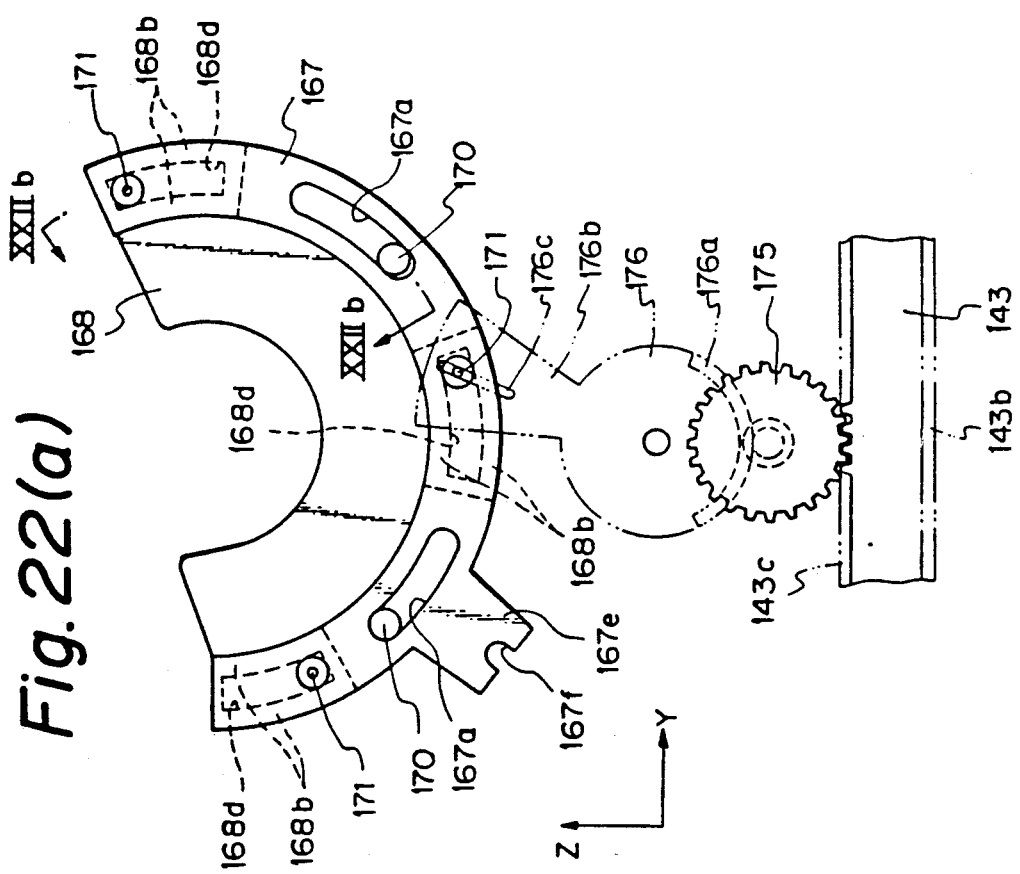

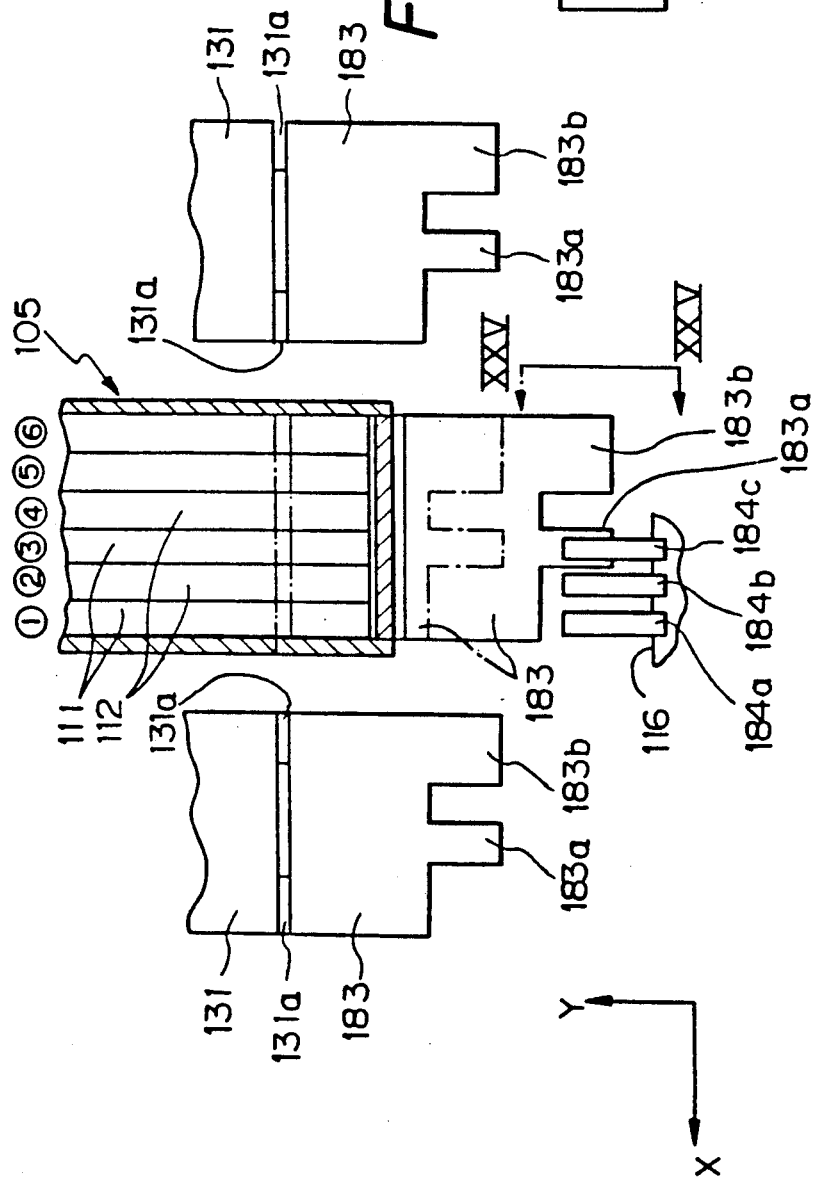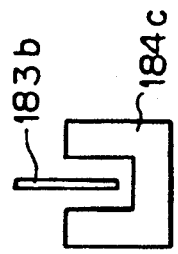

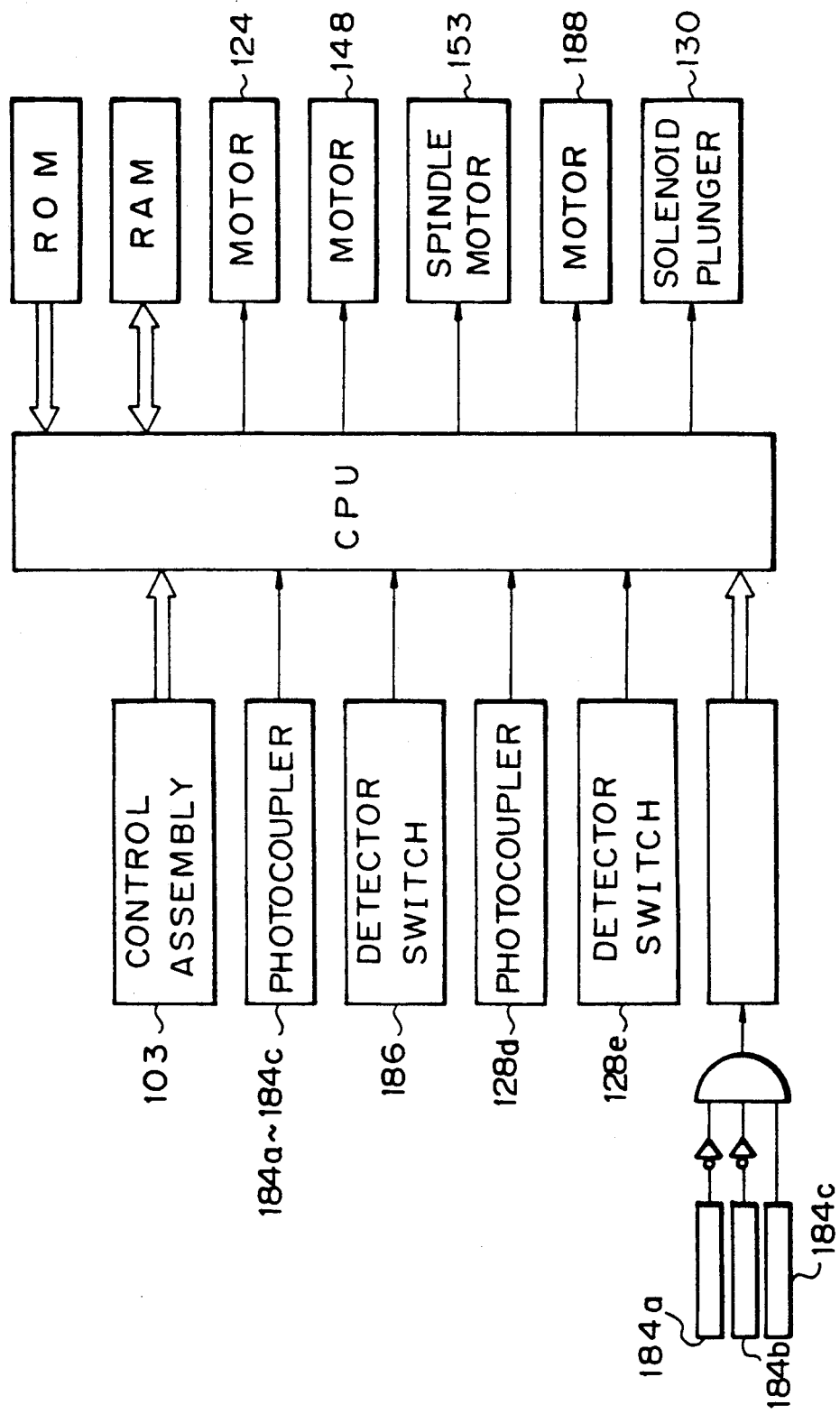

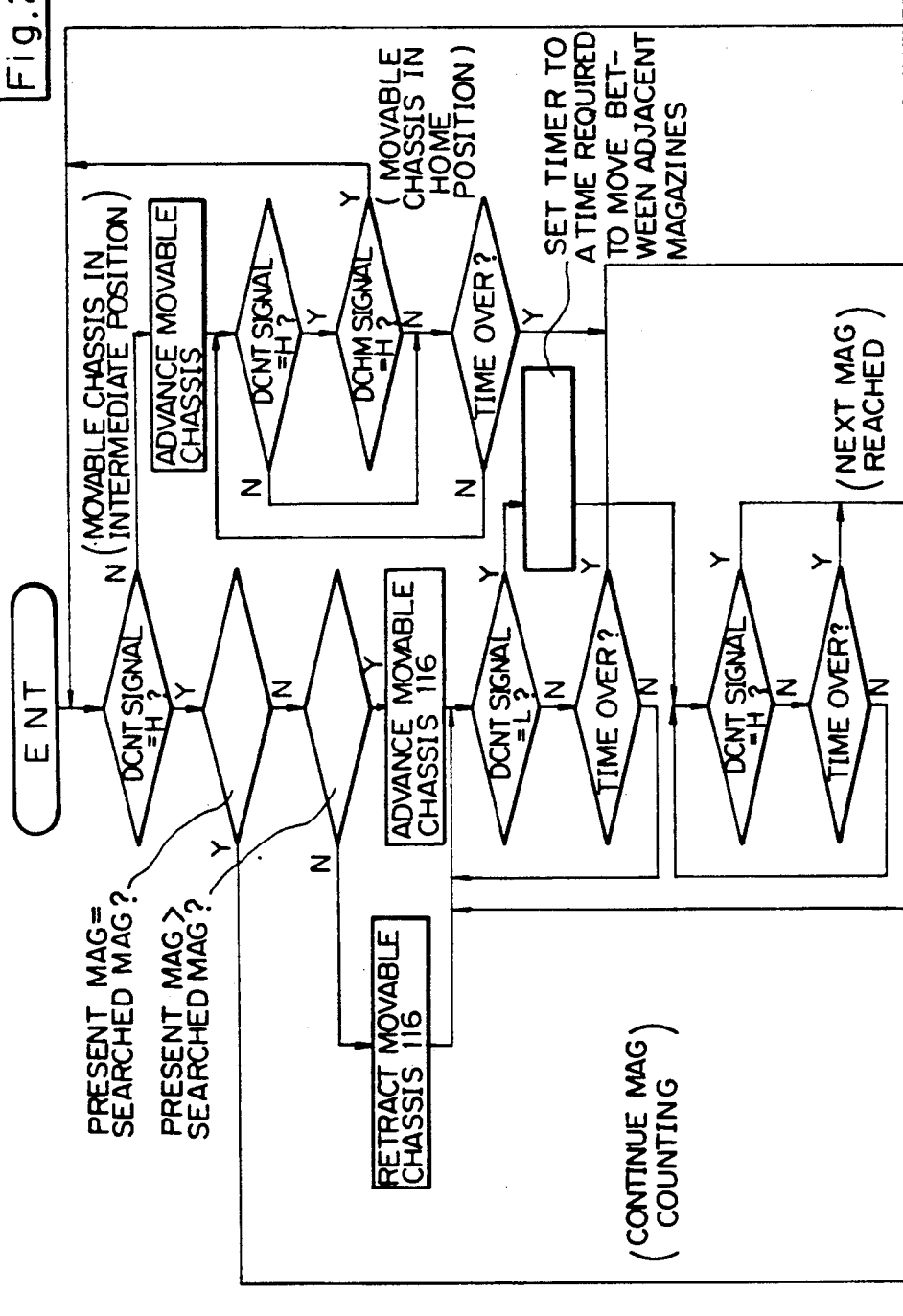

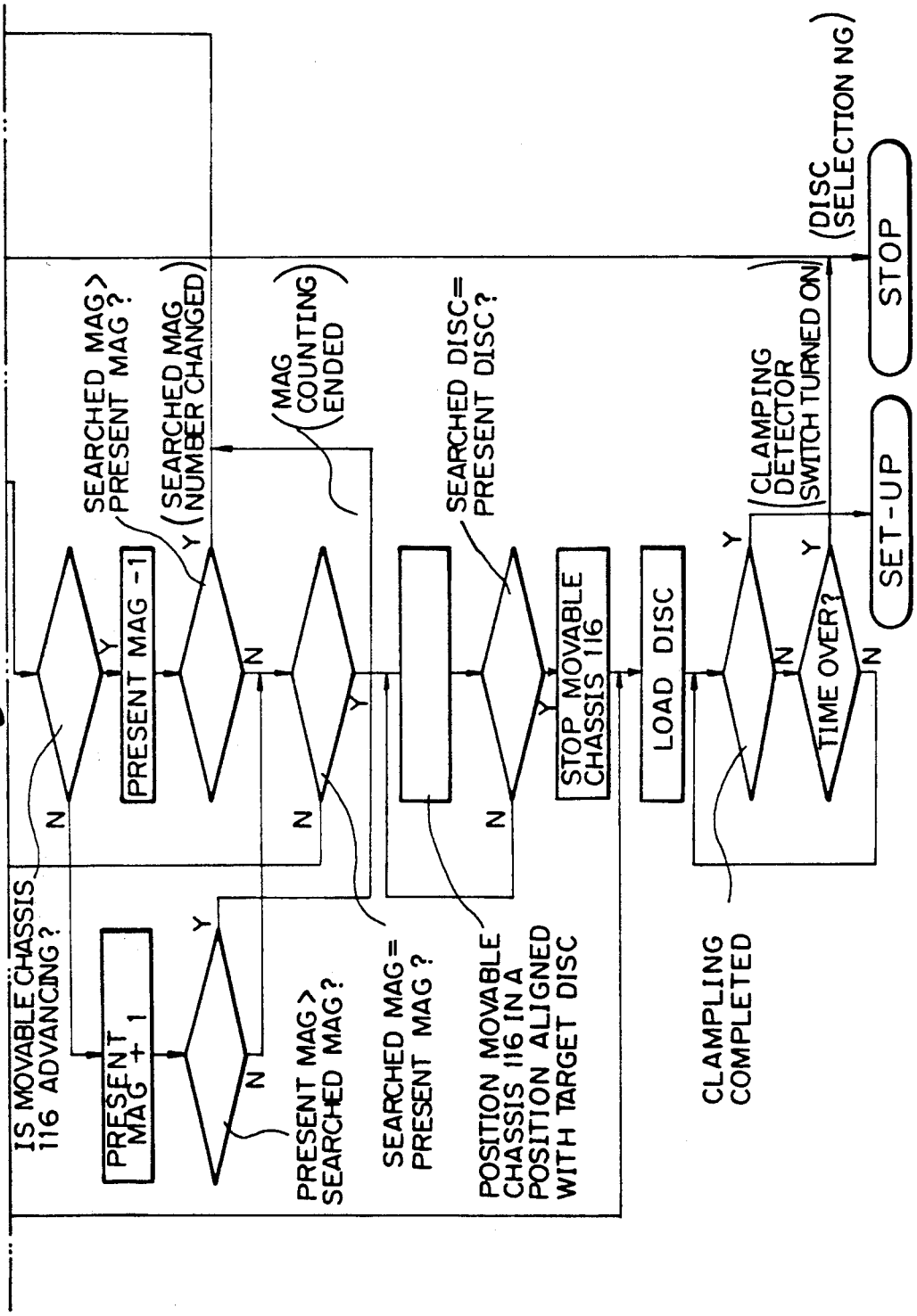

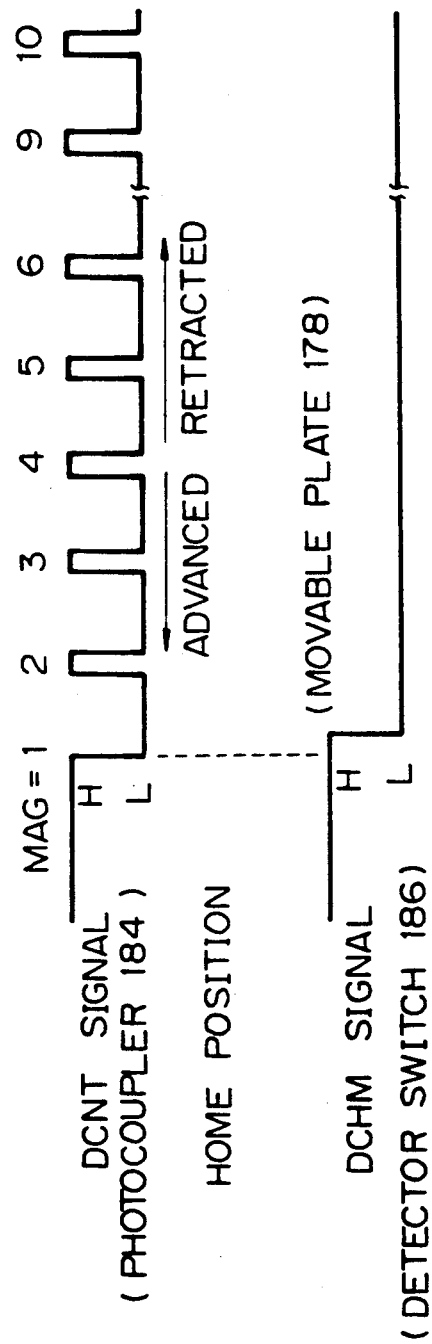

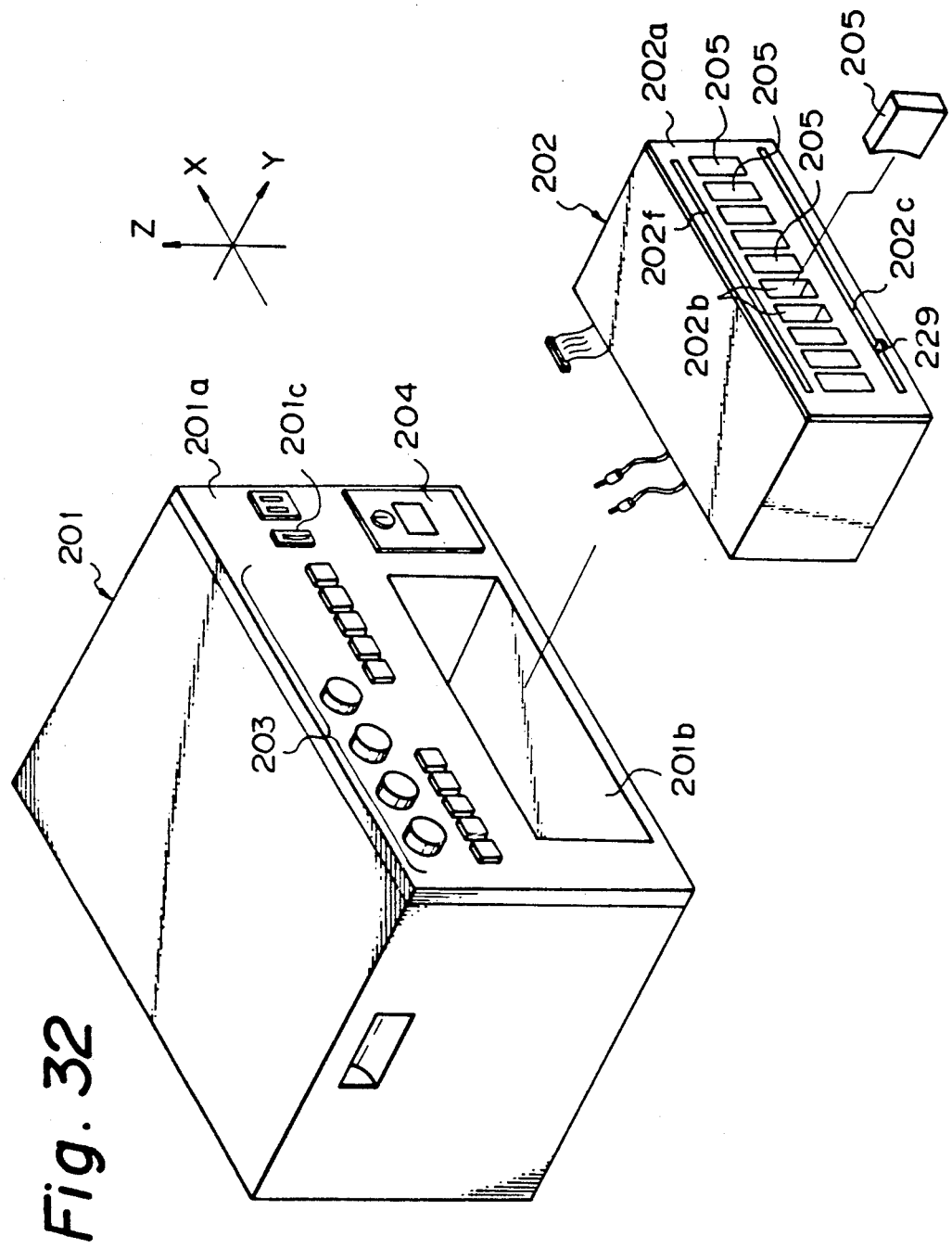

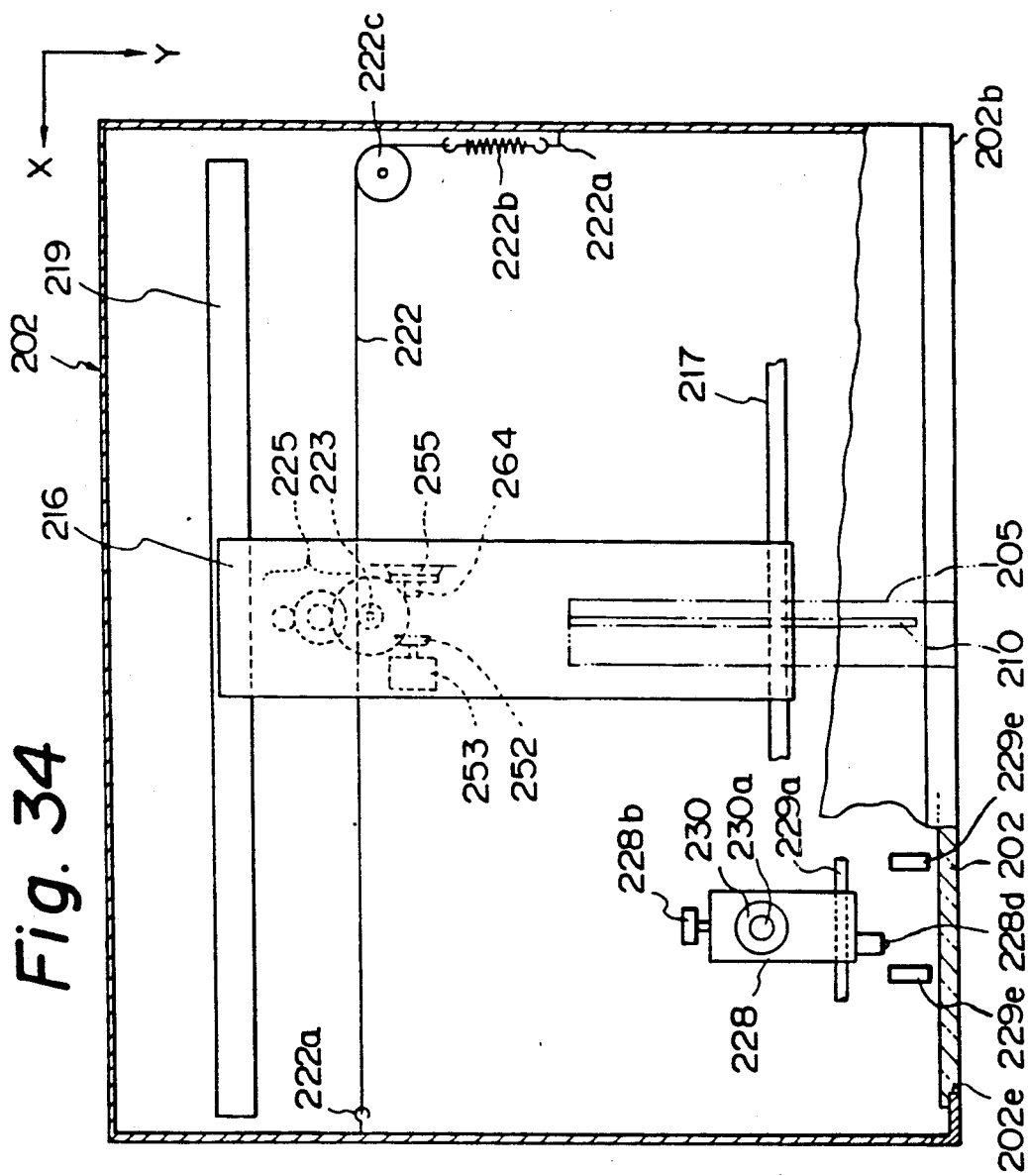

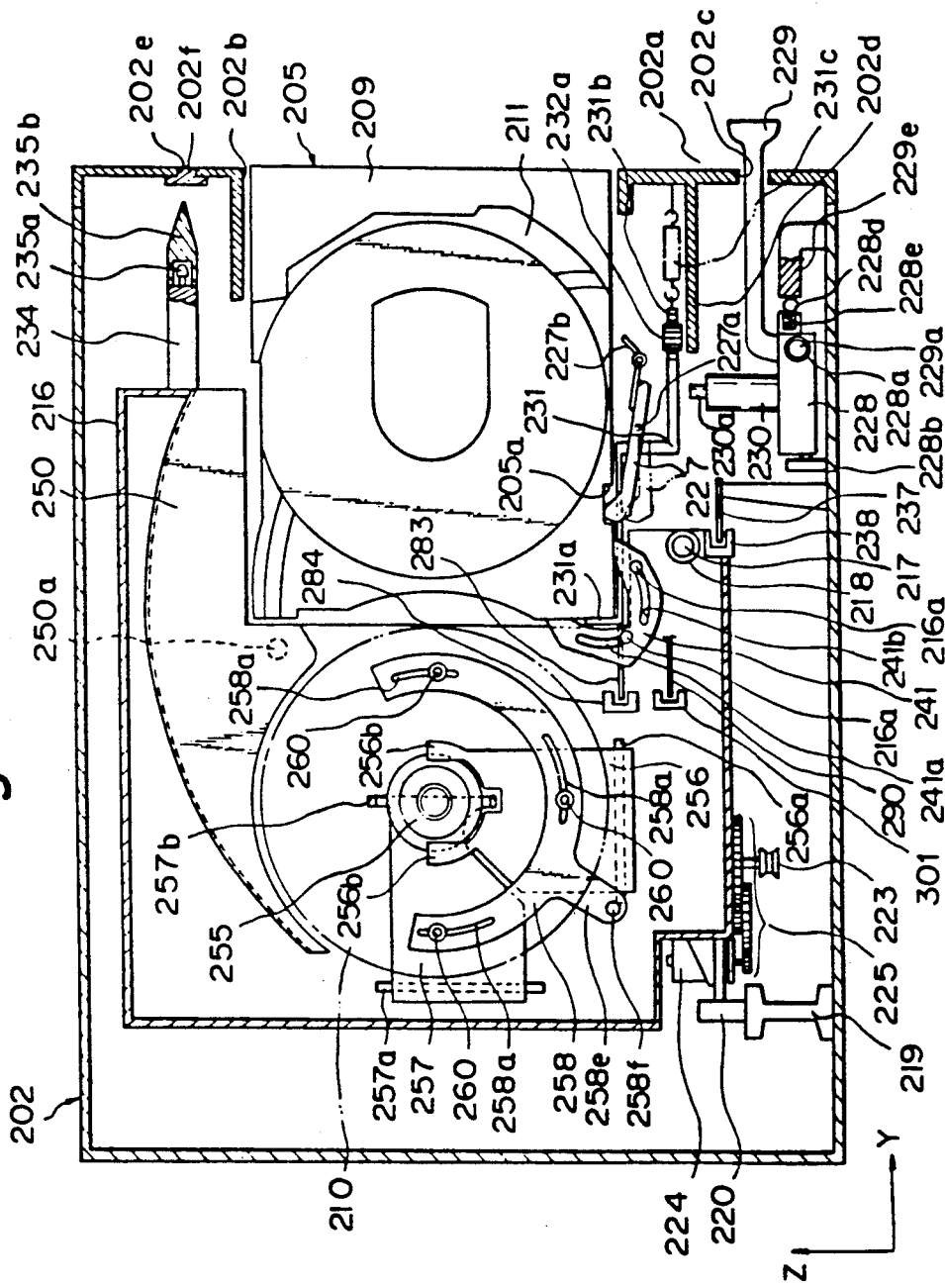

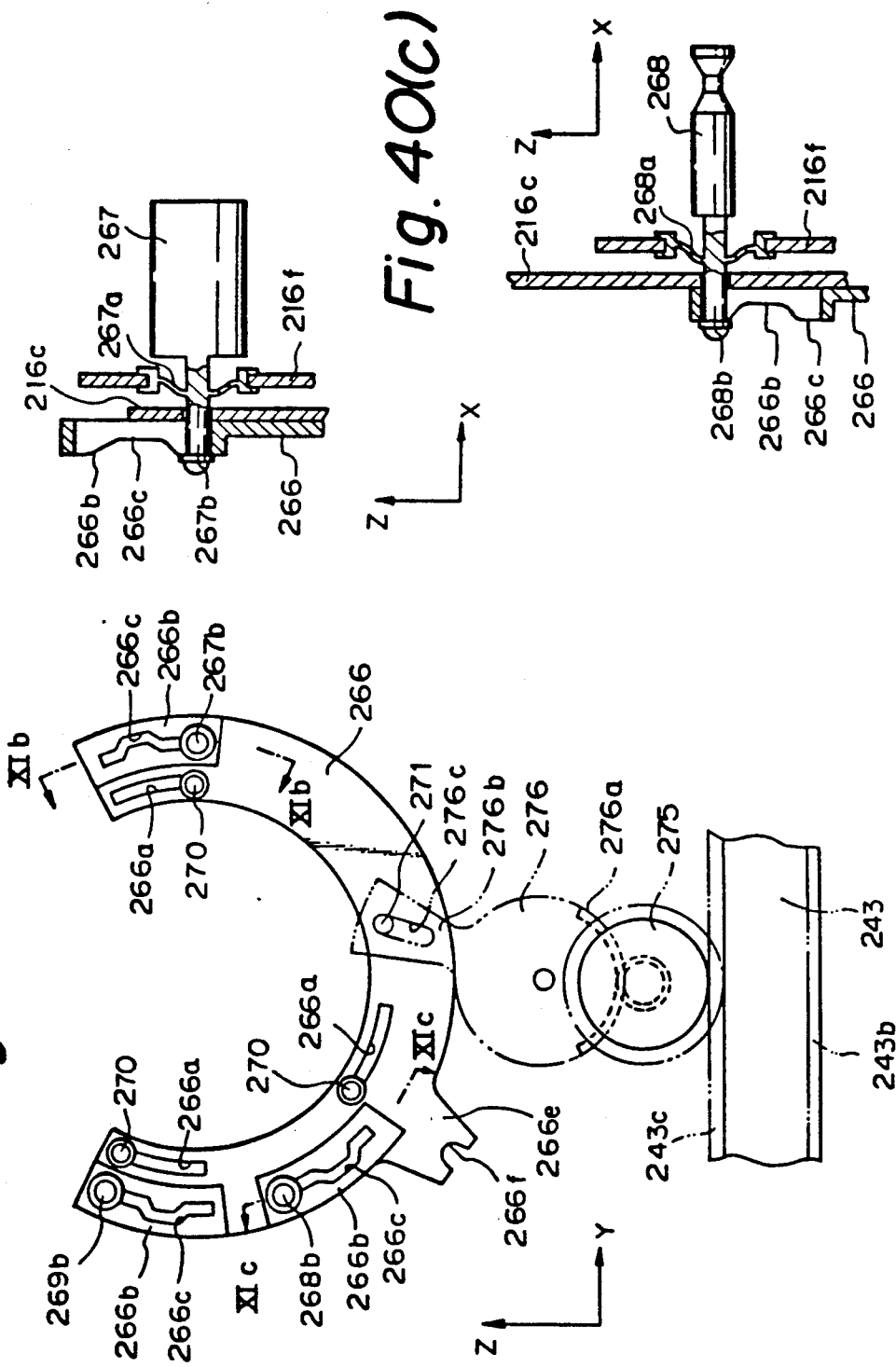

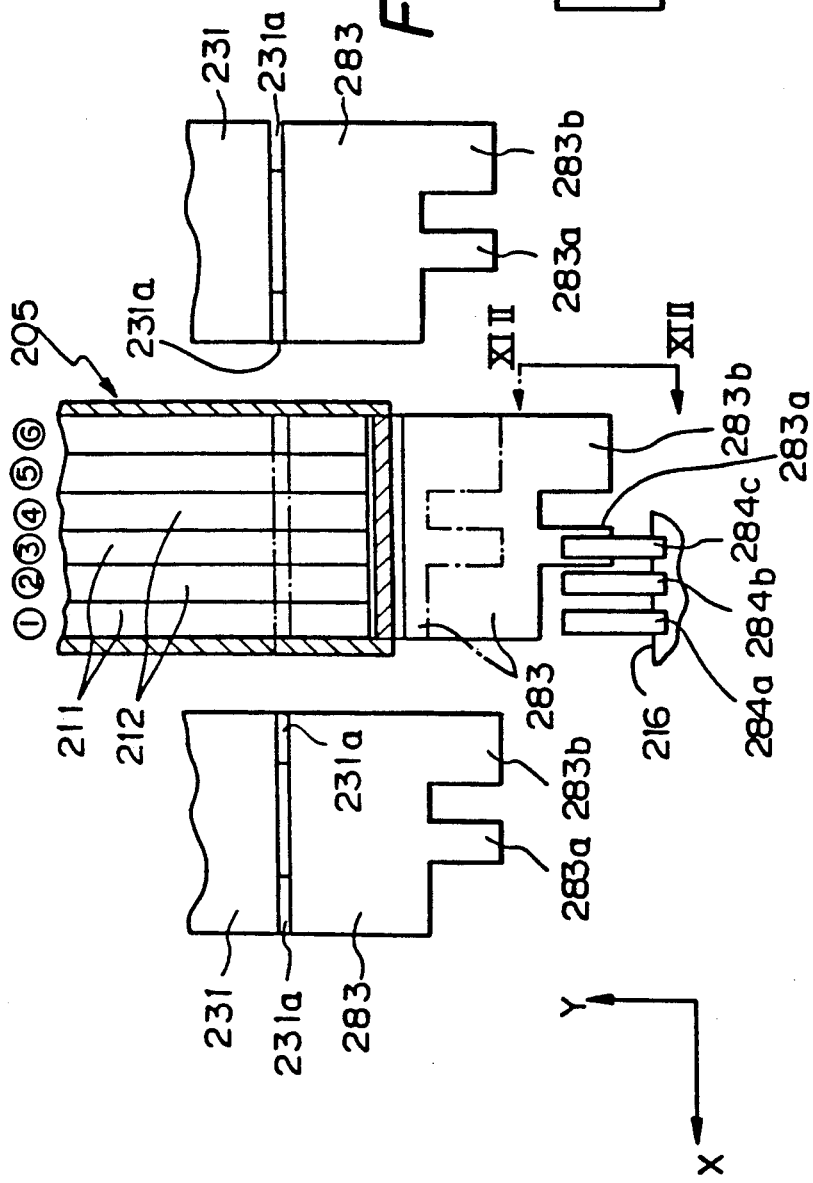
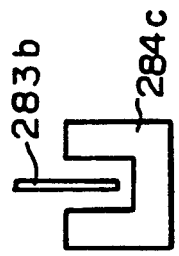

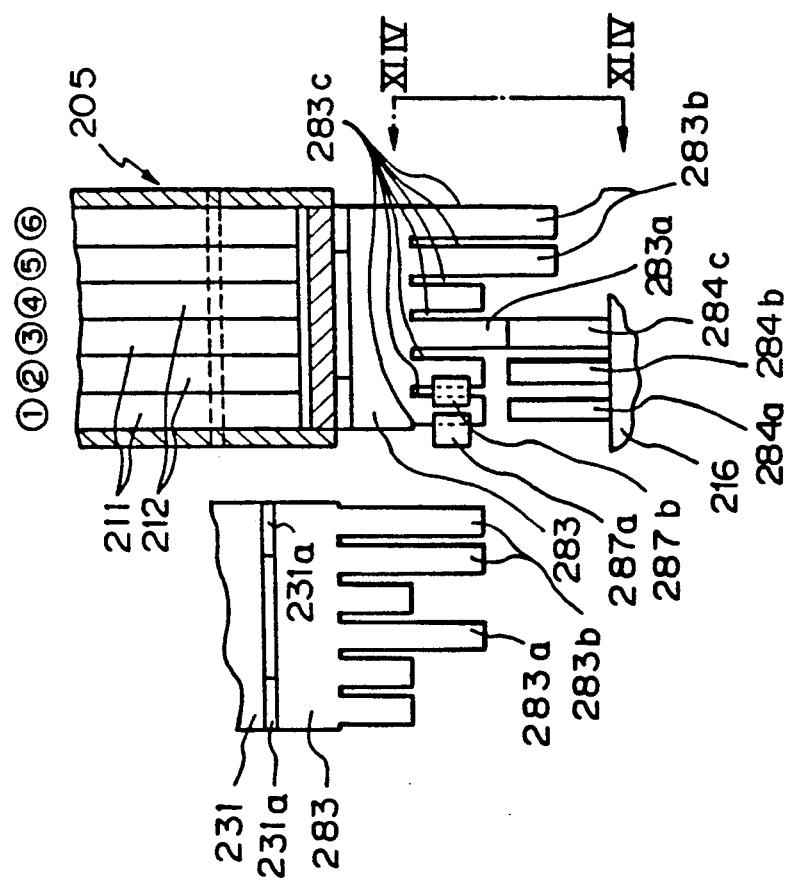
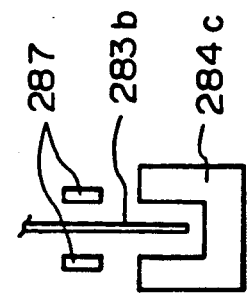
Fig. 43
Fig. 44

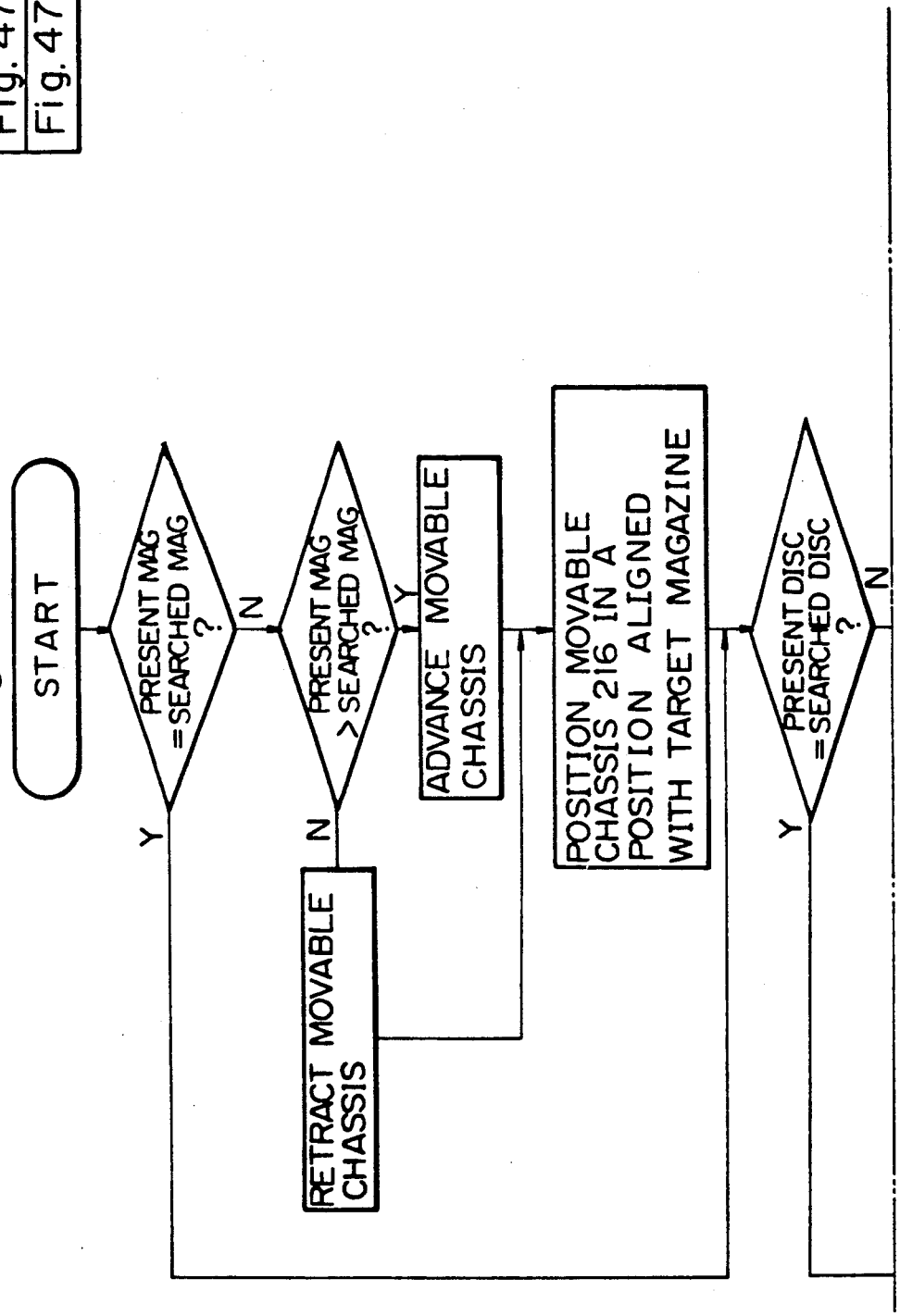

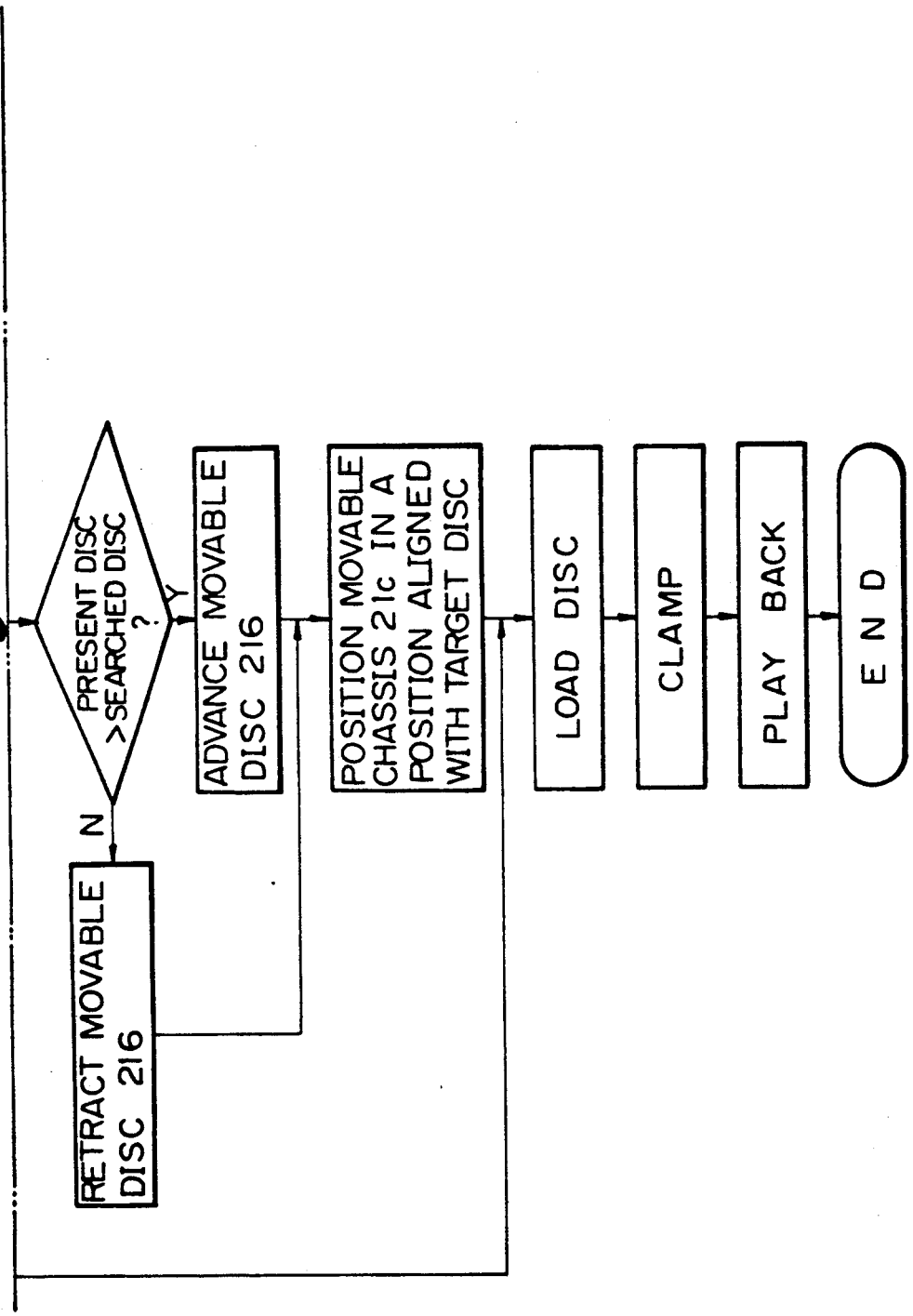

MULTI-MAGAZINE DISC PLAYER

BACKGROUND OF THE INVENTION

1. Field of the Invention

The present invention relates to a disc player for storing a plurality of magazines each containing a plurality of discs which can be taken out and played back one at a time.

2. Description of the Prior Art

Japanese Laid-Open Patent Publication No. 60-40563 discloses a disc player for storing and selectively playing back a plurality of discs.

In the disclosed disc player, the discs are arrayed in closely spaced relationship and cannot easily be replaced with other discs. A disc storage area has to be covered with a housing for protecting the stored discs, and the housing should be openable and closable as desired for disc replacement. If some of discs which have already been stored in the disc player are to be replaced, the user should first open the housing and then replace the discs with desired discs while confirming the labels on those discs.

Such multidisc players find wide use in so-called "karaoke" or "music minus one" applications wherein people can sing songs with background orchestral music played back by the disc player. In a place where such a disc player is located, people wishing to be "karaoke" singers tend to request a wide range of different favorite songs. Since the disc player has a limited disc storage space that cannot meet all such different requests, it is customary to first store frequently requested discs in the disc storage unit, and when the orchestral music for a song which is not found in the stored discs is requested, one of the stored discs is replaced with a disc containing the requested music. This manual procedure is however time-consuming and cannot change discs easily and quickly within a desirably short period of time.

SUMMARY OF THE INVENTION

It is a primary object of the present invention to provide a magazine disc player capable of automatically selecting a desired disc from among many stored discs and replacing the stored discs easily with other desired discs.

Another object of the present invention is to pro vide a magazine disc player in which stored discs can accurately be fed or transferred into a playback position.

According to a first feature of the present invention, there is provided a magazine disc player comprising a storage unit for storing an array of magazines each for holding a plurality of discs, playback means for playing back the discs one at a time, positioning means for guiding and positioning the playback means in a direction in which the magazines are arrayed, and disc moving means for moving one of the discs at a time between the corresponding magazine and the playback means, the magazines being arrayed in a horizontal direction, and the discs being arranged with recording surfaces thereof lying vertically.

According to a second feature of the present invention, each of the magazines comprises a case and a plurality of flat trays movable into and out of the case for carrying the discs in respective principal planes thereof.

According to a third feature of the present invention, the playback means comprises a turntable and a disc clamping mechanism, further including disc pressing means for cooperating with the disc clamping mechanism in gripping the disc which has been ejected from the magazine and mounting the disc on the turntable.

According to a fourth feature of the present invention, the disc pressing means comprises an abutment member for abutting against the disc, and supporting and driving means for supporting the abutment member and moving the abutment member in a direction substantially perpendicular to a disc carrying surface of the turntable.

According to a fifth feature of the present invention, the supporting and driving means comprises a movable member movable in a predetermined direction and engaging the abutment member through cam means, and drive force imparting means for imparting a drive force to the movable member.

According to a sixth feature of the present invention, the disc pressing means includes a disc guide pin for being fitted into a central hole defined in the disc, and guide pin driving means for supporting and moving the disc guide pin in a direction substantially perpendicular to the disc carrying surface of the turntable.

According to a seventh feature of the present invention, the disc clamping mechanism comprises a presser for pressing the disc, and a presser supporting mechanism supporting the presser for rotation and movement in a direction substantially perpendicular to the disc carrying surface of the turntable, the presser being movable by the supporting and driving means.

According to an eighth feature of the present invention, the magazine disc player further includes a disc guide member for guiding the disc by slidingly contacting the lower end of the disc which has been ejected from the magazine, and disc guide member driving means for supporting and moving the disc guide member.

According to a ninth feature of the present invention, the presser has a pin for being fitted into a central hole defined in the disc, the turntable having a centering member for being fitted in the pin.

According to a tenth feature of the present invention, there is provided a magazine disc player comprising a storage unit for storing an array of magazines each for holding a plurality of discs, playback means for playing back the discs one at a time, the playback means including a turntable, positioning means for guiding and positioning the playback means in a direction in which the magazines are arrayed, disc moving means for moving one of the discs at a time between the corresponding magazine and the playback means, the magazines being arrayed in a horizontal direction with the discs having recording surfaces lying vertically, and disc gripping and mounting means for gripping the disc ejected from the magazine, delivering the disc in an axial direction of the turntable, and mounting the disc on the turntable.

According to an eleventh feature of the present invention, the disc gripping and mounting means comprises a plurality of gripper members for gripping the disc, and gripper member driving means for supporting and moving the gripper members in directions substantially parallel and perpendicular to a disc carrying surface of the turntable.

The above and other objects, features and advantages of the present invention will become more apparent from the following description when taken in conjunction with the accompanying drawings in which pre-

BRIEF DESCRIPTION OF THE DRAWINGS

FIGS. 7, 8(a), 8(b), 8(c), 9(a), and 9(b) are views showing in detail internal structures in the subhousing shown in FIGS. 1 through 4;

FIGS. 11(a) and 11(b) show a flowchart of an operation sequence of the magazine disc player shown in FIGS. 1 through 9(b);

FIG. 12 is a diagram showing signals produced during operation of the magazine disc player shown in FIGS. 1 through 9(b);

FIGS. 20 through 27 are views illustrating in detail internal structures in the subhousing shown in FIGS. 14 through 17;

FIG. 28 is a block diagram of a control system of the magazine disc player shown in FIGS. 14 through 27;

FIGS. 29(a) and 29(b) show a flowchart of an operation sequence of the magazine disc player shown in FIGS. 14 through 27;

FIG. 30 is a diagram showing signals produced during operation of the magazine disc player shown in FIGS. 14 through 27;

FIG. 32 is a perspective view of a magazine disc player according to a third embodiment of the present invention, with a subhousing removed from a main housing;

FIGS. 33 and 34 are front and plan views, respectively, partly cut away, of the subhousing which contains magazines and a playback means in the magazine disc player shown in FIG. 32;

FIG. 35 is a cross-sectional view taken along line XXXV—XXXV of FIG. 33;

FIGS. 38 through 45 are views illustrating in detail internal structures in the subhousing shown in FIGS. 32 through 35;

FIG. 47 is a flowchart of an operation sequence of the magazine disc player shown in FIGS. 32 through 45.

DETAILED DESCRIPTION OF THE PREFERRED EMBODIMENTS

Figure 1:
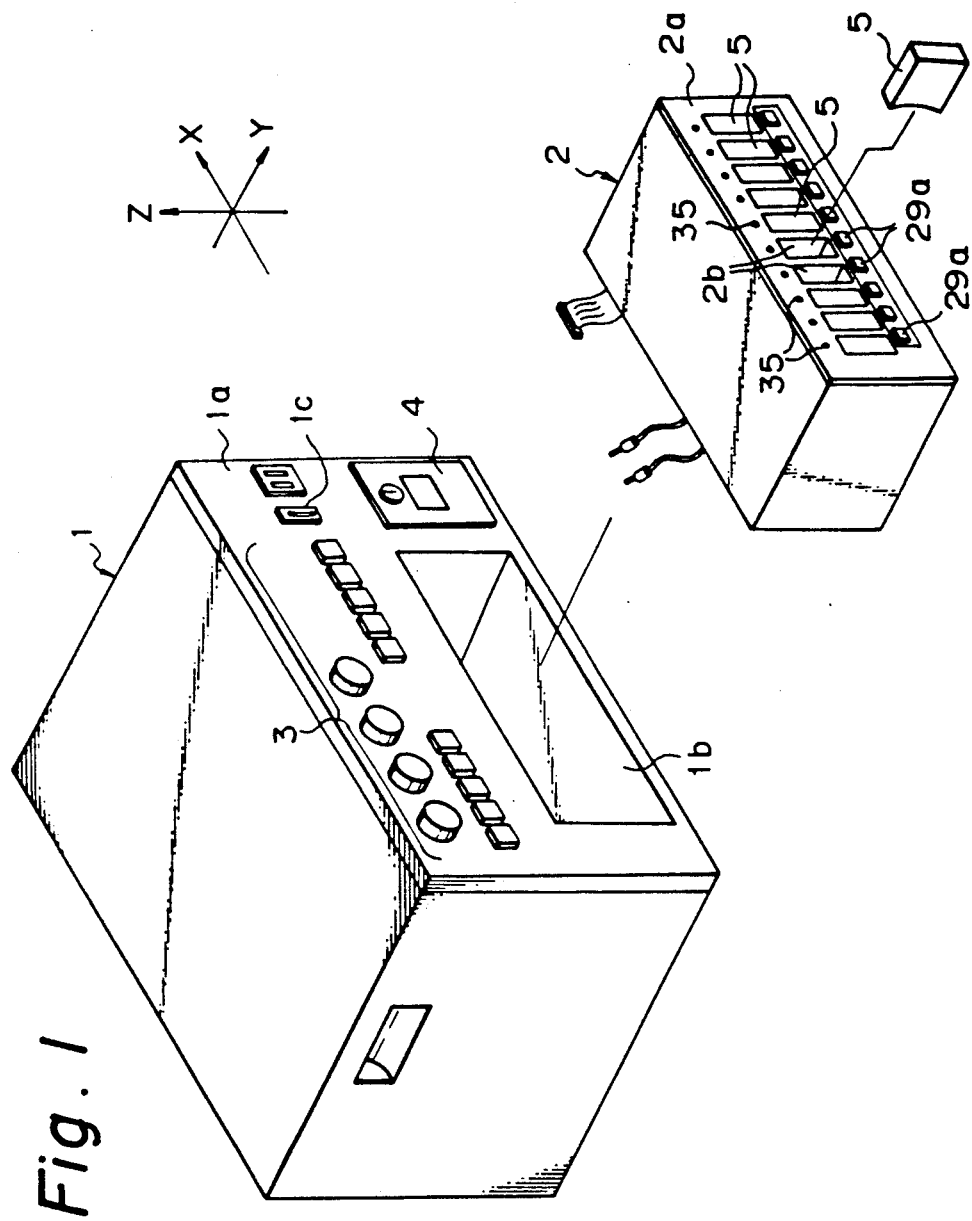
FIG. 1 is a perspective view of a magazine disc player according to a first embodiment of the present invention, with a subhousing removed from a main housing.

As shown in FIG. 1, a magazine disc player according to a first embodiment of the present invention includes a separable player housing assembly comprising a main housing 1 and a subhousing 2 separably inserted in the main housing 1. The main housing 1 has a front panel 1a having a horizontal opening 1b into which the subhousing 2 can be inserted, and supporting a control assembly 3 above the opening 1b for controlling operation of the disc player. Front, leftward, and upward directions with respect to the magazine disc player are indicated by the arrows Y, X, Z, respectively. The magazine disc player is suitable for use as a so-called "karaoke" disc player. The front panel 1a of the main housing 1 also has a coin slot 1c for inserting a coil therethrough to enable the magazine disc player to be operated, and a coin retrieval case 4 for retrieving inserted coins.

Figure 2:
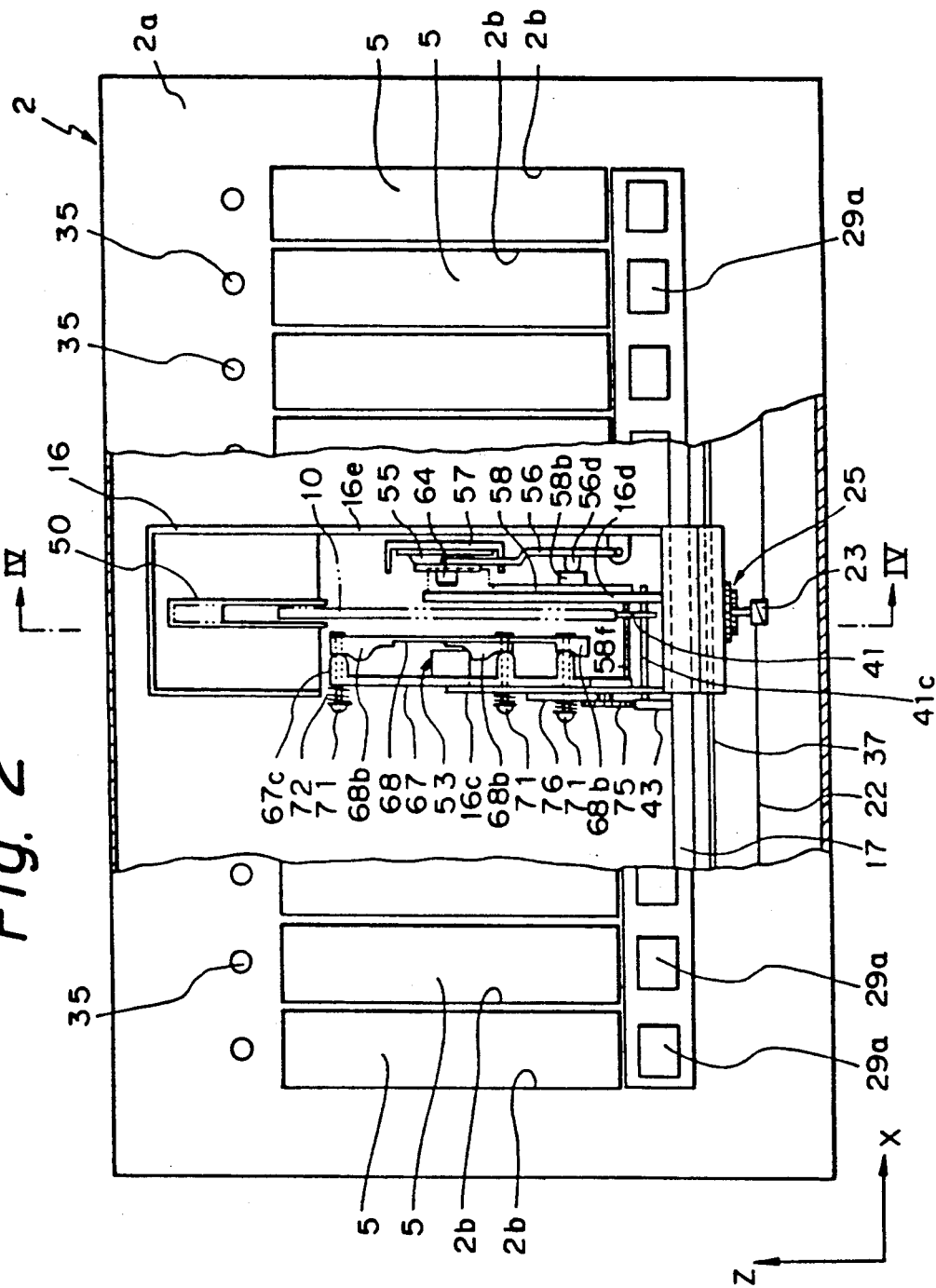
FIGS. 2 and 3 are front and plan views, respectively, partly cut away, of the subhousing which contains magazines and a playback means in the magazine disc player shown in FIG. 1.
Figure 3:
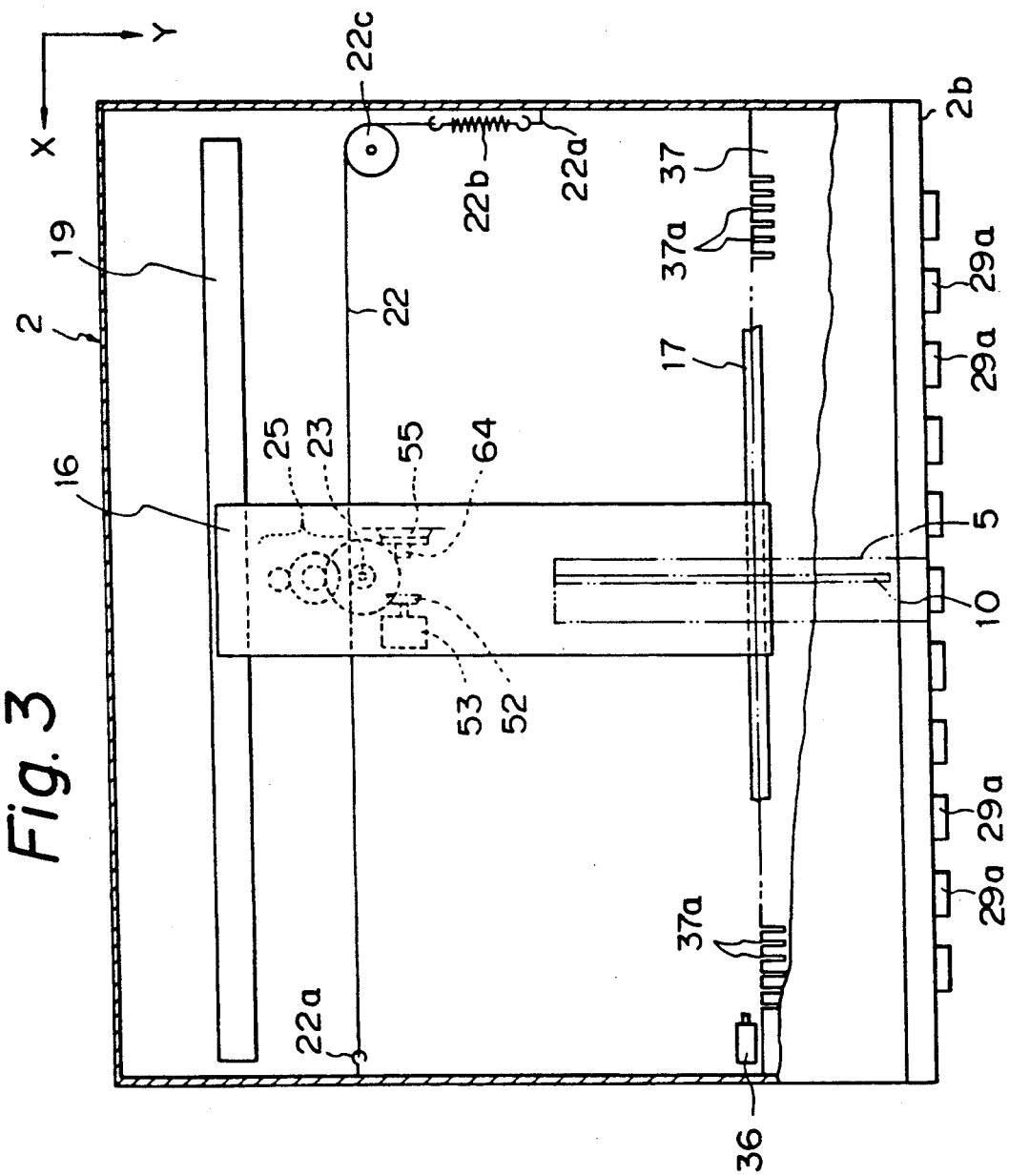
Figure 4:
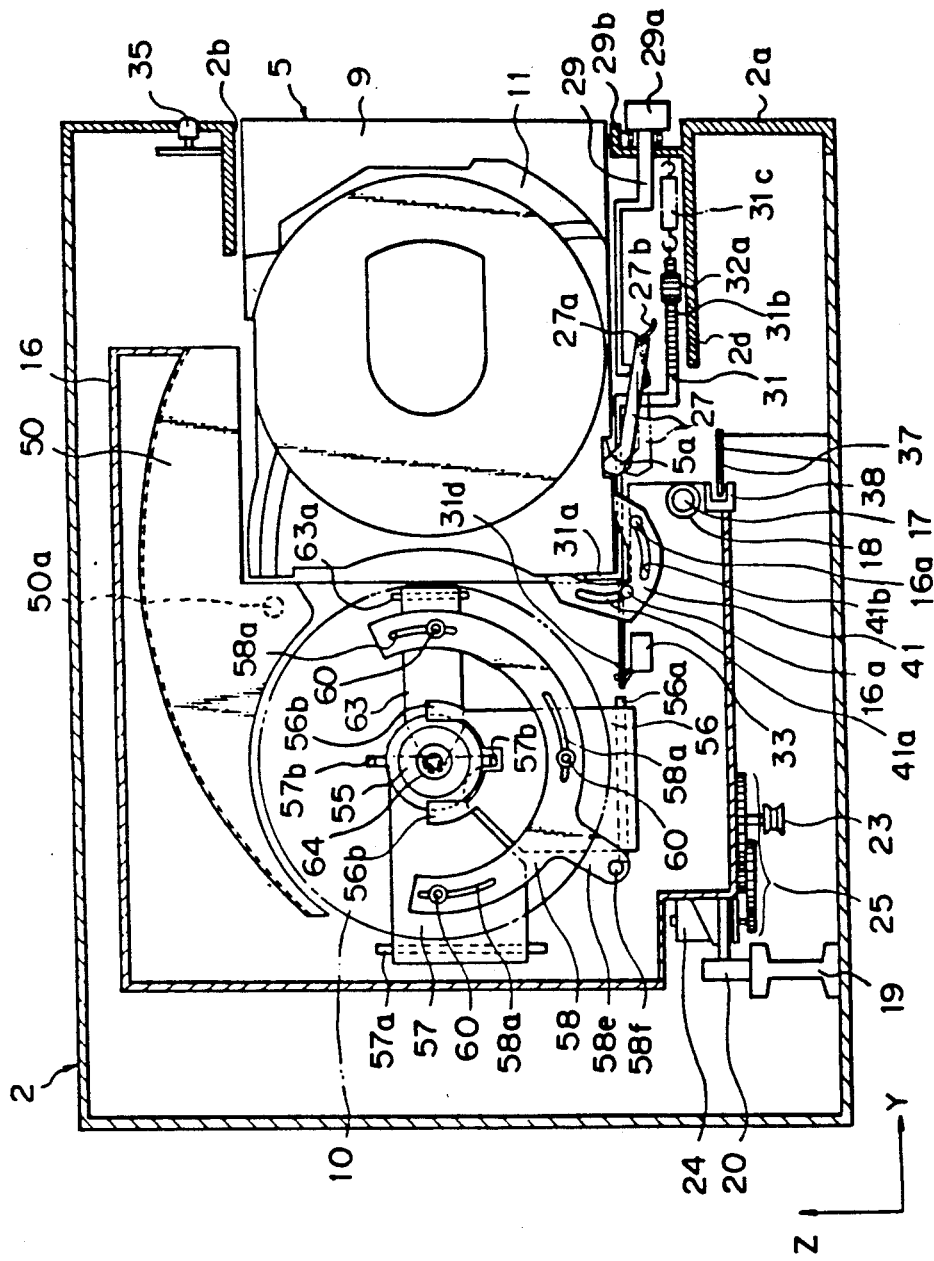
FIG. 4 is a cross-sectional view taken along line IV—IV of FIG. 2.

As illustrated in FIGS. 2 through 4, the subhousing 2 has a front panel 2a having a plurality (e.g., 10) of openings 2b for inserting disc magazines 5 therein. The horizontal array.

Figure 5A:
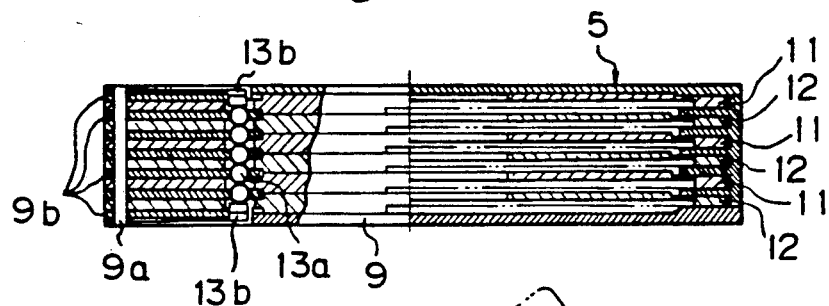
FIGS. 5(a), 5(b), and 6 are views showing magazines in detail.
Figure 5B:
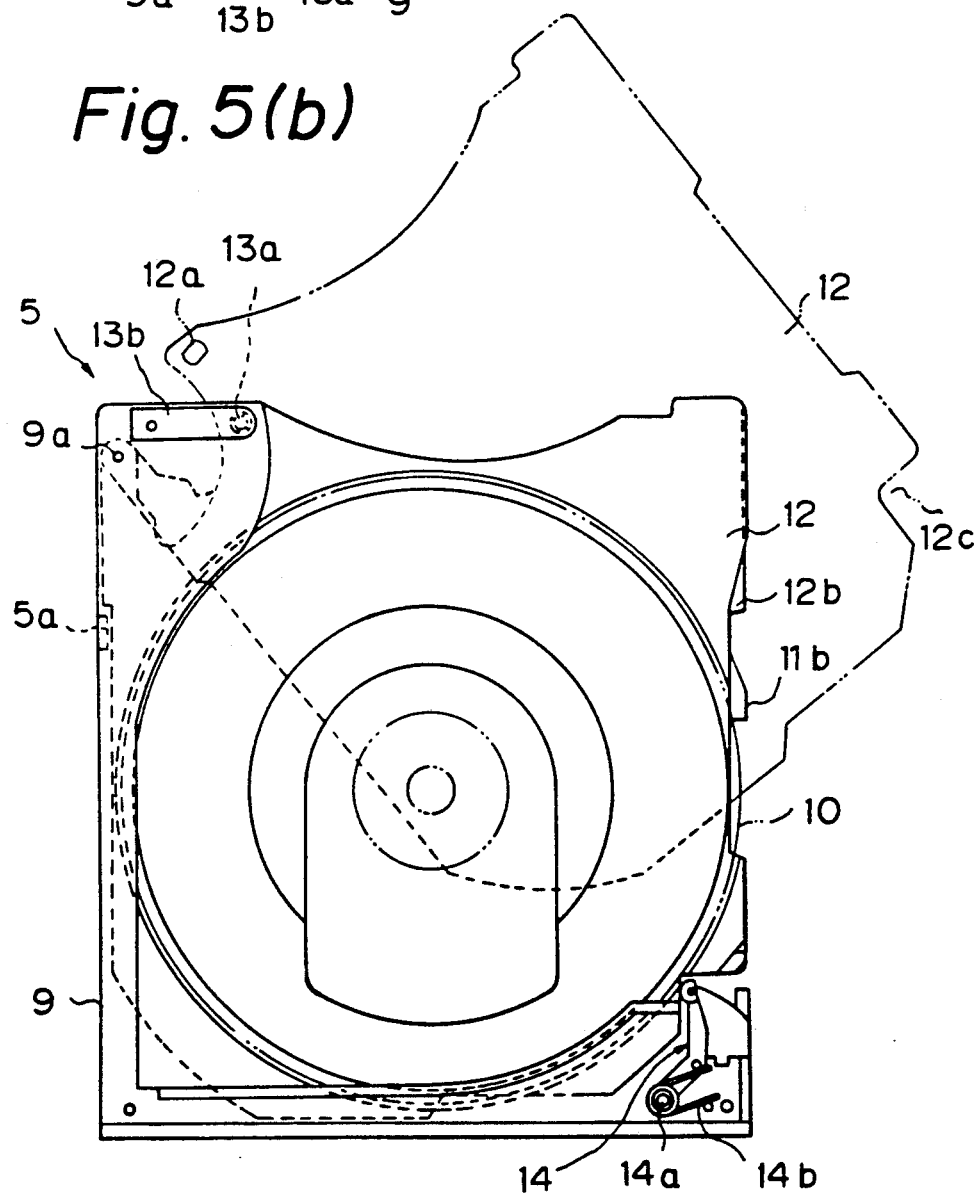

As shown in FIGS. 5(a) and 5(b), each of the disc magazines 5 has a case 9 in the shape of a flat rectangular parallelepiped, and a total of six trays, i.e., three rectangular trays A 11 and three rectangular trays B 12, each for carrying a disc 10 in its principal plane. The discs 10 carried in the respective trays 11, 12 are stored at predetermined pitches as a horizontal array in lateral directions (i.e., in the direction of the arrow X and the direction opposite thereto) with the recording surfaces of the discs 10 being directed vertically. The trays A 11 and the trays B 12 are rotatably mounted on a support shaft 9a supported on a corner of the case 9 and extending across the trays along the array thereof, so that the trays can be stored into and projected out of the case 9 along their principal planes.

Figure 6:
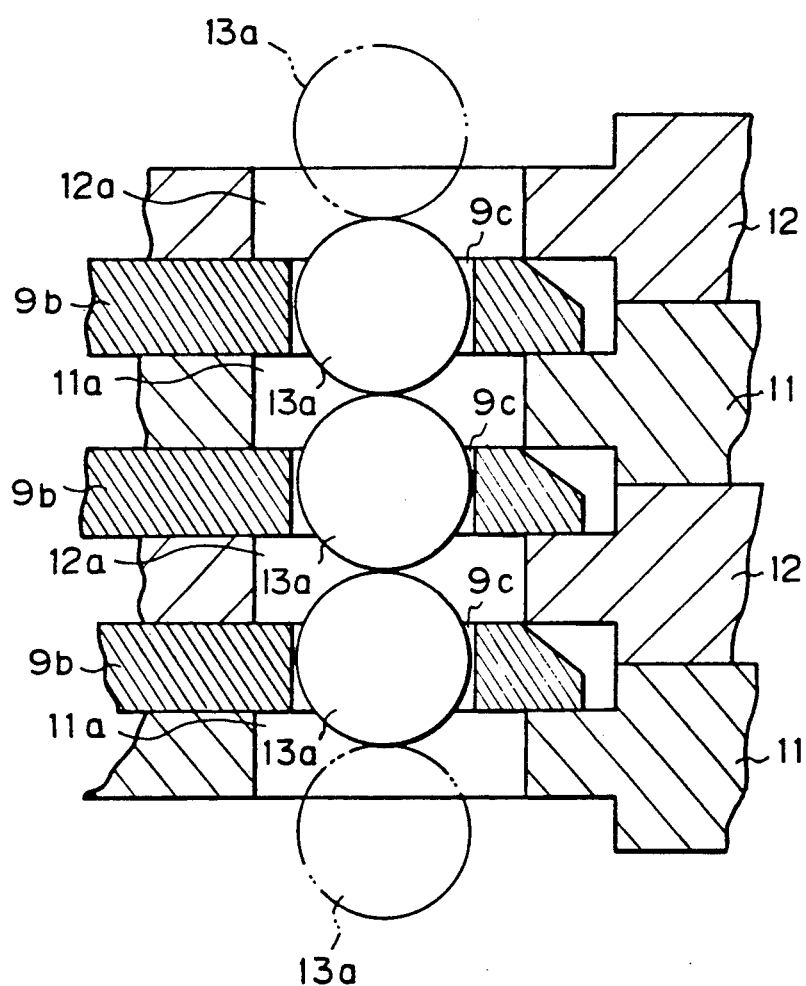

The magazine 5 will be described in greater detail. The case 9 of the magazine 5 has seven partitions 9b with the trays A 11 and the trays B 12 being disposed between these partitions 9b. As shown in FIG. 6, the partitions 9b have respective small circular holes 9c defined coaxially therein near the support shaft 9a. The trays 11, 12 also have openings 11a, 12a, respectively, defined therein at positions capable of confronting the openings 9c. Five movable spherical elements 13a are disposed in the openings 9c, 11a, 12a, the spherical elements 13a being movable in directions across the partitions 9b. The spherical elements 13a have a diameter equal to the pitch of the alternately positioned trays 11, 12. The spherical elements 13a are normally urged against each other by a pair of leaf springs 13b disposed respectively in opposite walls of the case 9 at one end thereof.

As shown in FIG. 5(b), a presser lever 14 is disposed in an end of the case 9 and angularly movably mounted on the case 9 by a pin 14a at one end of the presser lever 14. The presser lever 14 has a free end which can smoothly engage the free ends of the trays 11, 12. The presser lever 14 is normally urged by a spring 14b to turn counterclockwise in FIG. 5(b) to press the trays 11, 12. The trays 11, 12 are substantially identical in shape to each other, except that they have differently shaped and positioned steps 11b, 12b on side edges which can be engaged by a fingertip of the user when pulling the trays out of the case 9.

Figure 7:
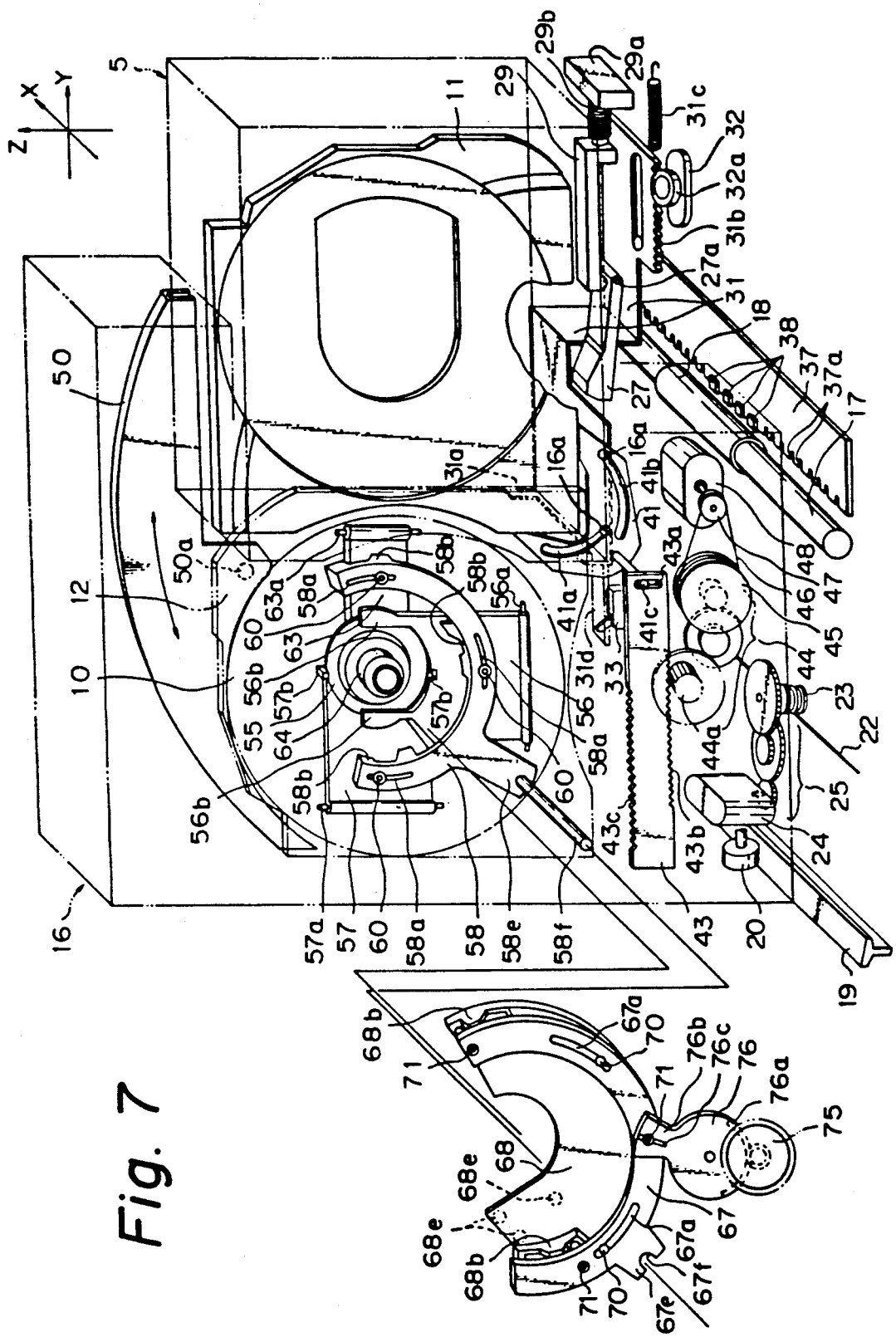

As shown in FIGS. 2 through 4, a movable chassis 16 is disposed in the subhousing 2 and guided on a guide shaft 17 for horizontal movement in the direction in which the magazines 5 are arrayed. The movable chassis 16 supports thereon a playback means and a disc moving means, both of which will be described later on. As also shown in FIG. 7, a boss 18 is fixedly mounted in a front lower end portion of the movable chassis 16 and smoothly movably fitted over the guide shaft 17. A rail 19 is disposed in the subhousing 2 parallel to the guide shaft 17, and a roller 20 rotatably mounted on a rear lower end portion of the movable chassis 16 is rollingly supported on the rail 19. As illustrated in FIGS. 2, 3, and 7, a wire 22 which is kept taut is disposed in the subhousing 2 and extends in the direction in which the movable chassis 16 is movable. As shown in FIG. 3, the wire 22 is attached at one end to the subhousing 2 by a hook 22a and tensioned by a coil spring 22b connected to the other end of the wire 22 and attached to the subhousing 2 by another hook 22a. The wire 22 is trained around and bent by a pulley 22c near the coil spring 22b. The wire 22 is wound around a small pulley 23 rotatably mounted on a lower end portion of the movable chassis 16. The small pulley 23 can be rotated about its own axis by a motor 24 through a gear transmission mechanism 25 for moving the movable chassis 16 along the guide shaft 17 and the rail 19.

The guide shaft 17, the boss 18, the rail 19, the roller 20, the wire 22, the hook 22a, the coil spring 22b, the pulley 22c, the small pulley 23, the motor 24, and the gear transmission mechanism 25 jointly serve as a guiding and driving means for carrying the movable chassis 16 movably in the direction of the array of the magazines 5 and driving the movable chassis 16.

Locking means for locking the magazines in inserted positions in the subhousing 2, and ejecting means for unlocking the magazines will be described below. These locking means and ejecting means are provided respectively in association with the ten magazines 5.

As shown in FIGS. 4 and 5(b), the case 9 of each magazine 5 has a recess 5a of a rectangular cross section which is defined in a side thereof. As shown in FIGS. 4 and 7, a horizontal panel extension 2d extends from a lower portion of the front panel 2a of the subhousing 2 into the subhousing 2. A locking finger 27 having a free end engageable in the recess 5a in the case 9 for locking the magazine 5 in its inserted position is swingably mounted on a support pin 27a supported on the horizontal panel extension 2d. The locking finger 27 is normally urged into the recess 5a by a spring 27b installed as an urging means on the support pin 27a. An operating lever 29 for engaging the locking finger 27 to release the locking finger 27 from the magazine 5 is movably disposed on the panel extension 2d for reciprocal movement, back and forth (i.e., in the direction of the arrow Y and the direction opposite thereto). The operating lever 29 has a front end portion projecting out of the subhousing 2, and an eject button 29a is attached to the projecting end of the operating lever 29. Between the front panel 2a and the eject button 29a, there is disposed a coil spring 29b for biasing the operating lever 29 to move in the forward direction (i.e., in the direction of the arrow Y).

An ejecting plate 31 for ejecting the magazine 5 out of the subhousing 2 is disposed near the locking finger 27 and the operating lever 29. The ejecting plate 31 is movably installed on the panel extension 2d of the front panel 2a for back-and-forth movement (in the direction of the arrow Y and the direction opposite thereto). The ejecting plate 31, the locking finger 27, and the operating lever 29 are provided in ten sets which are associated with the respective ten magazines 5. The ejecting plate 31 has an upward projection 31a on a rear end thereof for abutting against the rear end of the magazine 5. The ejecting plate 31 also has a rack 31b on a right-hand side thereof, and a braking gear 32a of a damper 32 is held in mesh with the rack 31b. The damper 32 contains a viscous material such as grease and utilizes the viscous resistance of the viscous material for applying a braking force to the ejecting plate 31. The ejecting plate 31 is normally urged in a direction to eject the magazine 5 by a coil spring 31c.

As shown in FIGS. 4 and 7, the ejecting plates 31 also have respective rearward plate extensions 31d projecting from the respective rear ends thereof. Detector switches 33 are fixed as sensors with respect to the subhousing 2 near the respective plate extensions 31d. When the ejecting plate 31 is moved rearwardly (i.e., in the direction opposite to the direction of the arrow Y) upon insertion of a corresponding magazine 5, the plate extension 31d of the ejecting plate 31 engages an actuator of the detector switch 33. When the magazine 5 is not inserted, the plate extension 31d is not in a position detectable by the detector switch 33, but in a nondetectable position forward of the detectable position.

The ejecting plate 31, or detectable member, including the plate extension 31d and the detector switch 33 jointly constitute a magazine presence/absence detecting means for detecting whether there is a corresponding magazine in the subhousing 2. While the sensor in the magazine presence/absence detecting means comprises the detector switch 33 in the illustrated embodiment, it may be photocoupler. In the embodiment, as many detector switches 33 as there are ejecting plates 31 are employed. However, a single detector switch or a photocoupler may be mounted as a sensor on the movable chassis 16 for horizontal movement with the movable chassis 16 in the direction in which the magazines 5 are arrayed, so that the plate extension 31d of each ejecting plate 31 can be detected by the single detector switch or photocoupler. Rather than indirectly detecting a magazine 5 with the plate extension 31d of the corresponding ejecting plate 31, it is possible to detect the magazine 5 directly with a sensor.

As shown in FIGS. 1, 2, and 4, an array of ten light-emitting diodes 35 is disposed as indicator elements on an upper portion of the front panel 2a of the subhousing 2, the light-emitting diodes 35 being arrayed in the direction in which the movable chassis 16 is movable, i.e., the magazines 5 are arrayed. The light-emitting diodes 35 are positioned above the respective openings 2b in which the magazines 5 can be inserted. The light-emitting diodes 35 can selectively be energized dependent on the position of the movable chassis 16, i.e., the playback means thereon, by a controller as an indicator element driving means, as described later on. The indicator elements may be ordinary electric lamps or liquid crystal displays.

As shown in FIG. 3, a detector switch 36 is disposed in a lefthand end portion of the subhousing 2 for engaging the reciprocally movable chassis 16 to detect when the movable chassis 16 is in a limit or home position. As illustrated in FIGS. 2, 3, 4, and 7, an address plate 37 is disposed in the subhousing 2, the address plate 37 having a multiplicity of slits 37a arrayed in the direction in which the movable chassis 16 is movable, i.e., in the horizontal direction in which the magazines 5 are arrayed. The slits 37a are positioned in alignment with respective positions at which discs 10 are stored in the magazines 5 loaded in the subhousing 2. As shown in FIGS. 4 and 7, photocouplers 38 are mounted on a lower portion of the front end of the movable chassis 16 for detecting the slits 37a. A detected slit signal produced by the photocouplers 38 is sent to the controller which includes a counter for counting the detected slit signal. The controller detects a position where the movable chassis 16 is stopped based on the count obtained by the counter.

The detector switch 36, the address plate 37, and the photocouplers 38 jointly constitute a playback means position detecting means for detecting when the movable chassis 16 supporting the playback means has reached a position aligned with a selected disc 10 and for stopping the movable chassis 16. The guiding and driving means for moving the movable chassis 16 as described above and the playback means position detecting means jointly serve as a positioning means for positioning the playback means in the direction in which the magazines 5 are arrayed.

As shown in FIGS. 2, 4, and 7, an ejector member 41 is mounted on a lower portion of the front end of the movable chassis 16 for engaging one at a time of the trays 11, 12 in a magazine 5 and ejecting the engaged tray out of the case 9 of the magazine 5. The ejector member 41 is in the shape of an L and has two arcuate guide grooves 41a, 41b defined therein and having different radii of curvature. The ejector member 41 is guided in its movement by a pair of pins 16a projecting on the movable chassis 16 and slidably engaging the respective guide grooves 41a, 41b. The ejector member 41 is angularly movable about the center of curvatures of the arcuate guide grooves 41a, 41b for causing fingers on the opposite ends of the ejector member 41 to eject and store the tray 11 or 12 out of and into the case 9. The center of rotation of the ejector member 41 (i.e., the center of curvature of the arcuate guide grooves 41a, 41b) is aligned with the central axis about which the trays 11, 12 are rotatable (i.e., the support shaft 9a shown in FIGS. 5(a) and 5(b)). The trays 11, 12 are pushed by the ejector member 41 at their portions near the support shaft 9a.

As shown in FIGS. 2 and 7, an elongate movable member 43 is disposed in the vicinity of the ejector member 41 and mounted on the movable chassis 16 for reciprocable movement in the back and forth or forward and rearward directions (i.e., in the direction of the arrow Y and the direction opposite thereto). The movable member 43 has a vertical slot 43a defined in the front end thereof, and a pin 41c mounted on the ejector member 41 slidably rides in the vertical slot 43a. The movable member 43 also has a rack 43b on its lower edge. The movable member 43 can reciprocally be moved by a motor 48 through a gear transmission mechanism 44 including a pinion 44a meshing with the rack 43b, a large pulley 45 coupled to a first gear of the gear transmission mechanism 44, and a belt 46 trained around the large pulley 45 and a small pulley 47 mounted on the output shaft of the motor 48. The movable member 43 is thus movable back and forth by rotating the motor 48 in one direction and the other. As shown in FIGS. 2, 4, and 7, a tray guide member 50 is mounted in the movable chassis 16 for guiding one of the trays 11, 12 in sliding contact with the tray which is ejected out of or stored into the case 9 of a magazine 5.

The ejector member 41, the movable member 43, the gear transmission mechanism 44, the large pulley 45, the belt 46, the small pulley 47, and the motor 48 jointly serve as a disc moving means for moving a disc 10 between the magazine 5 and the playback means.

The playback means supported in the movable chassis 16 for playing back a disc ejected from one of the magazines 5 includes a turntable, an optical pickup, and a disc clamping mechanism, and is movable in the horizontal direction in which the magazines 5 are arrayed. As shown in FIG. 2, the movable chassis 16 has three upstanding panels 16c, 16d, 16e juxtaposed in the horizontal direction. To the righthand upstanding panel 16c, there is attached a spindle motor 53 for directly rotating a turntable 52 (see FIG. 3). There are also mounted on the upstanding panel 16c an optical pickup (not shown) for reading recorded information from the disc 10, and a pickup driving means (not shown) for moving the optical pickup along the recording surface of the disc 10.

A disc clamping mechanism is mounted on the central and lefthand upstanding panels 16d, 16e. As illustrated in FIGS. 2 through 4 and 7 through 8(b), the disc clamping mechanism has a disc-shaped presser 55 for pressing the disc 10 ejected from the magazine 5 against the disc carrying surface of the turntable 52 (see FIG. 3), clamping plates 56, 57 with the presser 55 being rotatably supported at its front and rear surfaces by the clamping plates 56, 57, and an arcuate clamping cam member 58 held in sliding contact with the clamping plates 56, 57 for driving the clamping plates 56, 57. The clamping plate 56 is swingably attached to the upstanding panel 16e by a support shaft 56a. The clamping plate 57 is swingably attached to the upstanding panel 16d by a support shaft 57a. The clamping plates 56, 57 have projections 56b, 57b on free ends thereof which are slidably held against the outer periphery of the presser 55. The clamping plates 56, 57 are swingable in respective planes normal to the disc carrying surface of the turntable 52.

The clamping cam member 58 has three slots 58a defined therein and each extending along the arcuate shape of the clamping cam 58. The clamping cam member 58 is angularly movable about the center of curvature thereof while being guided by three support pins 60 mounted on the upstanding panel 16d and slidably engaging in the respective slots 58a. The clamping cam member 58 has cams 58b disposed one on each side of the slots 58a, and projections 56d, 57d on the clamping plates 56, 57 are held in smooth sliding contact with cam surfaces 58c of the cams 58b. The clamping plates 56, 57 are normally urged against the clamping cam member 58 by an urging means (not shown) comprising a spring. As shown in FIGS. 7 and 8(c), the cam surface 58c of each of the cams 58b of the clamping cam member 58 is composed of three continuous surfaces including an intermediate surface, a lower surface, and a higher surface which are arranged in the order named.

The clamping plates 56, 57 are referred to as a presser support mechanism. The disc-shaped presser 55 is supported by the presser support mechanism for rotation and movement in a direction normal to the disc carrying surface of the turntable 52 (FIG. 3). The presser support mechanism, the presser 55, and the clamping cam member 58 jointly constitute a disc clamping mechanism.

As shown in FIGS. 4, 7, 8(a) through 8(c), another plate 63 is swingably mounted by a support shaft 63a on the central upstanding panel 16d on which the clamping plate 57 is supported. The plate 63 is swingable in a plane normal to the disc carrying surface of the turntable 52 (FIG. 3), as with the clamping plates 56, 57. A disc guide pin 64 is rotatably mounted on a free end of the plate 63 for fitting in the central hole of the disc 10. The plate 63 and the disc guide pin 64 are part of a disc pressing means (described later on).

As shown in FIGS. 8(a) and 8(c), the plate 63 has a projection 63d slidingly held against the cam surfaces 58c of the cams 58b of the clamping cam member 58. Although not shown, an urging means (not shown) comprising a spring normally urges the plate 63 against the clamping cam member 58.

A disc 10 ejected with its tray 11 or 12 out of the corresponding magazine 5 is delivered horizontally in perpendicular relation to the disc carrying surface of the turntable 52 by the disc clamping mechanism, and then mounted on the disc carrying surface. The disc guide pin 64 and the plate 63 are effective in preventing the disc 10 from being radially displaced due to gravity while the disc 10 is being delivered, so that the disc 10 can reliably be mounted and clamped on the turntable 52.

A disc pressing means for mounting the disc 10 on the turntable 52 in cooperation with the disc clamping mechanism is installed on the righthand upstanding panel 16c disposed parallel to the other upstanding panels 16d, 16e on which the disc clamping mechanism is held. The disc pressing means will hereinafter be described.

As shown in FIGS. 2, 7, 9(a), and 9(b), the disc pressing means has an arcuate rotary member 67 similar in shape to the clamping cam member 58, and a substantially arcuate plate-like abutment member 68 drivable by the rotary member 67 to abut against the disc 10 ejected from the magazine 5.

The rotary member 67 has two arcuate slots 67a defined therein and extending along the arcuate shape of the rotary member 67. The rotary member 67 is angularly movable about the center of curvature thereof while being guided by two support pins 70 mounted on the upstanding panel 16c and slidingly engaging in the slots 67a. The abutment member 68 is positioned concentrically with the rotary member 67 and held in sliding engagement with the support pins 70 for reciprocating movement only in the direction in which the support pins 70 project. The support pins 70 extend perpendicularly to the disc carrying surface of the turntable 52, so that the abutment member 68 is movable perpendicularly to the disc carrying surface of the turntable 52. The abutment member 68 has three substantially equidistantly spaced cams 68b having respective cam surfaces 68c against which respective cam projections 67c of the rotary member 67 are smoothly slidably held.

The abutment member 68 has three slots 68d defined therein and surrounded respectively by the cams 68b. Pins 71 inserted through respective holes defined in the projections 67c of the rotary member 67 slidably engage in the respective slots 68d. As shown in FIG. 9(b), an urging means comprising a coil spring 72 is disposed between the head of each pin 71 and the rotary member 67 for normally urging the abutment member 68 toward the rotary member 67. As shown in FIGS. 2, 7, and 9(b), each of the cam surfaces 68c of the cams 68b is composed of three continuous surfaces, i.e., a lower surface, an intermediate surface, and a higher surface.

As illustrated in FIG. 7, pads 68e made of felt or the like are attached to the surface of the abutment member 68 which will contact the disc 10. Likewise, a pad 50a made of felt or the like is attached to the surface of the tray guide member 50 for contact with the disc 10 and the trays 11, 12.

As shown in FIGS. 2, 7, and 9(a), the movable member 43 for turning the ejector member 41 to eject the trays 11, 12 from the magazines 5 also has a rack 43c on its upper edge which is held in mesh with a pinion 75 positioned near the rotary member 67. The pinion 75 is held in mesh with a gear 76a of a gear cam 76 having a radial extension 76b with a slot 76c defined therein and slidably receiving therein one of the pins 71 on the rotary member 67. When the movable member 43 is reciprocally moved by the motor 48, the rotary member 67 is rotated to move the abutment member 68 in the horizontal directions (i.e., in the direction of the arrow X and the direction opposite thereto).

The motor 48, the gear cam 76, and a series of operatively coupled members therebetween jointly serve as a drive force imparting means for imparting a drive force to the rotary member 67. The rotary member 67, the drive force imparting means, and small parts associated therewith jointly constitute a supporting and driving means for supporting the abutment member 68 and moving the abutment member 68 in a direction normal to the disc carrying surface of the turntable 52 (FIG. 3). The supporting and driving means, the abutment member 68, the plate 63, and the disc guide pin 64 jointly provide a disc pressing means for cooperating with the disc clamping mechanism (described above) in gripping a disc 10 ejected from a magazine 5 and mounting the disc 10 on the turntable 52.

As shown in FIGS. 2, 4, 7, and 8(b), the arcuate clamping cam member 58 includes a radially outward extension 58e on its outer periphery with a horizontal shaft 58f mounted thereon. The arcuate rotary member 67 also has a radially outward extension 67e on its outer periphery which has a U-shaped recess 67f with the shaft 58f smoothly engaging therein. Therefore, the rotary member 67 is angularly moved by the supporting and driving means to move the abutment member 68. Both the presser 55 and the abutment member 68 can thus be driven by the single drive source, i.e., the motor 48. As a result, the number of drive sources required in the disc player is reduced.

Operation of the magazine disc player of the above structure will be described below further with reference to FIGS. 10 through 13(d).

Figure 10:
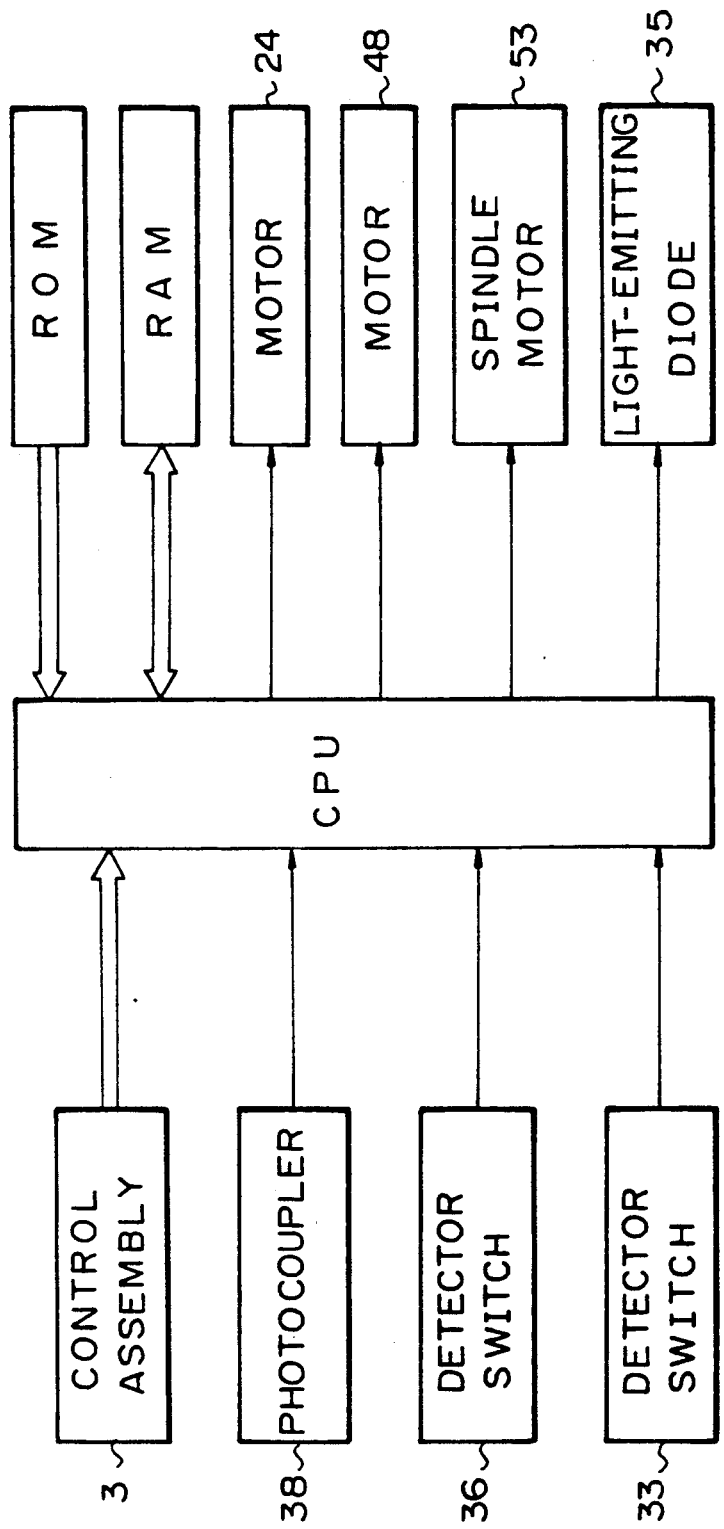
FIG. 10 is a block diagram of a control system of the magazine disc player shown in FIGS. 1 through 9(b)

First, the control assembly 3 shown in FIGS. 1 and 10 is operated to specify a disc 10 to be played back. The controller or CPU shown in FIG. 10 applies a drive voltage to the motor 24 to move the movable chassis 16 with the playback means thereon in a leftward direction (forward) or a rightward direction (rearward) until the ejector member 41 reaches a position to engage the tray 11 or 12 carrying the disc 10 to be played back.

Figure 11B:
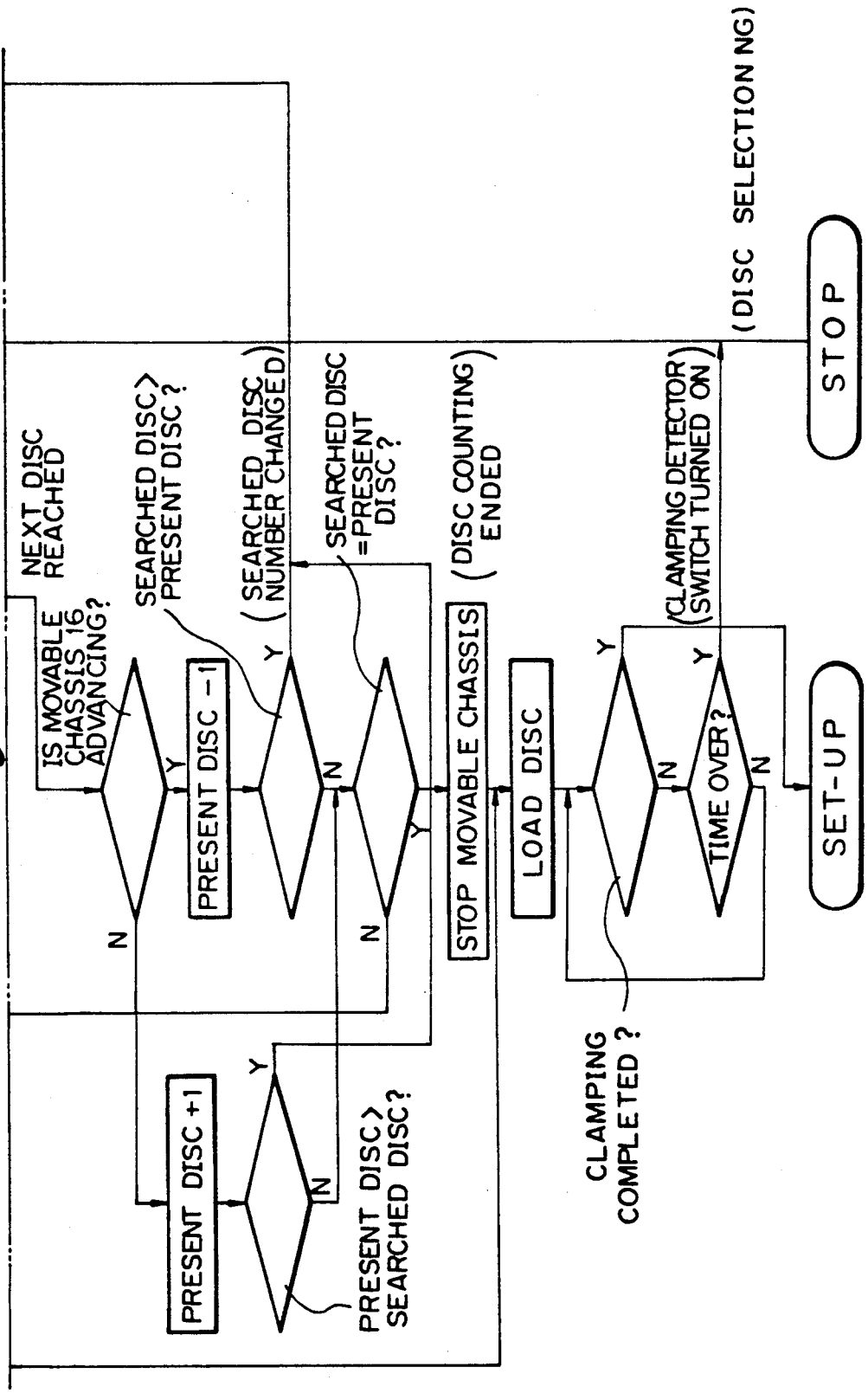

The movable chassis 16 and hence the playback means are moved and positioned as follows:

A DCNT signal shown in FIGS. 11 and 12 is a detected slit signal generated by the photocouplers 38, and a DCHM signal is a detected signal generated by the detector switch 36 when the movable chassis 16 is in its limit position or home position. As shown in FIG. 11, if there is a movement command while the photocouplers 38 are generating a DCNT signal, the movable chassis 16 is moved a distance corresponding to the difference between a present address (present DISC) and a desired address (search DISC). If there is a movement command when no DCNT signal is generated by the photocouplers 38, the movable chassis 16 is moved in the forward direction (leftward: the direction of the arrow X) until a DCHM signal is generated by the detector switch 36, and thereafter the movable chassis 16 is moved to the position of a desired address (search DISC).

Figure 13A:
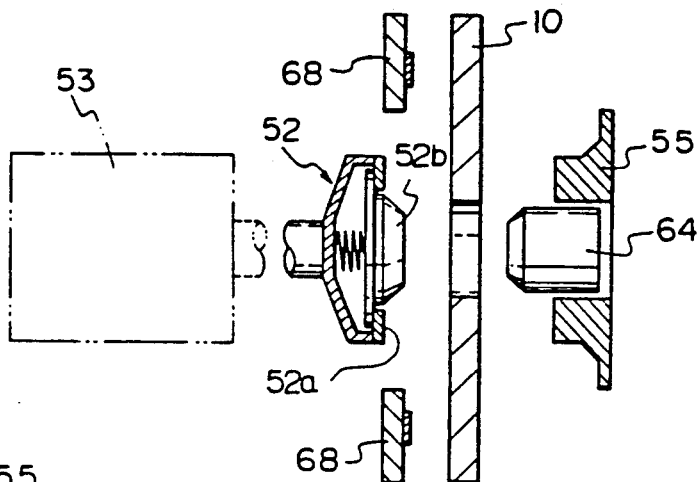
FIGS. 13(a) through 13(d) are cross-sectional views showing operation of the magazine disc player shown in FIGS. 1 through 9(b)

When the ejector member 41 reaches a position to engage the tray carrying the disc 10 to be played back, the motor 48 is energized to cause the movable member 43 to turn the ejector member 41. The tray (e.g., tray B 12) carrying the disc 10 to be played back is ejected from the case 9 of the magazine 5, and the disc 10 is moved into a position concentric with the disc carrying surface of the turntable 52, i.e., into a position directly laterally of the disc carrying surface, as shown in FIG. 13(a).

Figure 13C:
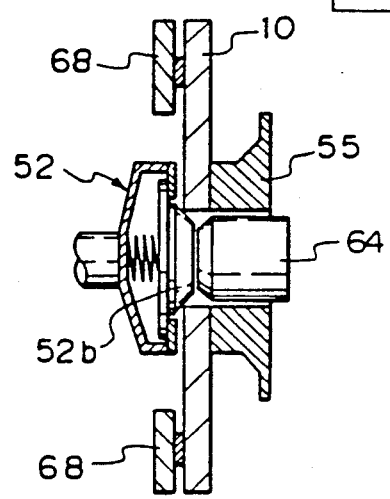
Figure 13B:
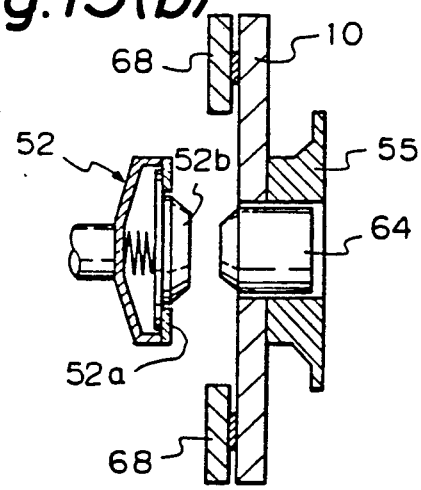
Figure 13D:
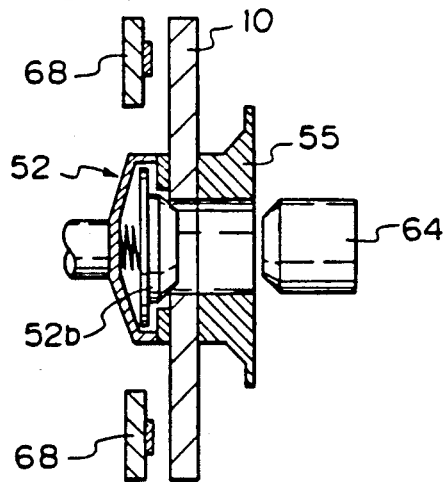

At the same time that the disc 10 is ejected by the movable member 43, the clamping cam member 58 and the rotary member 67 are rotated by the movable member 43. As illustrated in FIG. 13(b), the abutment member 68 is moved toward the presser 55 of the disc clamping mechanism by the cams 68b to grip the disc 10 between the presser 55 and the abutment member 68. Thereafter, as shown in FIGS. 13(c) and 13(d), the disc 10 is mounted on the turntable 52, while being gripped between the presser 55 and the abutment member 68, by the cams 68b (FIGS. 9a and 9b) abutment member 68 and the cams 58b (FIGS. 8a, b and c). of the clamping cam member 58. Then, the abutment member 68 is moved away from the disc 10, which is clamped by the presser 55. When the disc 10 ejected from the magazine 5 is delivered horizontally, the disc guide pin 64 is fitted in the central hole of the disc 10, as shown in FIGS. 13(b) and 13(c), to prevent the disc 10 from being positionally displaced. The disc 10 installed on the turntable 52 is thus highly accurately centered with respect to the center of rotation of the turntable 52 in engagement with a centering member 52b of the turntable 52.

The disc 10 can now be played back. The turntable 52 and the optical pickup (not shown) are then operated to start playing back the disc 10.

After the disc 10 has been played back, the disc 10 is stored back into the magazine 5 in a process which is the reversal of the above disc loading process. The above operation is repeated as many times as the number of musics specified to be played back.

In the disc loading process, the CPU detects whether there are magazines based on the detected signal from the detector switch 33. If a magazine containing a desired disc is not loaded in the subhousing 2, then such a non-loading condition is indicated by an indicator (not shown), and the CPU does not search for such a disc, but searches for a next specified disc. When the movable chassis 16 reaches a position aligned with the magazine containing a desired disc to be played back, the CPU energizes only the light-emitting diode 35 which is positioned in alignment with the magazine containing the desired disc. Each of the light-emitting diodes 35 may be of such a structure as to be able to selectively emit lights of two different colors, and may be controlled such that all the light-emitting diodes 35 are first energized to emit light of one color, and only the light-emitting diode which is approached by the movable chassis 16 may be energized to emit light of a different color. Alternatively, the light-emitting diodes 35 may successively be energized as the movable chassis 16 is progressively moved, and those light-emitting diodes 35 past which the movable chassis 16 has moved may be de-energized.

A magazine 5 can be ejected out of the subhousing 2 and hence the disc player by pushing the eject button 29a located below the magazine 5 as shown in FIG. 1.

A magazine disc player according to a second embodiment of the present invention will be described below.

Figure 14:
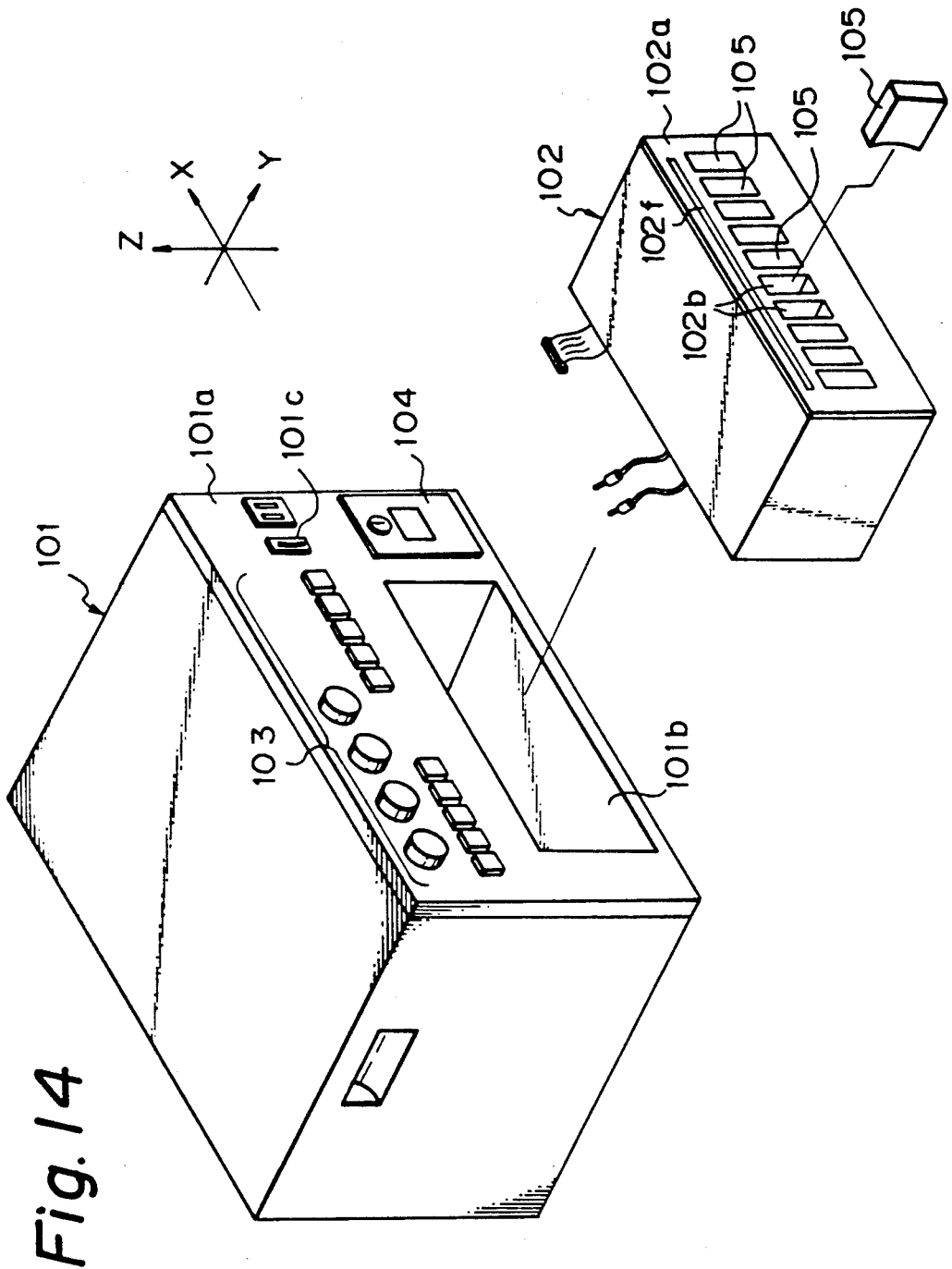
FIG. 14 is a perspective view of a magazine disc player according to a second embodiment of the present invention, with a subhousing removed from a main housing.

As shown in FIG. 14, a magazine disc player according to the first embodiment includes a separable player housing assembly comprising a main housing 101 and a subhousing 102 separably inserted in the main housing 101. The main housing 101 has a front panel 101a having a horizontal opening 101b into which the subhousing 102 can be inserted, and supporting a control assembly 103 above the opening 101b for controlling operation of the disc player. Front, leftward, and upward directions with respect to the magazine disc player are indicated by the arrows Y, X, Z, respectively. The magazine disc player is suitable for use as a so-called "karaoke" disc player. The front panel 101a of the main housing 101 also has a coin slot 101c for inserting a coil therethrough to enable the magazine disc player to be operated, and a coin retrieval case 104 for retrieving inserted coins.

Figure 15:
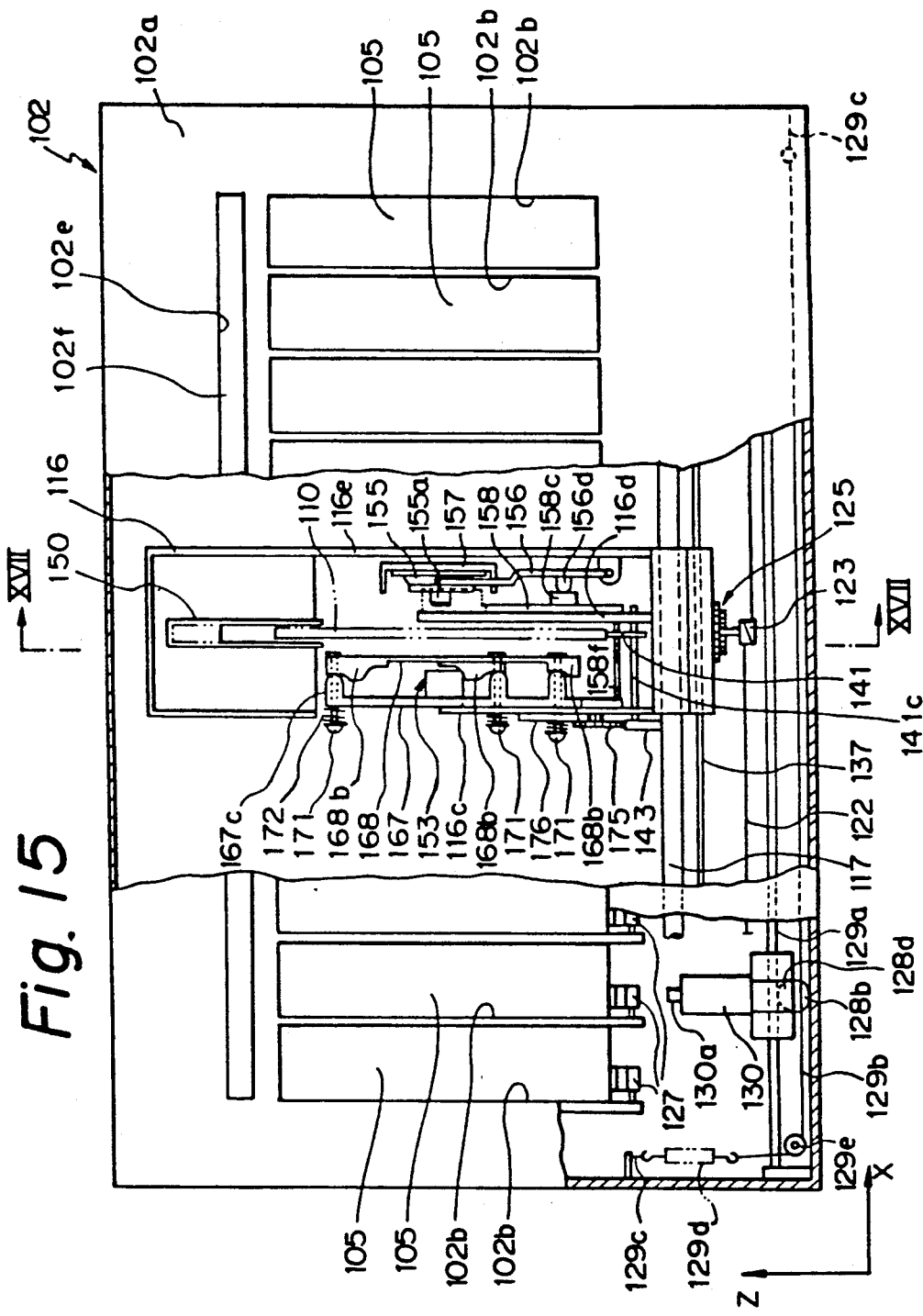
FIGS. 15 and 16 are front and plan views, respectively, partly cut away, of the subhousing which contains magazines and a playback means in the magazine disc player shown in FIG. 14.
Figure 16:
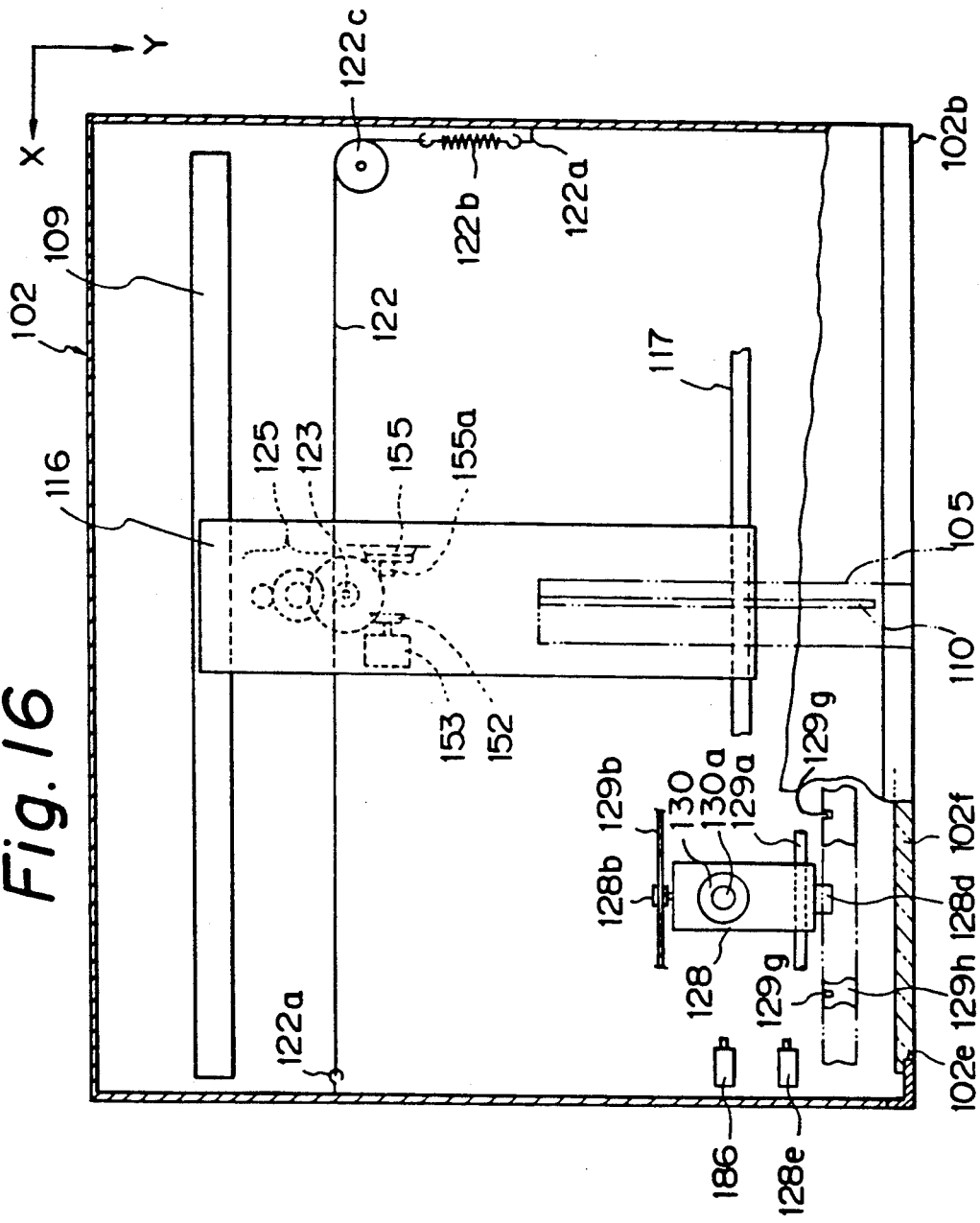
Figure 17:
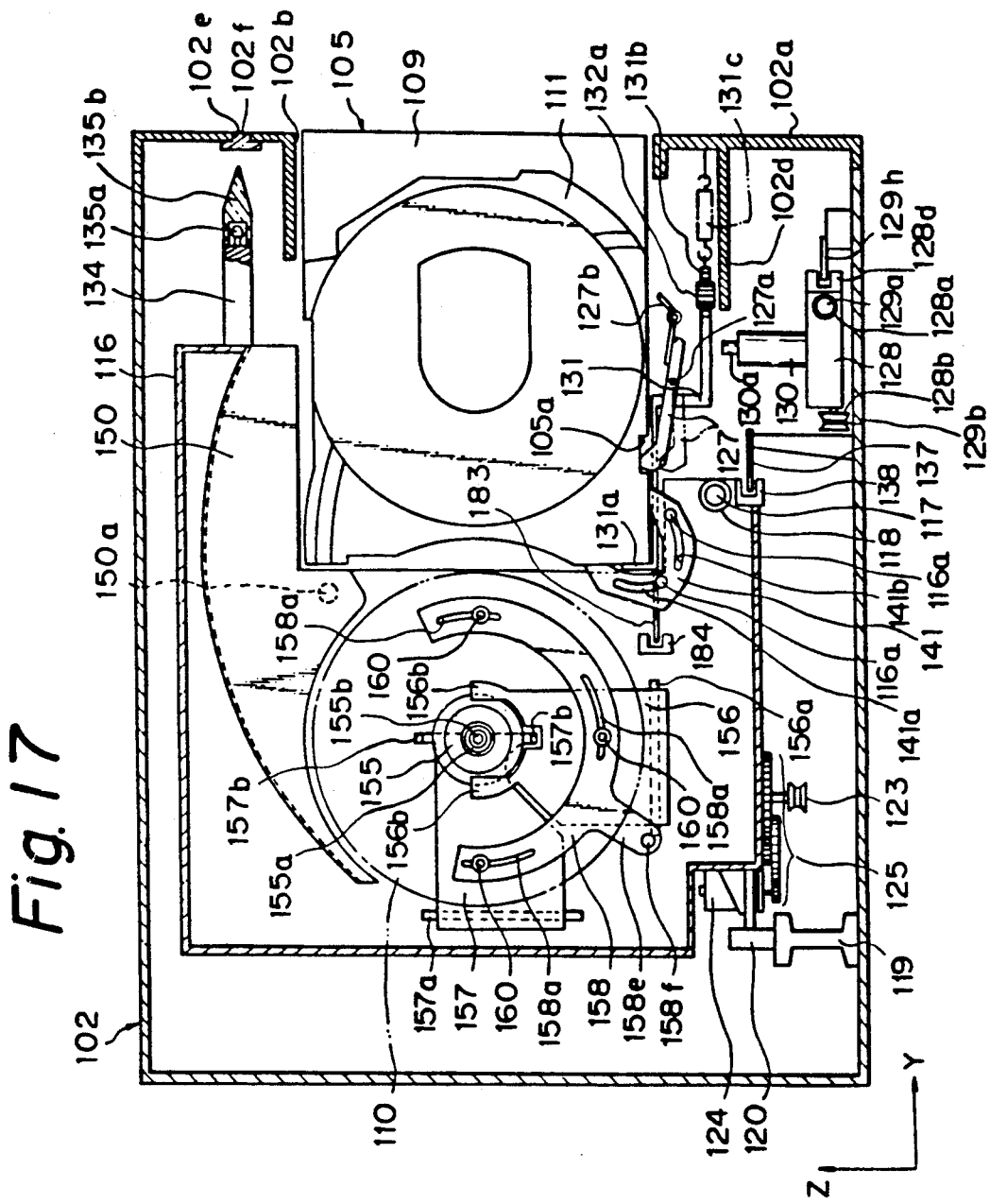
FIG. 17 is a cross-sectional view taken along line XVII—XVII of FIG. 15.

As illustrated in FIGS. 15 through 17, the subhousing 102 has a front panel 102a having a plurality (e.g., 10) of openings 102b for inserting disc magazines 105 therein. The openings 102b extend vertically and are defined as a horizontal array.

Figure 18A:
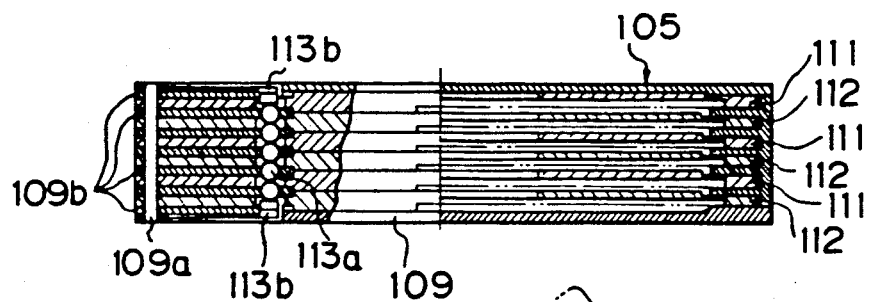
FIGS. 18(a), 18(b), and 19 are views showing magazines in detail.

As shown in FIGS. 18(a) and 5(b), each of the disc magazines 105 has a case 109 in the shape of a flat rectangular parallelepiped, and a total of six trays, i.e., three rectangular trays A 111 and three rectangular trays B 112, each for carrying a disc 110 in its principal plane. The discs 110 carried in the respective trays 111, 112 are stored at predetermined pitches as a horizontal array in lateral directions (i.e., in the direction of the arrow X and the direction opposite thereto) with the recording surfaces of the discs 110 being directed vertically. The trays A 111 and the trays B 112 are rotatably mounted on a support shaft 109a supported on a corner of the case 109 and extending across the trays along the array thereof, so that the trays can be stored into and projected out of the case 109 along their principal planes.

Figure 19:
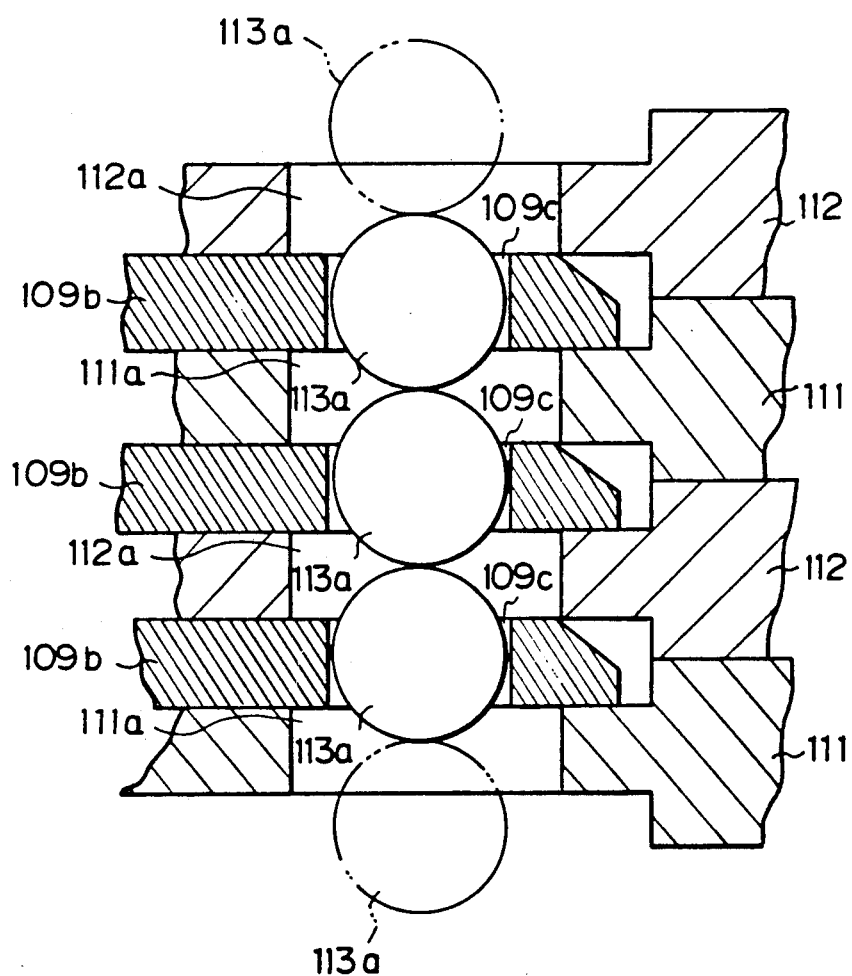

The magazine 105 will be described in greater detail. The case 109 of the magazine 105 has seven partitions 109b with the trays A 111 and the trays B 112 being disposed between these partitions 109b. As shown in FIG. 19, the partitions 109b have respective small circular holes 109c defined coaxially therein near the support shaft 109a. The trays 111, 112 also have openings 111a, 112a, respectively, defined therein at positions capable of confronting the openings 109c. Five movable spherical elements 113a are disposed in the openings 109c, 111a, 112a, the spherical elements 113a being movable in directions across the partitions 109b. The spherical elements 113a have a diameter equal to the pitch of the alternately positioned trays 111, 112. The spherical elements 113a are normally urged against each other by a pair of leaf springs 113b disposed respectively in opposite walls of the case 109 at one end thereof.

Figure 18B:
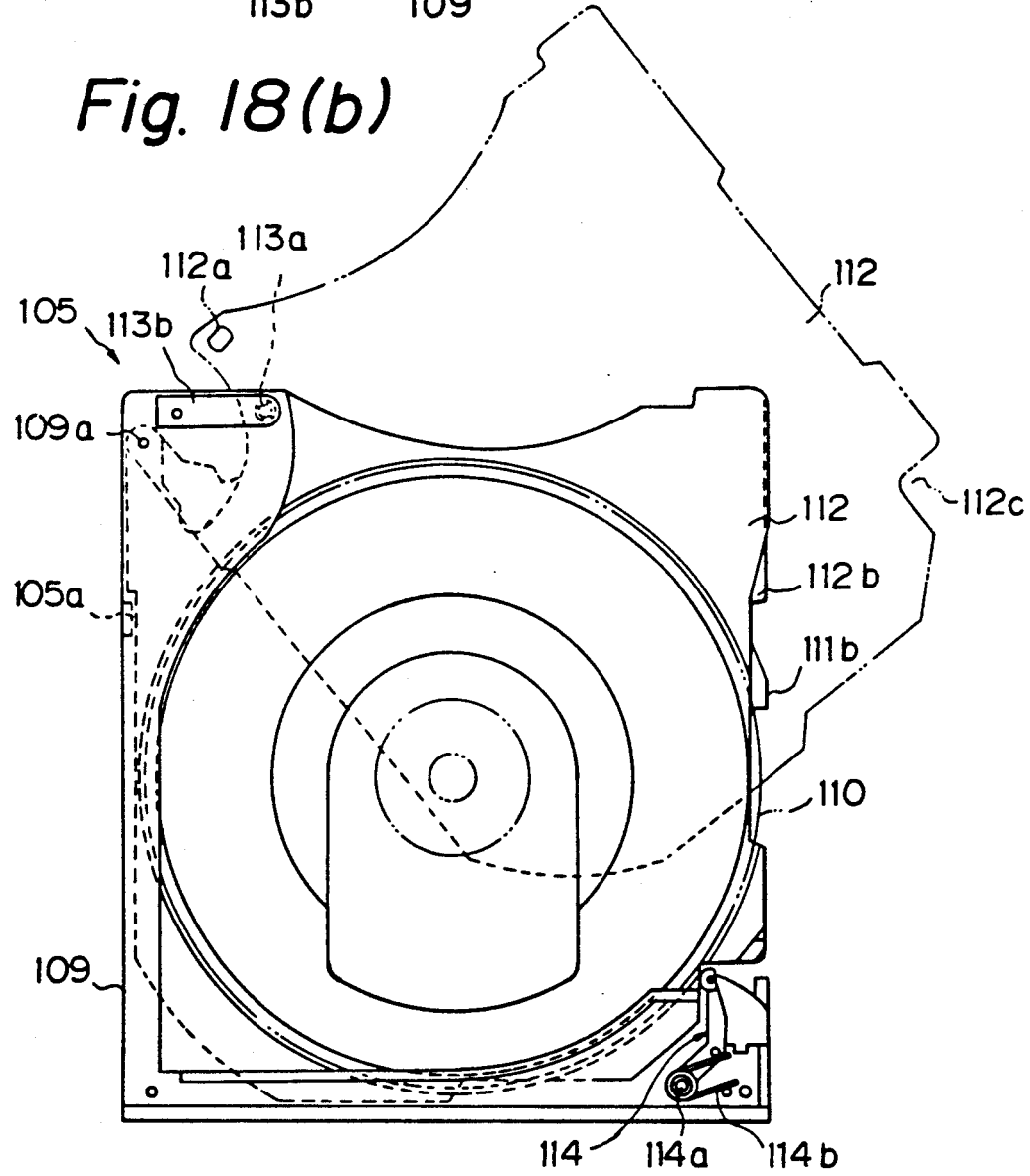

As shown in FIG. 18(b), a presser lever 114 is disposed in an end of the case 109 and angularly movably mounted on the case 109 by a pin 114a at one end of the presser lever 114. The presser lever 114 has a free end which can smoothly engage the free ends of the trays 111, 112. The presser lever 114 is normally urged by a spring 114b to turn counterclockwise in FIG. 18(b) to press the trays 111, 112. The trays 111, 112 are substantially identical in shape to each other, except that they have differently shaped and positioned steps 111b, 112b on side edges which can be engaged by a fingertip of the user when pulling the trays out of the case 109.

Figure 20:
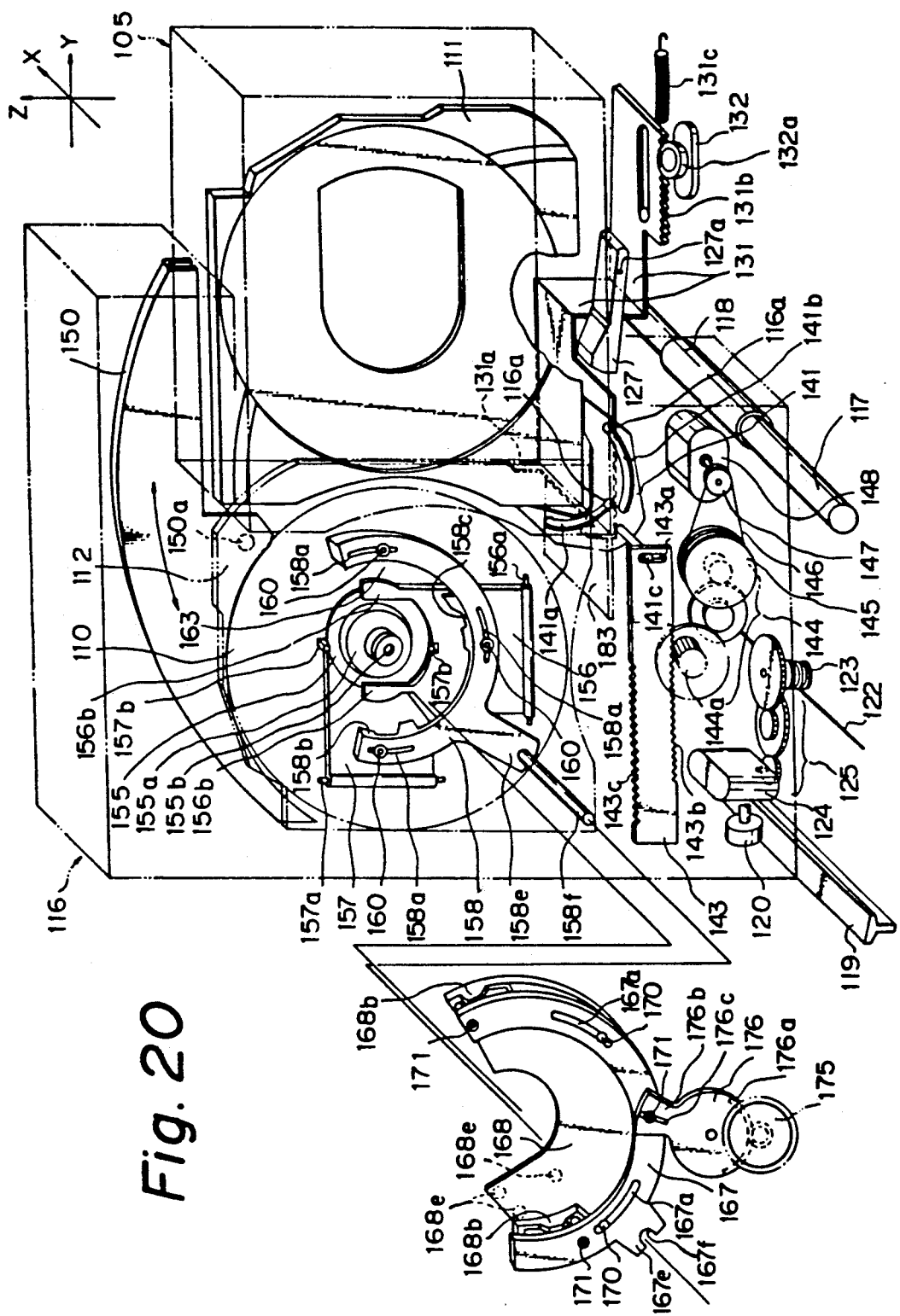
Figure 21A:
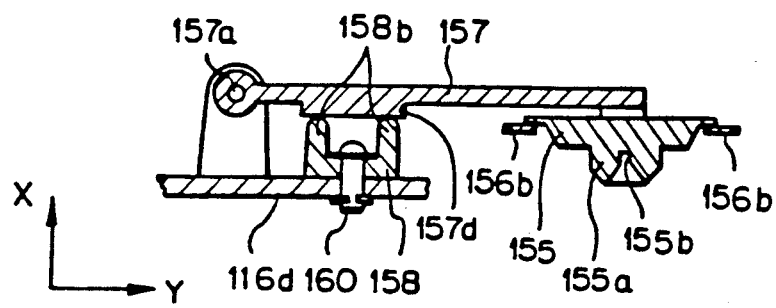
Figure 21B:
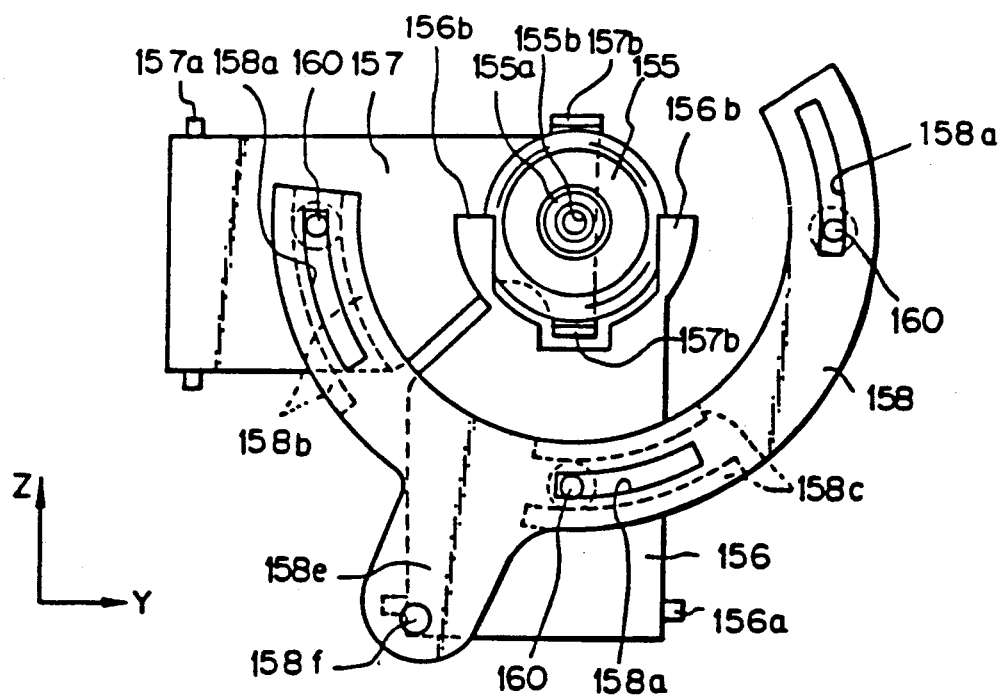

As shown in FIGS. 15 through 17, a movable chassis 116 is disposed in the subhousing 102 and guided on a guide shaft 117 for horizontal movement in the direction in which the magazines 105 are arrayed. The movable chassis 116 supports thereon a playback means and a disc moving means, both of which will be described later on. As also shown in FIG. 20, a boss 118 is fixedly mounted in a front lower end portion of the movable chassis 116 and smoothly movably fitted over the guide shaft 117. A rail 119 is disposed in the subhousing 102 parallel to the guide shaft 117, and a roller 120 rotatably mounted on a rear lower end portion of the movable chassis 116 is rollingly supported on the rail 119. As illustrated in FIGS. 15, 16, and 20, a wire 122 which is kept taut is disposed in the subhousing 102 and extends in the direction in which the movable chassis 116 is movable. As shown in FIG. 16, the wire 122 is attached at one end to the subhousing 102 by a hook 122a and tensioned by a coil spring 122b connected to the other end of the wire 122 and attached to the subhousing 102 by another hook 122a. The wire 122 is trained around and bent by a pulley 122c near the coil spring 122b. The wire 122 is wound around a small pulley 123 rotatably mounted on a lower end portion of the movable chassis 116. The small pulley 123 can be rotated about its own axis by a motor 124 through a gear transmission mechanism 125 for moving the movable chassis 116 along the guide shaft 117 and the rail 119.

The guide shaft 117, the boss 118, the rail 119, the roller 120, the wire 122, the hook 122a, the coil spring 122b, the pulley 122c, the small pulley 123, the motor 124, and the gear transmission mechanism 125 jointly serve as a guiding and driving means for carrying the movable chassis 116 movably in the direction of the array of the magazines 105 and driving the movable chassis 116.

Locking means for locking the magazines in inserted positions in the subhousing 102, and ejecting means for unlocking the magazines will be described below. These locking means and ejecting means are provided respectively in association with the ten magazines 105.

As shown in FIGS. 17 and 18(b), the case 109 of each magazine 105 has a recess 105a of a rectangular cross section which is defined in a side thereof. As shown in FIGS. 17 and 20, a horizontal panel extension 102d extends from a lower portion of the front panel 102a of the subhousing 102 into the subhousing 102. A locking finger 127 having a free end engageable in the recess 105a in the case 109 for locking the magazine 105 in its inserted position is swingably mounted on a support pin 127a supported on the horizontal panel extension 102d. The locking finger 127 is normally urged into the recess 105a by a spring 127b installed as an urging means on the support pin 127a. The locking finger 127 is also shown in FIG. 15.

As shown in FIGS. 15 through 17, a movable case 128 is disposed in the subhousing 102 below the locking finger 127, and guided by a guide shaft 129a for movement in the horizontal direction in which the magazines 105 are arrayed. A solenoid plunger 130 serving as a single releasing means is mounted on the movable case 128 for causing a rod 130a to engage the free end of the locking finger 127 and disengaging the locking finger 127 from the magazine 105. A boss 128a is fixedly mounted in a front end portion of the movable case 128, and is smoothly movably fitted over the guide shaft 129a. A pulley 128b mounted on the rear end of the movable case 128 is rotatable by a motor (not shown) disposed in the movable case 128. A wire 129b is kept taut and extends in the subhousing 102 in the direction in which the movable case 128 is movable. As shown in FIG. 15, the wire 129b has opposite ends secured to the subhousing 102 by means of respective hooks 129c. The wire 129b is tensioned by a coil spring 129d coupled to one end thereof, and is trained around and bent by a pulley 129e near the coil spring 129d. The wire 129b is wound around a pulley 128b on the movable case 128. When the motor in the movable case 128 is energized, therefore, the movable case 128 and hence the solenoid plunger 130 are moved along the guide shaft 129a.

An address plate 129h is disposed forwardly of the movable case 128. The address plate 129h has an array of ten slits 129g defined therein and arranged in the direction in which the movable case 128 is movable, the slits 129g being aligned respectively with the locking fingers 127. A photocoupler 128d is attached to the front end of the movable case 128 for detecting each of the slits 129h of the address plate 129h. A detected slit signal produced by the photocoupler 128d is sent to a controller including a counter for counting the detected slit signal. The controller detects the position of the movable case 128, i.e., the solenoid plunger 130 based on the count from the counter. As shown in FIG. 16, a detector switch 128e is disposed in a lefthand end portion of the subhousing 102 for engaging the reciprocally movable case 128 to detect when the movable case 128 is in a limit or home position.

The motor (not shown) in the movable case 128, the pulley 128b, the wire 129b, the hooks 129c, the coil spring 129d, the pulley 129e, the address plate 129h, the photocoupler 128d, and the detector switch 128e jointly constitute a releasing means positioning means for positioning the releasing means, i.e., the solenoid plunger 130 which releases a desired magazine 105.

As shown in FIGS. 17 and 20, an ejecting plate 131 is disposed in the vicinity of each of the locking finger 127 for ejecting the magazine 105 out of the subhousing 102. The ejecting plate 131 is movable forwardly and rearwardly (i.e., in the direction of the arrow Y and the direction opposite thereto) on an panel extension 102d (FIG. 17) of the front panel 102a. The ejecting plate 131 and the locking finger 127 are provided in ten sets which are associated with the respective ten magazines 105. The ejecting plate 131 has an upward projection 131a on a rear end thereof for abutting against the rear end of the magazine 105. The ejecting plate 131 also has a rack 131b on a righthand side thereof, and a braking gear 132a of a damper 132 is held in mesh with the rack 131b. The damper 132 contains a viscous material such as grease and utilizes the viscous resistance of the viscous material for applying a braking force to the ejecting plate 131. The ejecting plate 131 is normally urged in a direction to eject the magazine 105 by a coil spring 131c.

As shown in FIG. 17, an indicator element in the form of a light-emitting diode 135a is mounted on an upper front end of the movable chassis 116 by a column-shaped elongate intermediate member 134, and a lens 135b for converging light emitted from the light-emitting diode 135a is attached to the intermediate member 134 in covering relation to the light-emitting diode 135a. As also illustrated in FIGS. 14 through 16, the front panel 102a of the subhousing 102 has a narrow opening 102e defined therein in the direction in which the movable chassis 116 is movable, i.e., in the direction in which the magazines 105 are arrayed. The light-emitting diode 135a faces the opening 102e so that light emitted from the light-emitting diode 135a can be visually checked through the opening 102e. The opening 102e is closed by a light-transmissive member 102f to prevent dust or other foreign matter from entering the subhousing 102 through the opening 102e. The indicator element may be an ordinary electric lamp or a liquid crystal display.

As shown in FIGS. 15, 17, and 20, an ejector member 141 is mounted on a lower portion of the front end of the movable chassis 116 for engaging one at a time of the trays 111, 112 in a magazine 105 and ejecting the engaged tray out of the case 109 of the magazine 105. The ejector member 141 is in the shape of an L and has two arcuate guide grooves 141a, 141b defined therein and having different radii of curvature. The ejector member 141 is guided in its movement by a pair of pins 116a projecting on the movable chassis 116 and slidably engaging the respective guide grooves 141a, 141b. The ejector member 141 is angularly movable about the center of curvatures of the arcuate guide grooves 141a, 141b for causing fingers on the opposite ends of the ejector member 141 to eject and store the tray 111 or 112 out of and into the case 109. The center of rotation of the ejector member 141 (i.e., the center of curvature of the arcuate guide grooves 141a, 141b) is aligned with the central axis about which the trays 111, 112 are rotatable (i.e., the support shaft 109a shown in FIGS. 18(a) and 18(b)). The trays 111, 112 are pushed by the ejector member 141 at their portions near the support shaft 109a.

As shown in FIGS. 15 and 20, an elongate movable member 143 is disposed in the vicinity of the ejector member 141 and mounted on the movable chassis 116 for reciprocable movement in the back and forth or forward and rearward directions (i.e., in the direction of the arrow Y and the direction opposite thereto). The movable member 143 has a vertical slot 143a defined in the front end thereof, and a pin 141c mounted on the ejector member 141 slidably rides in the vertical slot 143a. The movable member 143 also has a rack 143b on its lower edge. The movable member 143 can reciprocally be moved by a motor 148 through a gear transmission mechanism 144 including a pinion 144a meshing with the rack 143b, a large pulley 145 coupled to a first gear of the gear transmission mechanism 144, and a belt 146 trained around the large pulley 145 and a small pulley 147 mounted on the output shaft of the motor 148. The movable member 143 is thus movable back and forth by rotating the motor 148 in one direction and the other. As shown in FIGS. 15, 17, and 20, a tray guide member 150 is mounted in the movable chassis 116 for guiding one of the trays 111, 112 in sliding contact with the tray which is ejected out of or stored into the case 109 of a magazine 105.

The ejector member 141, the movable member 143, the gear transmission mechanism 144, the large pulley 145, the belt 146, the small pulley 147, and the motor 148 jointly serve as a disc moving means for moving a disc 110 between the magazine 105 and the playback means.

The playback means supported in the movable chassis 116 for playing back a disc ejected from one of the magazines 105 includes a turntable, an optical pickup, and a disc clamping mechanism, and is movable in the horizontal direction in which the magazines 105 are arrayed. As shown in FIG. 15, the movable chassis 116 has three upstanding panels 116c, 116d, 116e juxtaposed in the horizontal direction. To the righthand upstanding panel 116c, there is attached a spindle motor 153 for directly rotating a turntable 152 (see FIG. 16). There are also mounted on the upstanding panel 116c an optical pickup (not shown) for reading recorded information from the disc 110, and a pickup driving means (not shown) for moving the optical pickup along the recording surface of the disc 110.

A disc clamping mechanism is mounted on the central and lefthand upstanding panels 116d, 116e. As illustrated in FIGS. 15 through 17 and 20 through 21(b), the disc clamping mechanism has a disc-shaped presser 155 for pressing the disc 110 ejected from the magazine 105 against the disc carrying surface of the turntable 152 (see FIG. 16), clamping plates 156, 157 with the presser 155 being rotatably supported at its front and rear surfaces by the clamping plates 156, 157, and an arcuate clamping cam member 158 held in sliding contact with the clamping plates 156, 157 for driving the clamping plates 156, 157. The clamping plate 156 is swingably attached to the upstanding panel 116e by a support shaft 156a. The clamping plate 157 is swingably attached to the upstanding panel 116d by a support shaft 157a. The clamping plates 156, 157 have projections 156b, 157b on free ends thereof which are slidably held against the outer periphery of the presser 155. The clamping plates 156, 157 are swingable in respective planes normal to the disc carrying surface of the turntable 152.

The clamping cam member 158 has three slots 158a defined therein and each extending along the arcuate shape of the clamping cam 158. The clamping cam member 158 is angularly movable about the center of curvature thereof while being guided by three support pins 160 mounted on the upstanding panel 116d and slidably engaging in the respective slots 158a. The clamping cam member 158 has cams 158b, 158c disposed one on each side of two of the slots 158a, and projections 156d, 157d on the clamping plates 156, 157 are held in smooth sliding contact with cam surfaces of the cams 158b, 158c. The clamping plates 156, 157 are normally urged against the clamping cam member 158 by an urging means (not shown) comprising a spring. As shown in FIG. 20, the cam surface of the cam 158b of the clamping cam member 158 is composed of three continuous surfaces including an intermediate surface, a lower surface, and a higher surface which are arranged in the order named, and the cam surface of the cam 158c is composed of three continuous surfaces including a higher surface, a lower surface, and an intermediate surface which are arranged in the order named.

The clamping plates 156, 157 are referred to as a presser support mechanism. The disc-shaped presser 155 is supported by the presser support mechanism for rotation and movement in a direction normal to the disc carrying surface of the turntable 152 (FIG. 16). The presser support mechanism, the presser 155, and the clamping cam member 158 jointly constitute a disc clamping mechanism.

A disc pressing means for mounting the disc 110 on the turntable 152 in cooperation with the disc clamping mechanism is installed on the righthand upstanding panel 116c disposed parallel to the other upstanding panels 116d, 116e on which the disc clamping mechanism is held. The disc pressing means will hereinafter be described.

As shown in FIGS. 15, 20, 22(a), and 22(b), the disc pressing means has an arcuate rotary member 167 similar in shape to the clamping cam member 158, and a substantially arcuate plate-like abutment member 168 drivable by the rotary member 167 to abut against the disc 110 ejected from the magazine 105.

The rotary member 167 has two arcuate slots 167a defined therein and extending along the arcuate shape of the rotary member 167. The rotary member 167 is angularly movable about the center of curvature thereof while being guided by two support pins 170 mounted on the upstanding panel 116c and slidingly engaging in the slots 167a. The abutment member 168 is positioned concentrically with the rotary member 167 and held in sliding engagement with the support pins 170 for reciprocating movement only in the direction in which the support pins 170 project. The support pins 170 extend perpendicularly to the disc carrying surface of the turntable 152, so that the abutment member 168 is movable perpendicularly to the disc carrying surface of the turntable 152. The abutment member 168 has three substantially equidistantly spaced cams 168b having respective cam surfaces 168c against which respective projections 167c of the rotary member 167 are smoothly slidably held.

The abutment member 168 has three slots 168d defined therein and surrounded respectively by the cams 168b. Pins 171 inserted through respective holes defined in the projections 167c of the rotary member 167 slidably engage in the respective slots 168d. As shown in FIG. 22(b), an urging means comprising a coil spring 172 is disposed between the head of each pin 171 and the rotary member 167 for normally urging the abutment member 168 toward the rotary member 167. As shown in FIGS. 15, 20, and 22(b), each of the cam surfaces 68c of the cams 168b is composed of three continuous surfaces, i.e., a lower surface, an intermediate surface, and a higher surface.

As illustrated in FIG. 20, pads 168e made of felt or the like are attached to the surface of the abutment member 168 which will contact the disc 110. Likewise, a pad 150a made of felt or the like is attached to the surface of the tray guide member 150 for contact with the disc 110 and the trays 111, 112.

As shown in FIGS. 15, 20, and 22(a), the movable member 143 for turning the ejector member 141 to eject the trays 111, 112 from the magazines 105 also has a rack 143c on its upper edge which is held in mesh with a pinion 175 positioned near the rotary member 167. The pinion 175 is held in mesh with a gear 176a of a gear cam 176 having a radial extension 176b with a slot 176c defined therein and slidably receiving therein one of the pins 171 on the rotary member 167. When the movable member 143 is reciprocally moved by the motor 148, the rotary member 167 is rotated to move the abutment member 168 in the horizontal directions (i.e., in the direction of the arrow X and the direction opposite thereto).

The motor 148, the gear cam 176, and a series of operatively coupled members therebetween jointly serve as a drive force imparting means for imparting a drive force to the rotary member 167. The rotary member 167, the drive force imparting means, and small parts associated therewith jointly constitute a supporting and driving means for supporting the abutment member 168 and moving the abutment member 168 in a direction normal to the disc carrying surface of the turntable 152 (FIG. 16). The supporting and driving means and the abutment member 168 jointly provide a disc pressing means for cooperating with the disc clamping mechanism (described above) in gripping a disc 110 ejected from a magazine 105 and mounting the disc 110 on the turntable 152.

As shown in FIGS. 15, 17, 20, and 21(b), the arcuate clamping cam member 158 includes a radially outward extension 158e on its outer periphery with a horizontal shaft 158f mounted thereon. The arcuate rotary member 167 also has a radially outward extension 167e on its outer periphery which has a U-shaped recess 167f with the shaft 158f smoothly engaging therein. Therefore, the rotary member 167 is angularly moved by the supporting and driving means to move the presser 155. Both the presser 155 and the abutment member 168 can thus be driven by the single drive source, i.e., the motor 148. As a result, the number of drive sources required in the disc player is reduced.

Figure 23A:
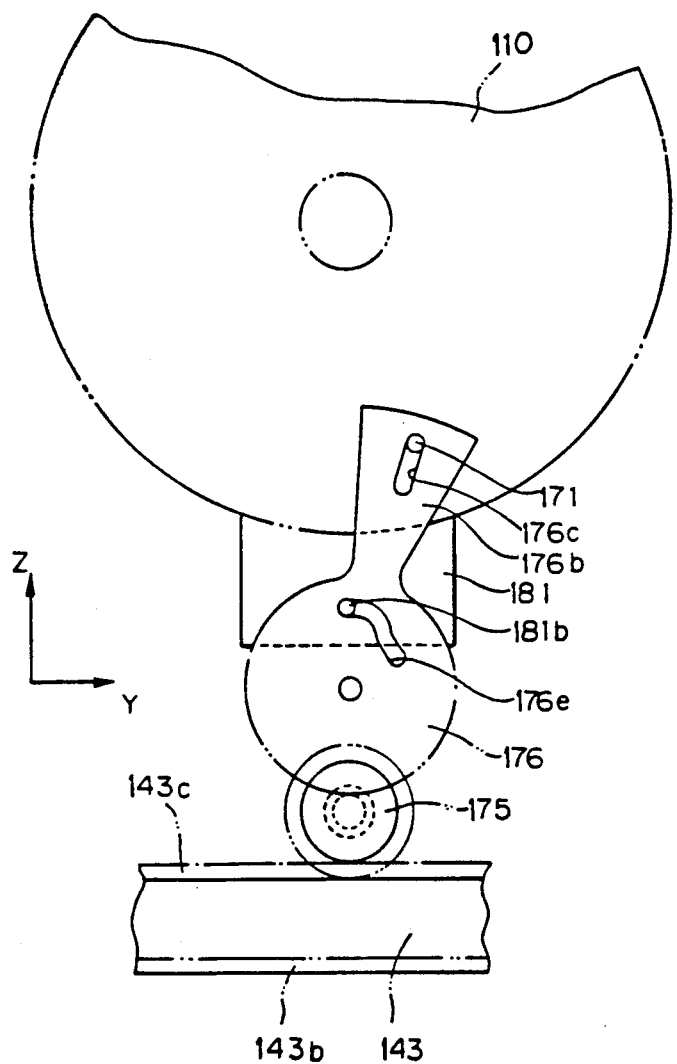
Figure 23B:
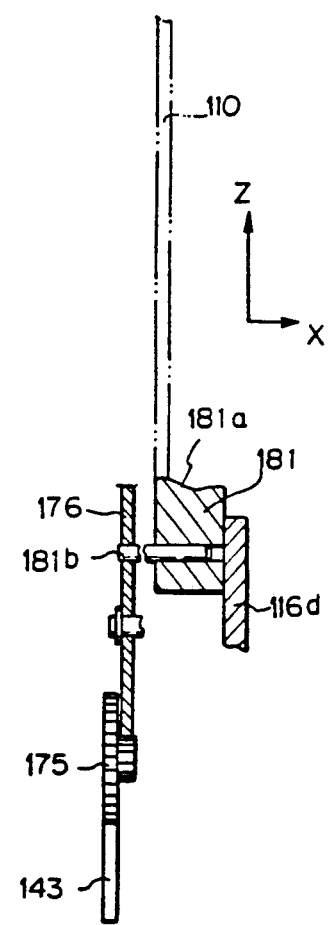

As shown in FIGS. 23(a) and 23(b), a disc guide member 181 is vertically movably mounted on the rear surface of the central upstanding panel 116d (FIG. 15). The disc guide member 181 has a guide surface 181a for slidingly contacting the lower end of the disc 110 ejected from the magazine 105 and guiding the disc 110 to a position in which it can be mounted on the turntable 152 (FIG. 16). A pin 181b is mounted in the disc guide member 181 and smoothly engages in a cam groove 176e defined in the gear cam 176. The disc 110 ejected with the tray 111 or 112 out of the magazine 105 is gripped by the disc clamping mechanism and the disc pressing means, and delivered a horizontal direction normal to the disc carrying surface of the turntable 152 as the gear cam 176 rotates, so as to be mounted on the disc carrying surface. When the disc 110 is thus delivered, the disc guide member 181 is brought into and out of engagement with the lower end of the disc 110 by the cam groove 176e. The cam groove 176e of the gear cam 176 is shaped such that it holds the disc guide member 181 in contact with the disc 110 while the disc 110 is being delivered, and it moves the disc guide member 181 away from the disc 110 after the disc 110 has been mounted on the turntable 152.

A guiding means including the upstanding panel 116d and supporting the disc guide member 181 for guiding the disc guide member 181 vertically (i.e., in the direction of the arrow Z and the direction opposite thereto), and the drive force imparting means including the motor 148, the gear cam 176, and a series of members therebetween for imparting a drive force to the disc guide member 181, jointly constitute a disc guide member driving means for supporting and moving the disc guide member 181. The disc guide member driving means thus provided is effective to prevent the disc 110 which is being delivered from being positionally displaced radially due to gravity, and allows the disc 110 to be mounted and clamped reliably and highly accurately on the turntable 152.

As shown in FIGS. 15 through 17, 20, 21(a), and 21(b), the presser 155 for clamping the disc 110 has a pin 155a for being fitted into the central hole of the disc 110. The turntable 152 has a centering projection for being fitted into a recess 155b defined centrally in the pin 155a. The pin 155a is also effective in preventing the disc 110 which is being delivered from being positionally displaced.

As shown in FIGS. 17, 20, and 24, a rearwardly extending plate-like detectable member 183 is integrally formed with the rear end of each of the ejecting plates 131 which eject the respective magazines 105 out of the subhousing 102. As illustrated in FIG. 24, each of the detectable members 183 has light-shielding portions 183a, 183b on its distal end. As also shown in FIG. 25, three photocouplers 184a, 184b, 184c as sensors are positioned in association with the light-shielding portions 183a, 183b, and mounted on the movable chassis 116 for movement therewith. Since the detectable members 183 are fixedly supported on the ejecting plates 131, when the magazines 105 are not inserted in the subhousing 102, the detectable members 183 are not in a position detectable by the photocouplers 184a through 184c, but are in a non-detectable position forward of the detectable position.

As shown in FIG. 24, the light-shielding portions 183a, 183b of the detectable members 183 are arrayed in the direction in which the movable chassis 116 is movable, i.e., in the horizontal direction in which the magazines 105 are arrayed, and are aligned with positions for storing discs 110 in the loaded magazines 105. The light-shielding members 183a, 183b serve to provide a disc position indicator for indicating, in three bits, the position of each disc in the loaded magazines 105, and the photocouplers 184a through 184c serve as a disc position indicator detecting means for detecting the light-shielding members 183a, 183b. The disc position indicator and the disc position indicator detecting means are however not limited to the illustrated arrangements, but may be of any of various structures. The disc position indicator should preferably be of an optical pattern.

As shown in FIG. 24, the six discs stored in a magazine 105, i.e., the trays 111, 112 disposed therein, are successively numbered (1) through (6) in the rightward direction. A detected signal produced by the three photocouplers 184a through 184c with respect to the disc (1) is represented by "001". Similarly, detected signals produced with respect to the discs (2) through (6) are represented respectively by "010", "101", "011", "110", and "100". These detected signals are sent to the controller (described later). Since the detectable members 183 move with the ejecting plates 131 that are reciprocally moved upon insertion and removal of the magazines 105, the detected signal "001" which indicates the stored position of the first disc, for example, in the magazine can be used as a magazine presence/absence detecting signal for indicating whether the magazine 105 is loaded or not. The magazine presence/absence detecting signal is sent to the controller, which counts the signal and determines the position where the movable chassis 16 is stopped, based on the count. At this time, a detector switch 186 shown in FIG. 16 is used for detecting when the movable chassis 116 has reached a limit or home position, in engagement with the movable chassis 116.

The photocouplers 184a through 184c and the detectable members 183 jointly constitute a playback means position detecting means for detecting when the movable chassis 116 supporting the playback means has reached a position aligned with a selected disc 100 and for stopping the movable chassis 116. The guiding and driving means for moving the movable chassis 116 as described above and the playback means position detecting means jointly serve as a positioning means for positioning the playback means in the direction in which the magazines 105 are arrayed.

Figure 27:
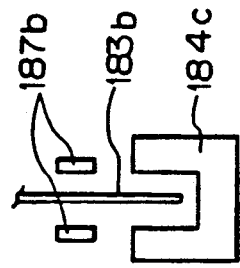
Figure 26:
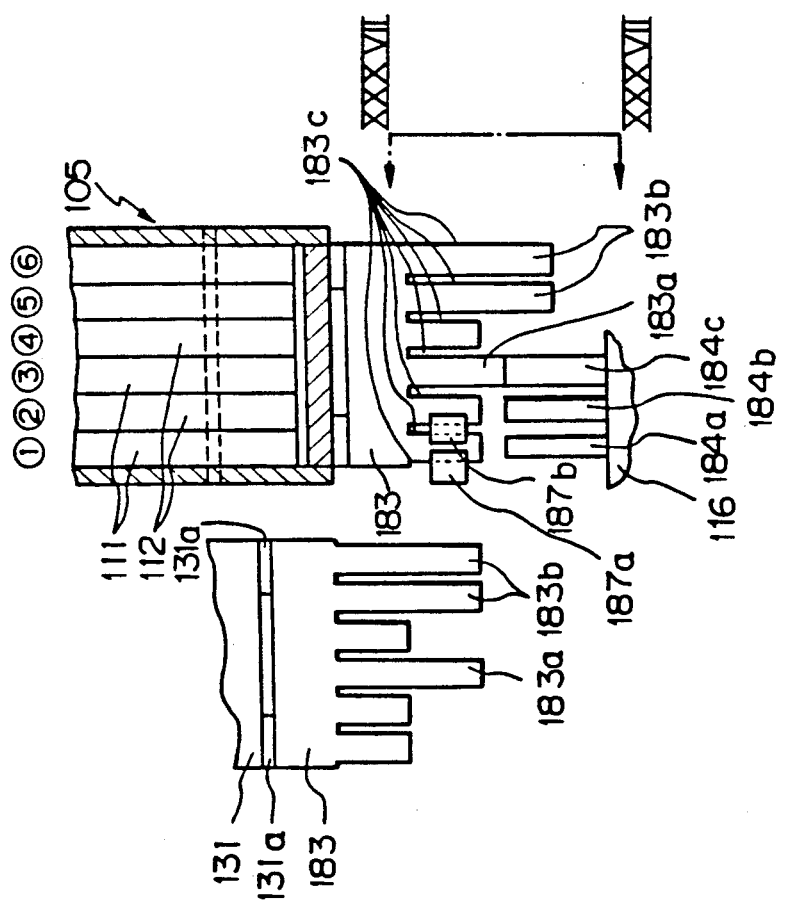

FIG. 26 illustrates a modified playback means position detecting means. Each of detectable members 183 which has light-shielding portions 183a, 183b has slits 183c aligned with intermediate positions between the stored positions of the discs in the magazine 105. As also shown in FIG. 27, two photocouplers 187a, 187b are positioned for cooperation with these slits 183c and mounted on the movable chassis 116 on which other photocouplers 184a through 184c are also mounted. When the centers of the optical axes of the two photocouplers 187a, 187b are aligned with respective two slits 183c, the position of one disc is detected. Thus, the stored position of the disc can be detected highly accurately.

Operation of the magazine disc player of the above structure will be described below further with reference to FIGS. 28 through 31(d).

First, the control assembly 103 shown in FIGS. 14 and 28 is operated to specify a disc 110 to be played back. The controller or CPU shown in FIG. 28 applies a drive voltage to the motor 124 to move the movable chassis 116 with the playback means thereon in a leftward direction (forward) or a rightward direction (rearward) until the ejector member 141 reaches a position to engage the tray 111 or 112 carrying the disc 110 to be played back.

The movable chassis 116 and hence the playback means are moved and positioned as follows:

A DCNT signal shown in FIGS. 29 and 30 is a detected signal generated by the photocouplers 184a through 184c, and a DCHM signal is a detected signal generated by the detector switch 186 when the movable chassis 116 is in its limit position or home position. As shown in FIG. 29, if there is a movement command while the photocoupler 184a through 184c are generating a DCNT signal, the movable chassis 116 is moved a distance corresponding to the difference between a present address (present MAG: magazine) and a desired address (search MAG). If there is a movement command when no DCNT signal is generated by the photocouplers 184a through 184c, the movable chassis 116 is moved in the forward direction (leftward: the direction of the arrow X) until a DCHM signal is generated by the detector switch 186, and thereafter the movable chassis 116 is moved to the position of a desired address (search MAG).

The movable chassis 116 is then moved slightly to the position corresponding to a target disc.

Figure 31A:
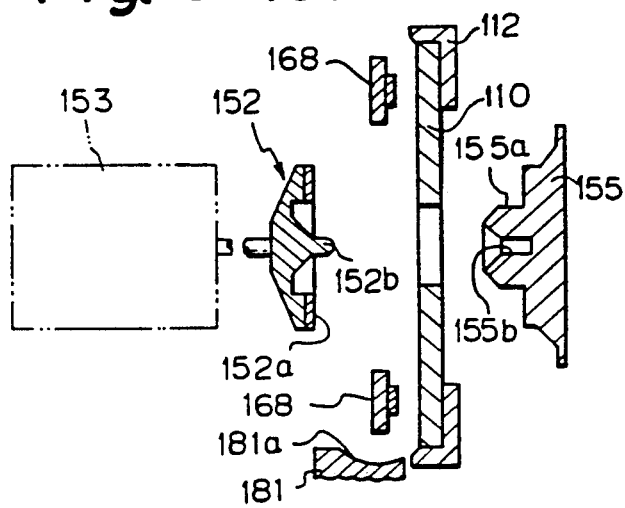
FIGS. 31(a) through 31(d) are cross-sectional views showing operation of the magazine disc player shown in FIGS. 14 through 27.

When the ejector member 141 reaches a position to engage the tray carrying the disc 110 to be played back, the motor 148 is energized to cause the movable member 143 to turn the ejector member 141. The tray (e.g., tray B 112) carrying the disc 110 to be played back is ejected from the case 109 of the magazine 105, and the disc 110 is moved into a position concentric with the disc carrying surface of the turntable 152, i.e., into a position directly laterally of the disc carrying surface, as shown in FIG. 31(a).

Figure 31C:
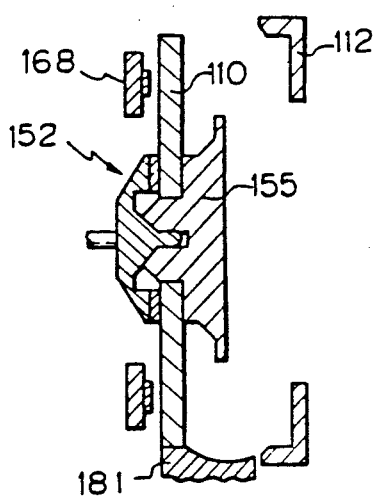
Figure 31B:
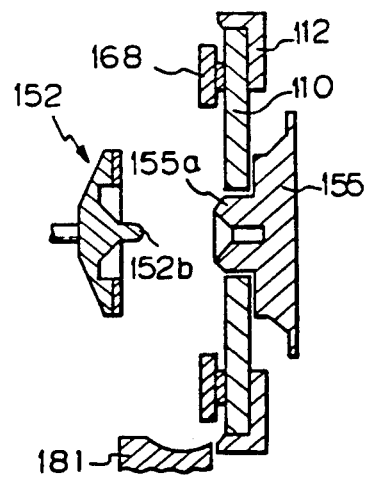
Figure 31D:
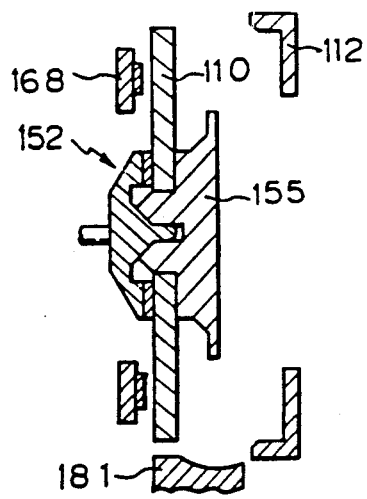

At the same time that the disc 110 is ejected by the movable member 143, the clamping cam member 158 and the abutment member 168 are rotated by the movable member 143. As illustrated in FIG. 31(b), the abutment member 168 is moved toward the presser 155 of the disc clamping mechanism by the cams 168b to grip the disc 110 between the presser 155 and the abutment member 168. Thereafter, as shown in FIGS. 31(c) and 31(d), the disc 110 is mounted on the turntable 152, while being gripped between the presser 155 and the abutment member 168, by the cams 168a of the abutment member 168 and the cams 158b of the clamping cam member 158. Then, the abutment member 168 is moved away from the disc 110, which is clamped by the presser 155. When the disc 110 ejected from the magazine 105 is delivered horizontally, the disc guide member 181 is slidingly held against the lower end of the disc 110, and the pin 155a of the presser 155 is fitted in the central hole of the disc 110, as shown in FIGS. 31(b) and 31(c), to prevent the disc 110 from being positionally displaced. The disc 110 installed on the turntable 152 is thus highly accurately centered with respect to the center of rotation of the turntable 152 by the centering projection 152b of the turntable 152 which engages in the recess 155b in the presser 155. Thereafter, the disc guide member 181 is moved away from the disc 110 as shown in FIG. 31(b).

The disc 110 can now be played back. The turntable 152 and the optical pickup (not shown) are then operated to start playing back the disc 110.

After the disc 110 has been played back, the disc 110 is stored back into the magazine 105 in a process which is the reversal of the above disc loading process. The above operation is repeated as many times as the number of musics specified to be played back.

A magazine 105 can be ejected out of the subhousing 102 and hence the disc player by pushing an eject button in the control assembly 103 shown in FIG. 14. When a magazine to be ejected is specified by operating the control assembly 103, the desired magazine is searched for by the photocoupler 128d, the address plate 129h, and the detector switch 128e, and the solenoid plungers 130 as the ejecting means is moved to a position to engage the locking finger 127 which locks the magazine. The solenoid plunger 130 can be positioned in the same manner as the movable chassis 116 is positioned.

A magazine disc player according to a third embodiment of the present invention will be described below.

As shown in FIG. 32, a magazine disc player according to the first embodiment includes a separable player housing assembly comprising a main housing 201 and a subhousing 202 separably inserted in the main housing 201. The main housing 201 has a front panel 201a having a horizontal opening 201b into which the subhousing 202 can be inserted, and supporting a control assembly 203 above the opening 201b for controlling operation of the disc player. Front, leftward, and upward directions with respect to the magazine disc player are indicated by the arrows Y, X, Z, respectively. The magazine disc player is suitable for use as a so-called "karaoke" disc player. The front panel 201a of the main housing 201 also has a coin slot 201c for inserting a coil therethrough to enable the magazine disc player to be operated, and a coin retrieval case 204 for retrieving inserted coins.

Figure 33:
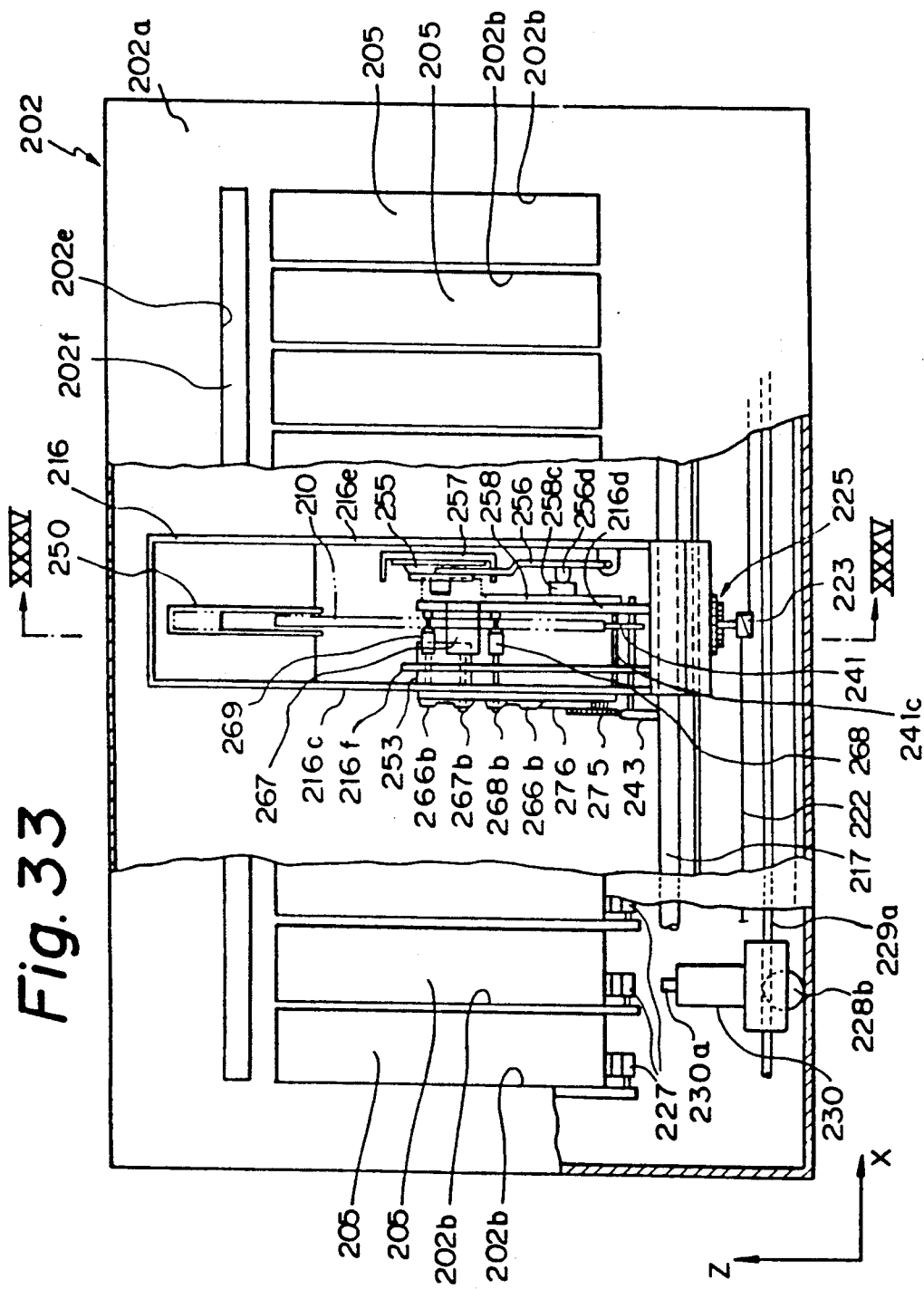

As illustrated in FIGS. 33 through 35, the subhousing 202 has a front panel 202a having a plurality (e.g., 10) of openings 202b for inserting disc magazines 205 therein. The openings 202b extend vertically and are defined as a horizontal array.

Figure 36A:
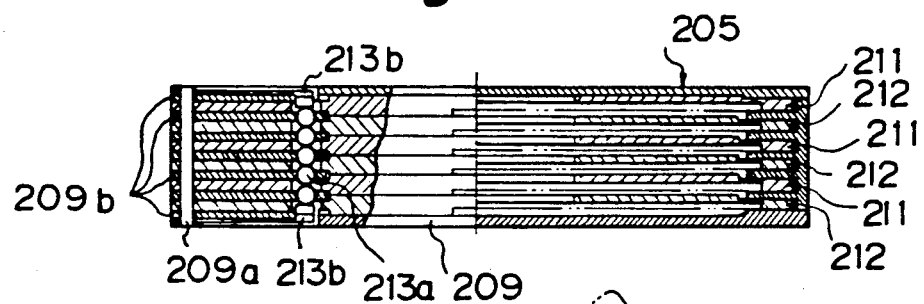
FIGS. 36(a), 36(b), and 37 are views showing magazines in detail.
Figure 36B:
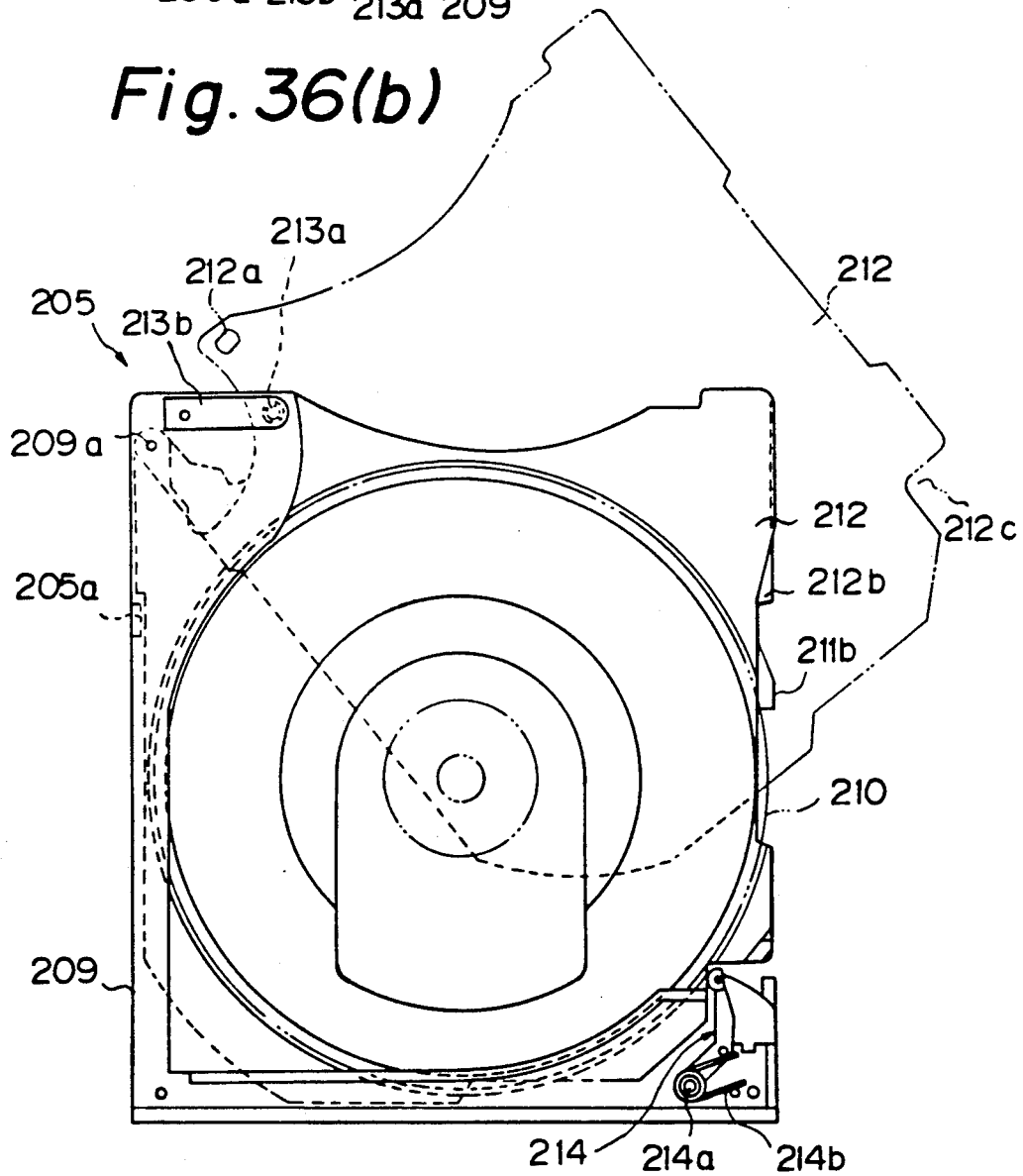

As shown in FIGS. 36(a) and 36(b), each of the disc magazines 205 has a case 209 in the shape of a flat rectangular parallelepiped, and a total of six trays, i.e., three rectangular trays A 211 and three rectangular trays B 212, each for carrying a disc 210 in its principal plane. The discs 210 carried in the respective trays 211, 212 are stored at predetermined pitches as a horizontal array in lateral directions (i.e., in the direction of the arrow X and the direction opposite thereto) with the recording surfaces of the discs 110 being directed vertically. The trays A 211 and the trays B 212 are rotatably mounted on a support shaft 209a supported on a corner of the case 209 and extending across the trays along the array thereof, so that the trays can be stored into and projected out of the case 209 along their principal planes.

Figure 37:
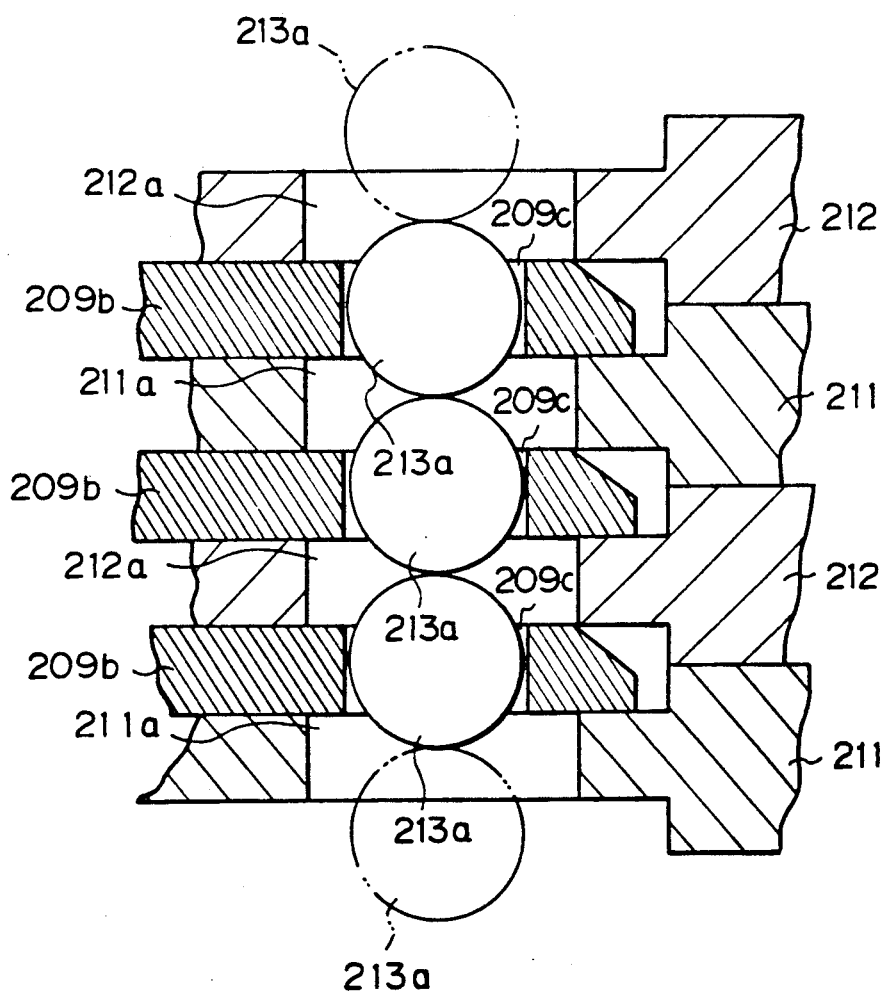

The magazine 205 will be described in greater detail. The case 209 of the magazine 205 has seven partitions 209b with the trays A 211 and the trays B 212 being disposed between these partitions 209b. As shown in FIG. 37, the partitions 209b have respective small circular holes 209c defined coaxially therein near the support shaft 209a. The trays 211, 212 also have openings 211a, 212a, respectively, defined therein at positions capable of confronting the openings 209c. Five movable spherical elements 213a are disposed in the openings 209c, 211a, 212a, the spherical elements 213a being movable in directions across the partitions 209b. The spherical elements 113a have a diameter equal to the pitch of the alternately positioned trays 211, 212. The spherical elements 213a are normally urged against each other by a pair of leaf springs 213b disposed respectively in opposite walls of the case 209 at one end thereof.

As shown in FIG. 36(b), a presser lever 214 is disposed in an end of the case 209 and angularly movably mounted on the case 209 by a pin 214a at one end of the presser lever 214. The presser lever 214 has a free end which can smoothly engage the free ends of the trays 211, 212. The presser lever 214 is normally urged by a spring 214b to turn counterclockwise in FIG. 36(b) to press the trays 211, 212.

As shown in FIG. 36(b), the trays 211, 212 are substantially identical in shape to each other, except that they have differently shaped and positioned steps 211b, 212b on side edges which can be engaged by a fingertip of the user when pulling the trays out of the case 209.

Figure 38:
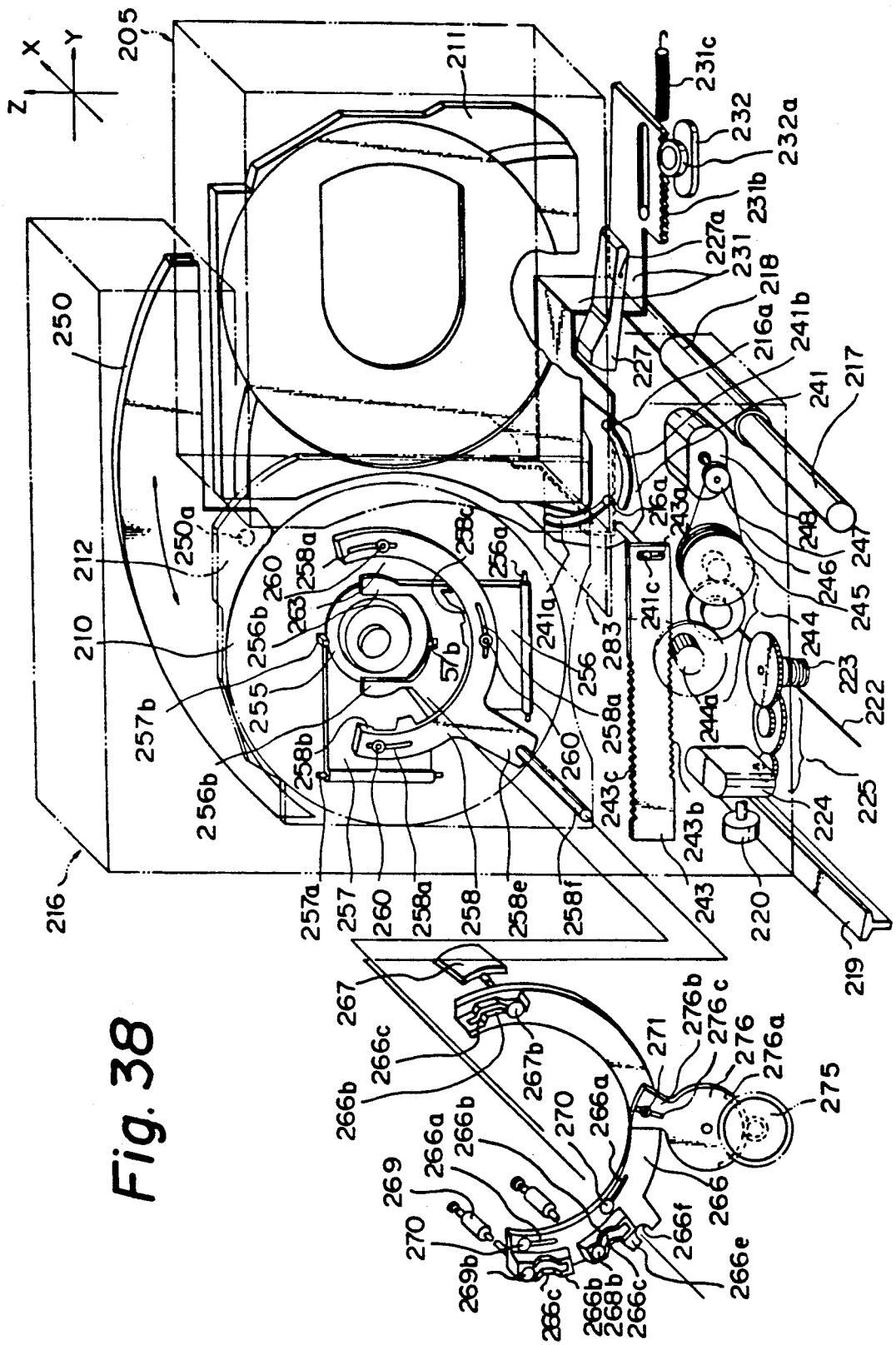
Figure 39A:
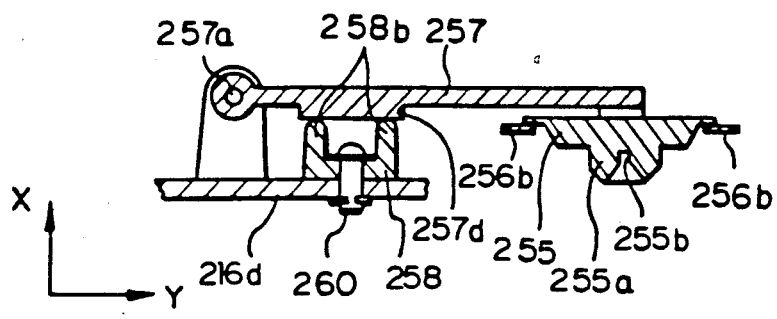
Figure 39B:
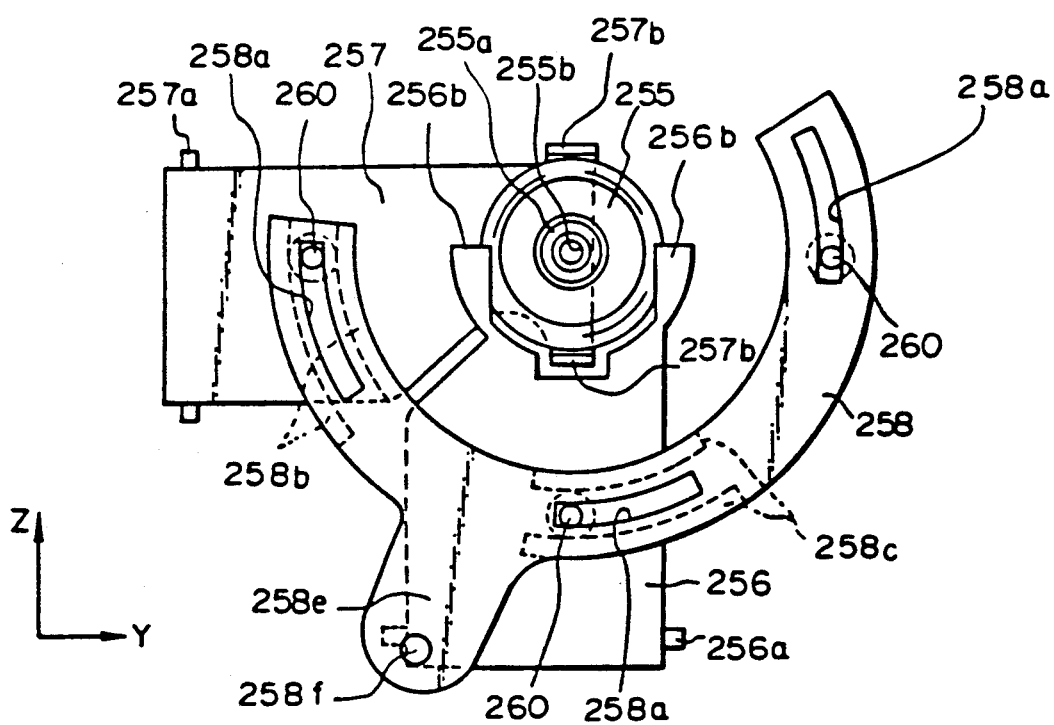

As shown in FIGS. 33 through 35, a movable chassis 216 is disposed in the subhousing 202 and guided on a guide shaft 217 for horizontal movement in the direction in which the magazines 205 are arrayed. The movable chassis 216 supports thereon a playback means and a disc moving means, both of which will be described later on. As also shown in FIG. 38, a boss 218 is fixedly mounted in a front lower end portion of the movable chassis 21 and smoothly movably fitted over the guide shaft 217. A rail 219 is disposed in the subhousing 202 parallel to the guide shaft 217, and a roller 220 rotatably mounted on a rear lower end portion of the movable chassis 216 is rollingly supported on the rail 219. As illustrated in FIGS. 33, 34, and 38, a wire 222 which is kept taut is disposed in the subhousing 202 and extends in the direction in which the movable chassis 216 is movable. As shown in FIG. 34, the wire 222 is attached at one end to the subhousing 202 by a hook 222a and tensioned by a coil spring 222b connected to the other end of the wire 222 and attached to the subhousing 202 by another hook 222a. The wire 222 is trained around and bent by a pulley 222c near the coil spring 222b. The wire 222 is wound around a small pulley 223 rotatably mounted on a lower end portion of the movable chassis 216. The small pulley 223 can be rotated about its own axis by a motor 224 through a gear transmission mechanism 225 for moving the movable chassis 216 along the guide shaft 217 and the rail 219.

The guide shaft 217, the boss 218, the rail 219, the roller 220, the wire 222, the hook 222a, the coil spring 222b, the pulley 222c, the small pulley 223, the motor 224, and the gear transmission mechanism 225 jointly serve as a guiding and driving means for carrying the movable chassis 216 movably in the direction of the array of the magazines 205 and driving the movable chassis 216.

Locking means for locking the magazines in inserted positions in the subhousing 202, and ejecting means for unlocking the magazines will be described below. These locking means and ejecting means are provided respectively in association with the ten magazines 205.

As shown in FIGS. 35 and 36(b), the case 209 of each magazine 205 has a recess 205a of a rectangular cross section which is defined in a side thereof. As shown in FIGS. 35 and 38, a horizontal panel extension 202d extends from a lower portion of the front panel 202a of the subhousing 202 into the subhousing 202. A locking finger 227 having a free end engageable in the recess 205a in the case 209 for locking the magazine 205 in its inserted position is swingably mounted on a support pin 227a supported on the horizontal panel extension 202d. The locking finger 227 is normally urged into the recess 205a by a spring 227b installed as an urging means on the support pin 227a. The locking finger 227 is also shown in FIG. 33.

As shown in FIGS. 33 through 35, a movable case 228 is disposed in the subhousing 202 below the locking finger 227, and guided by a guide shaft 229a for movement in the horizontal direction in which the magazines 205 are arrayed. A solenoid plunger 230 serving as an ejecting means is mounted on the movable case 228 for causing a rod 230a to engage the free end of the locking finger 227 and disengaging the locking finger 227 from the magazine 205. A boss 228a is fixedly mounted in a front end portion of the movable case 228, and is smoothly movably fitted over the guide shaft 229a. A roller 228b mounted on the rear end of the movable case 228 is rollingly placed on the bottom of the subhousing 202. The front panel 202a of the subhousing 202 has a narrow opening 202c defined in a lower portion thereof and extending in the direction in which the movable chassis 228 is movable. A manual knob 229 coupled to the movable case 228 projects out of the narrow opening 202c.

The movable case 228 and hence the solenoid plunger 230 can be moved by manually moving the manual knob 229.

As shown in FIGS. 34 and 35, there are ten block members 229e disposed on the bottom of the subhousing 202 in front of the movable case 228, the block members 229e being arrayed in the direction of movement of the movable case 228 and aligned with the locking fingers 227. In FIG. 35, a spherical element 228d and a coil spring 228e for biasing the spherical element 228d are mounted in the front end of the movable case 228. Each of the block members 229e has a spherical recess in which the spherical element 228d can engage. The solenoid plunger 230 can accurately be positioned in a position to engage each of the locking members 227 by the spherical element 228d engaging in the corresponding spherical recess in the block member 229e.

The manual knob 229, the block members 229e, the spherical element 228d, and the coil spring 228e jointly provide an ejecting means manual positioning means for manually positioning the solenoid plunger 230 as the ejecting means manually from outside of the subhousing 202.

As shown in FIGS. 35 and 38, an ejecting plate 231 is disposed in the vicinity of each of the locking fingers 227 for ejecting the magazine 205 out of the subhousing 202. The ejecting plate 231 is movable forwardly and rearwardly (i.e., in the direction of the arrow Y and the direction opposite thereto) on an panel extension 202d (FIG. 35) of the front panel 202a. The ejecting plate 231 and the locking finger 227 are provided in ten sets which are associated with the respective ten magazines 205. The ejecting plate 231 has an upward projection 231a on a rear end thereof for abutting against the rear end of the magazine 205. The ejecting plate 231 also has a rack 231b on a righthand side thereof, and a braking gear 232a of a damper 232 is held in mesh with the rack 231b. The damper 232 contains a viscous material such as grease and utilizes the viscous resistance of the viscous material for applying a braking force to the ejecting plate 231. The ejecting plate 231 is normally urged in a direction to eject the magazine 205 by a coil spring 231c.

As shown in FIG. 35, an indicator element in the form of a light-emitting diode 235a is mounted on an upper front end of the movable chassis 216 by a column-shaped elongate intermediate member 234, and a lens 235b for converging light emitted from the light-emitting diode 235a is attached to the intermediate member 234 in covering relation to the light-emitting diode 235a. As also illustrated in FIGS. 32 through 34, the front panel 202a of the subhousing 202 has a narrow opening 202e defined therein in the direction in which the movable chassis 216 is movable, i.e., in the direction in which the magazines 205 are arrayed. The light-emitting diode 235a faces the opening 202e so that light emitted from the light-emitting diode 235a can be visually checked through the opening 202e. The opening 202e is closed by a light-transmissive member 202f to prevent dust or other foreign matter from entering the subhousing 202 through the opening 202e. The indicator element may be an ordinary electric lamp or a liquid crystal display.

As shown in FIGS. 33, 35, and 38, an ejector member 241 is mounted on a lower portion of the front end of the movable chassis 216 for engaging one at a time of the trays 211, 212 in a magazine 205 and ejecting the engaged tray out of the case 209 of the magazine 205. The ejector member 241 is in the shape of an L and has two arcuate guide grooves 241a, 241b defined therein and having different radii of curvature. The ejector member 241 is guided in its movement by a pair of pins 216a projecting on the movable chassis 216 and slidably engaging the respective guide grooves 241a, 241b. The ejector member 241 is angularly movable about the center of curvatures of the arcuate guide grooves 241a, 241b for causing fingers on the opposite ends of the ejector member 241 to eject and store the tray 211 or 212 out of and into the case 209. The center of rotation of the ejector member 241 (i.e., the center of curvature of the arcuate guide grooves 241a, 241b) is aligned with the central axis about which the trays 211, 212 are rotatable (i.e., the support shaft 209a shown in FIGS. 36(a) and 36(b)). The trays 211, 212 are pushed by the ejector member 241 at their portions near the support shaft 209a.

As shown in FIGS. 33 and 38, an elongate movable member 243 is disposed in the vicinity of the ejector member 241 and mounted on the movable chassis 216 for reciprocable movement in the back and forth or forward and rearward directions (i.e., in the direction of the arrow Y and the direction opposite thereto). The movable member 243 has a vertical slot 243a defined in the front end thereof, and a pin 241c mounted on the ejector member 241 slidably rides in the vertical slot 243a. The movable member 243 also has a rack 243b on its lower edge. The movable member 243 can reciprocally be moved by a motor 243 through a gear transmission mechanism 244 including a pinion 244a meshing with the rack 243b, a large pulley 245 coupled to a first gear of the gear transmission mechanism 244, and a belt 246 trained around the large pulley 245 and a small pulley 247 mounted on the output shaft of the motor 248. The movable member 243 is thus movable back and forth by rotating the motor 248 in one direction and the other. As shown in FIGS. 33, 35, and 38, a tray guide member 250 is mounted in the movable chassis 216 for guiding one of the trays 211, 212 in sliding contact with the tray which is ejected out of or stored into the case 209 of a magazine 205. A pad 250a made of felt or the like is attached to the surface of the tray guide member 250 for contact with the trays 211, 212.

The ejector member 241, the movable member 243, the gear transmission mechanism 244, the large pulley 245, the belt 246, the small pulley 247, and the motor 248 jointly serve as a disc moving means for moving a disc 210 between the magazine 205 and the playback means.

The playback means supported in the movable chassis 216 for playing back a disc ejected from one of the magazines 205 includes a turntable, an optical pickup, and a disc clamping mechanism, and is movable in the horizontal direction in which the magazines 205 are arrayed. As shown in FIG. 33, the movable chassis 216 has four upstanding panels 216c, 216d, 216e, 216f juxtaposed in the horizontal direction. To the rightmost upstanding panel 216c, there is attached a spindle motor 253 for directly rotating a turntable 252 (see FIG. 34). There are also mounted on the upstanding panel 216c an optical pickup (not shown) for reading recorded information from the disc 210, and a pickup driving means (not shown) for moving the optical pickup along the recording surface of the disc 210.

A disc clamping mechanism is mounted on the upstanding panels 216d, 216e. As illustrated in FIGS. 33 through 35 and 38 through 39(b), the disc clamping mechanism has a disc-shaped presser 255 for pressing the disc 210 ejected from the magazine 205 against the disc carrying surface of the turntable 252 (see FIG. 34), clamping plates 256, 257 with the presser 255 being rotatably supported at its front and rear surfaces by the clamping plates 256, 257, and an arcuate clamping cam member 258 held in sliding contact with the clamping plates 256, 257 for driving the clamping plates 256, 257. The clamping plate 256 is swingably attached to the upstanding panel 216e by a support shaft 256a. The clamping plate 257 is swingably attached to the upstanding panel 216d by a support shaft 257a. The clamping plates 256, 257 have projections 256b, 257b on free ends thereof which are slidably held against the outer periphery of the presser 255. The clamping plates 256, 157 are swingable in respective planes normal to the disc carrying surface of the turntable 252.

The clamping cam member 258 has three slots 258a defined therein and each extending along the arcuate shape of the clamping cam 258. The clamping cam member 258 is angularly movable about the center of curvature thereof while being guided by three support pins 260 mounted on the upstanding panel 216d and slidably engaging in the respective slots 258a. The clamping cam member 258 has cams 258b, 258c disposed one on each side of two of the slots 258a, and projections 256d, 257d on the clamping plates 256, 257 are held in smooth sliding contact with cam surfaces of the cams 258b, 258c. The clamping plates 256, 257 are normally urged against the clamping cam member 258 by an urging means (not shown) comprising a spring. As shown in FIG. 38, the cam surface of the cam 258b of the clamping cam member 258 is composed of three continuous surfaces including an intermediate surface, a lower surface, and a higher surface which are arranged in the order named, and the cam surface of the cam 258c is composed of three continuous surfaces including a higher surface, a lower surface, and an intermediate surface which are arranged in the order named.

The clamping plates 256, 257 are referred to as a presser support mechanism. The disc-shaped presser 255 is supported by the presser support mechanism for rotation and movement in a direction normal to the disc carrying surface of the turntable 252 (FIG. 34). The presser support mechanism, the presser 255, and the clamping cam member 258 jointly constitute a disc clamping mechanism.

A disc gripping and mounting means for gripping and mounting the disc 210 on the turntable 252 is installed on the upstanding panels 216c, 216f extending parallel to the upstanding panels 216d, 216e on which the disc clamping mechanism is held. The disc gripping and mounting means will hereinafter be described.

As shown in FIGS. 33, 38, 40(a) through 40(b), the disc gripping and mounting means has an arcuate rotary member 266 similar in shape to the clamping cam member 258, and three gripper members 267, 268, 269 drivable by the rotary member 266 to grip the disc 210 ejected from the magazine 205. The gripper member 267 is of a plate shape having a disc gripping surface shaped to match the curvature of the outer periphery of the disc 210. The other two gripper members 268, 269 are in the form of a column and have smaller-diameter portions on their distal ends for engaging the outer periphery of the disc 210. As shown in FIGS. 40(b) and 40(c), the gripper members 267, 268, 269 (the gripper member 269 is identical to the gripper member 268) have disc-shaped flexible portions 267a, 268a integral therewith which are supported on the upstanding panel 216f such that the gripper members 267, 268, 269 can be moved in directions parallel to the disc carrying surface of the turntable 252 and also in directions normal thereto.

As shown in FIG. 40(a) and 40(b), the rotary member 266 has three arcuate slots 266a defined therein and extending along the arcuate shape of the rotary member 266. The rotary member 266 is angularly movable about the center of curvature thereof while being guided by three support pins 270 mounted on the upstanding panel 216c and slidingly engaging in the slots 266a. The rotary member 266 also has cams 266b in the vicinity of the three slots 266a, respectively, and cam grooves 266c defined therein and surrounded by the cams 266b, respectively. The gripper members 267, 268, 269 have pins 267b, 268b, 269b slidably engaging in the respective cam grooves 266c. The pins 267b, 268b, 269b have heads held in slidable contact with cam surfaces of the cams 266b. As shown in FIGS. 38, 40(b), and 40(c), each of the cam surfaces of the cams 266b is composed of a higher surface, a lower surface, and an intermediate surface which are arranged in the order named. When the rotary member 266 is rotated, the cam surfaces of the cams 266b cause the gripper members 267, 268, 269 to be reciprocally moved in directions perpendicular to the disc carrying surface of the turntable 152 at prescribed timing. The cam grooves 266c are shaped such that when the rotary member 266 is rotated, the gripper members 267, 268, 269 are moved toward and away from the outer periphery of the disc 210 at prescribed timing.

As shown in FIGS. 33, 38, and 40(a), the movable member 243 for turning the ejector member 241 to eject the trays 211, 212 from the magazines 205 also has a rack 243c on its upper edge which is held in mesh with a pinion 275 positioned near the rotary member 266. The pinion 275 is held in mesh with a gear 276a of a gear cam 276 having a radial extension 276b with a slot 276c defined therein and slidably receiving therein one of the pins 271 on the rotary member 266. When the movable member 243 is reciprocally moved by the motor 248, the rotary member 266 is rotated.

The motor 248, the gear cam 276, and a series of operatively coupled members therebetween jointly serve as a drive force imparting means for imparting a drive force to the rotary member 266. The rotary member 266, the drive force imparting means, and small parts associated therewith jointly constitute a gripper member driving means for moving the gripper members 267, 268, 269 in directions parallel to the disc carrying surface of the turntable 252 and also in directions perpendicular thereto. The gripper member driving means and the gripper members 267, 268, 269 jointly provide the disc gripping and mounting means for gripping a disc 210 ejected from a magazine, delivering the disc 210 in the direction of the rotational axis of the turntable 252, and mounting the disc 210 on the turntable 252.

As shown in FIGS. 33, 35, 38, and 39(b), the arcuate clamping cam member 258 includes a radially outward extension 258e on its outer periphery with a horizontal shaft 258f mounted thereon. The arcuate rotary member 266 also has a radially outward extension 266e on its outer periphery which has a U-shaped recess 266f with the shaft 258f smoothly engaging therein. Therefore, the rotary member 266 is angularly moved by the gripper member driving means to move the presser 255. Both the presser 255 and the gripper members 267, 268, 269 can thus be driven by the single drive source, i.e., the motor 248. As a result, the number of drive sources required in the disc player is reduced.

As shown in FIGS. 35, 38, and 41, a rearwardly extending plate-like detectable member 283 is integrally formed with the rear end of each of the ejecting plates 231 which eject the respective magazines 205 out of the subhousing 202. As illustrated in FIG. 41, each of the detectable members 283 has light-shielding portions 283a, 283b on its distal end. As also shown in FIG. 42, three photocouplers 284a, 284b, 284c as sensors are positioned in association with the light-shielding portions 283a, 283b, and mounted on the movable chassis 216 for movement therewith. Since the detectable members 283 are fixedly supported on the ejecting plates 231, when the magazines 205 are not inserted in the subhousing 202, the detectable members 283 are not in a position detectable by the photocouplers 283a through 284c, but are in a non-detectable position forward of the detectable position.

As shown in FIG. 41, the light-shielding portions 283a, 283b of the detectable members 283 are arrayed in the direction in which the movable chassis 216 is movable, i.e., in the horizontal direction in which the magazines 205 are arrayed, and are aligned with positions for storing discs 210 in the loaded magazines 205. The light-shielding members 283a, 283b serve to provide a disc position indication for indicating, in three bits, the position of each disc in the loaded magazines 205, and the photocouplers 284a through 284c serve as a disc position indication detecting means for detecting the light-shielding members 283a, 283b. The disc position indication and the disc position indication detecting means are however not limited to the illustrated arrangements, but may be of any of various structures. The disc position indication should preferably be of an optical pattern.

As shown in FIG. 41, the six discs stored in a magazine 205, i.e., the trays 211, 212 disposed therein, are successively numbered (1) through (6) in the rightward direction. A detected signal produced by the three photocouplers 284a through 284c with respect to the disc (1) is represented by "001". Similarly, detected signals produced with respect to the discs (2) through (6) are represented respectively by "010", "101", "011", "110", and "100". These detected signals are sent to the controller (described later). Since the detectable members 283 move with the ejecting plates 231 that are reciprocally moved upon insertion and removal of the magazines 205, the detected signal "001" which indicates the stored position of the first disc, for example, in the magazine can be used as a magazine presence/absence detecting signal for indicating whether the magazine 205 is loaded or not.

FIG. 43 illustrates a modified playback means position detecting means. Each of detectable members 283 which has light-shielding portions 283a, 283b has slits 283c aligned with intermediate positions between the stored positions of the discs in the magazine 205. As also shown in FIG. 44, two photocouplers 287a, 287b are positioned for cooperation with these slits 283c and mounted on the movable chassis 216 on which other photocouplers 284a through 284c are also mounted. When the centers of the optical axes of the two photocouplers 287a, 187b are aligned with respective two slits 283c, the position of one disc is detected. Thus, the stored position of the disc can be detected highly accurately.

Figure 45:
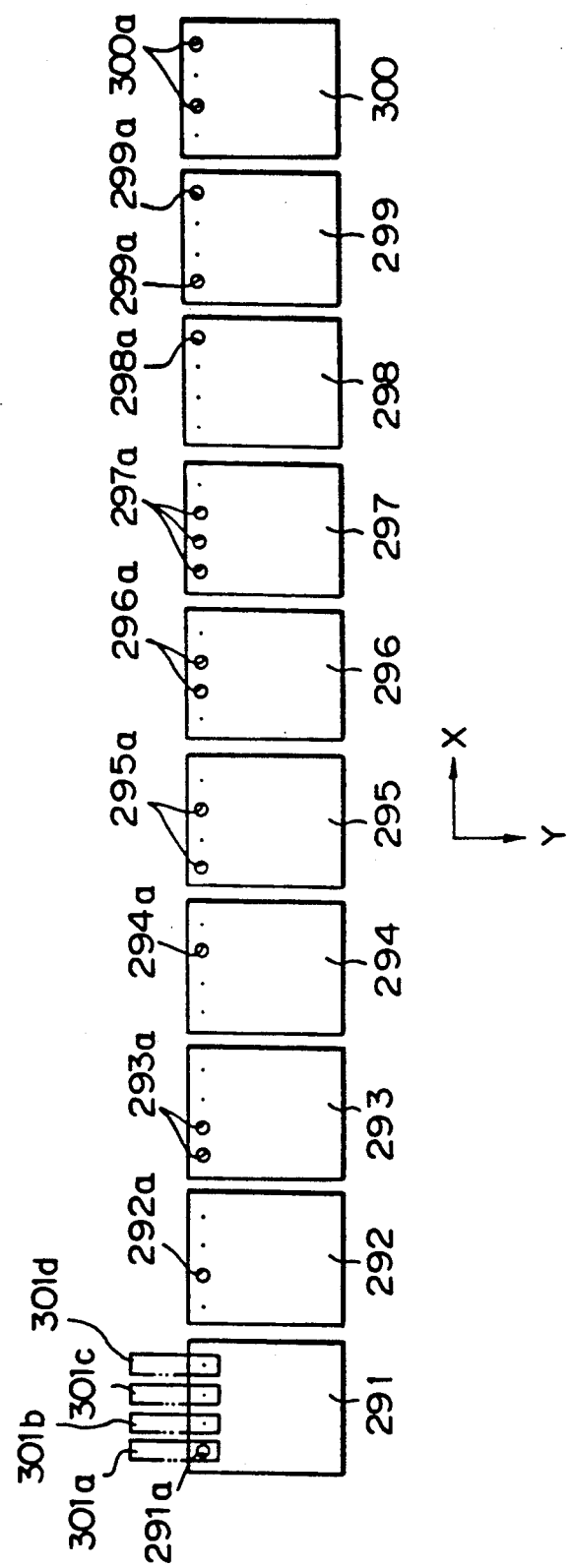

As illustrated in FIGS. 35 and 45, ten magazine number indicator plates 291 through 300 are disposed below the detectable members 283 for detecting the numbers of the respective magazines 205. The magazine number indicator plates 291 through 300 have light-passing holes 291a through 300a, respectively, indicative of the magazine numbers in four bits, the magazine number indicator plates 291 through 300 being secured to the subhousing 202. Four photocouplers 301a through 301d are mounted on the movable chassis 216 as a magazine number detecting means for detecting the magazine numbers in coaction with the magazine number indicator plates.

While the light-passing holes 291a through 300a are shown as being circular in shape in the above embodiment, they may be in the form of slits.

The photocouplers 284a through 284c, the detectable members 283, the photocouplers 301a through 301d, and the magazine number indicator plates 291 through 300 jointly serve as a playback means position detecting means for detecting when the movable chassis 216 supporting the playback means has reached a position aligned with a selected disc 200 and for stopping the movable chassis 216. The guiding and driving means for moving the movable chassis 216 as described above and the playback means position detecting means jointly serve as a positioning means for positioning the playback means in the direction in which the magazines 205 are arrayed.

Operation of the magazine disc player of the above structure will be described below further with reference to FIGS. 46 through 50(b).

Figure 46:
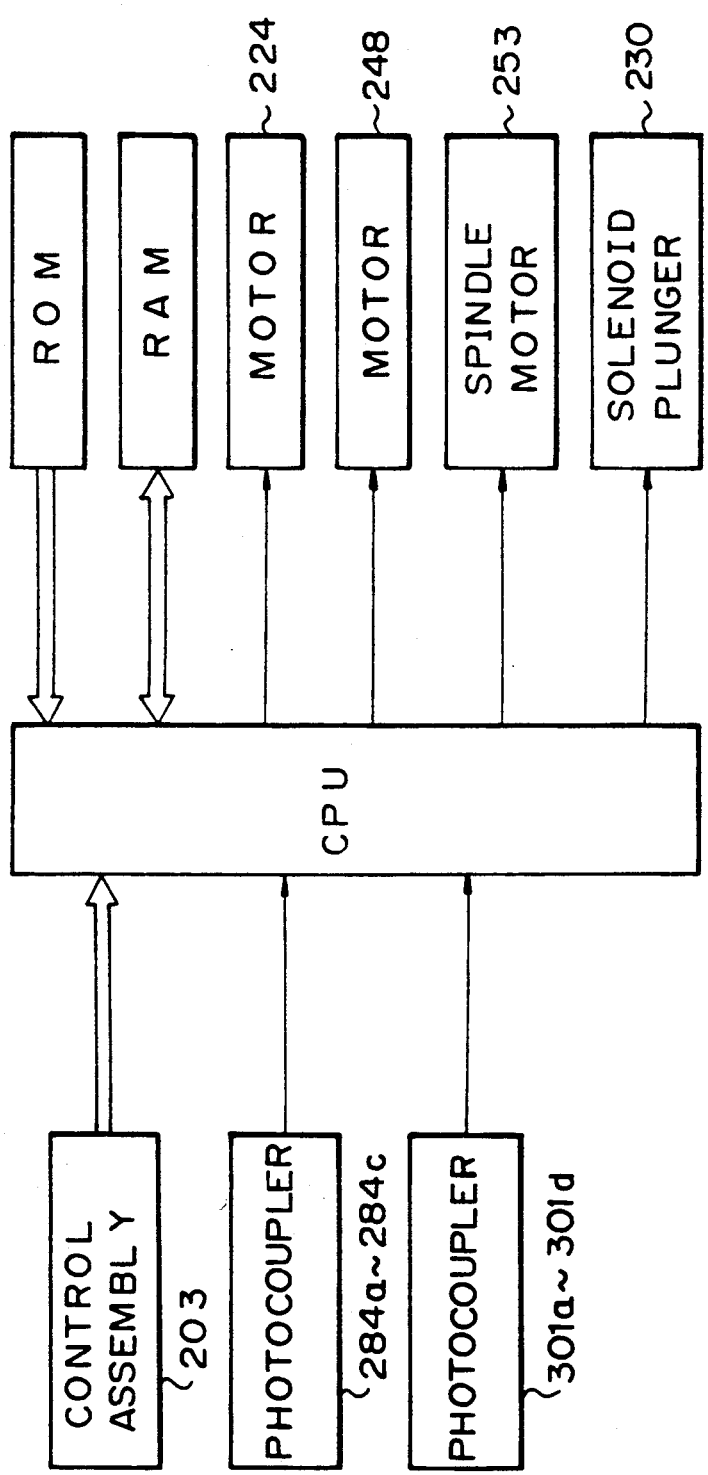
FIG. 46 is a block diagram of a control system of the magazine disc player shown in FIGS. 32 through 45.

First, the control assembly 203 shown in FIGS. 32 and 46 is operated to specify a disc 210 to be played back. The controller or CPU shown in FIG. 46 applies a drive voltage to the motor 224 to move the movable chassis 216 with the playback means thereon in a leftward direction (forward) or a rightward direction (rearward). As shown in FIG. 47, the number of the magazine containing the specified disc is searched for by the magazine number indicator plates 291 through 300 and the photocouplers 301a through 301d shown in FIG. 45, and the movable chassis 216 is moved to a position corresponding to the magazine containing the desired disc. Then, the position of the desired disc is detected by the detectable members 283 and the photocouplers 284a through 284c shown in FIGS. 41 and 42, after which the position of the movable chassis 216 is adjusted slightly so that the ejector member 241 on the movable chassis 216 reaches a position to engage the tray 211 or 212 carrying the disc 210 to be played back.

Figure 48A:
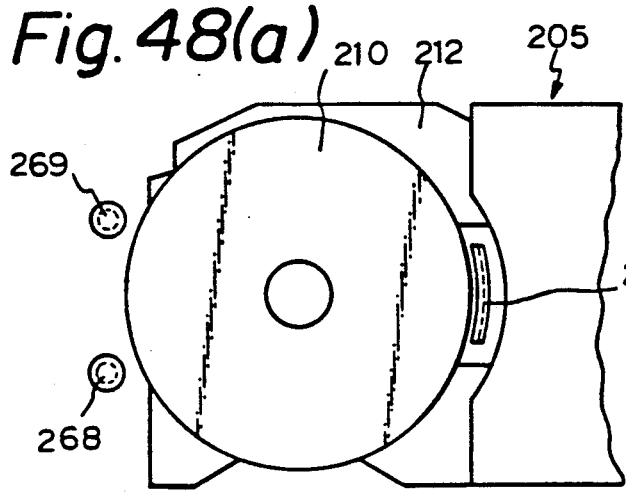
FIGS. 48(a), 48(b), 49(a), 49(b), 50(a), and 50(b) are cross-sectional views showing operation of the magazine disc player shown in FIGS. 32 through 45.
Figure 48B:
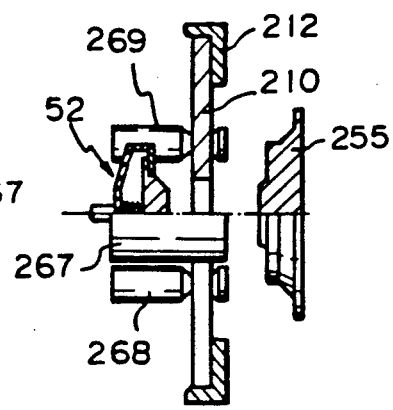
Figure 49A:
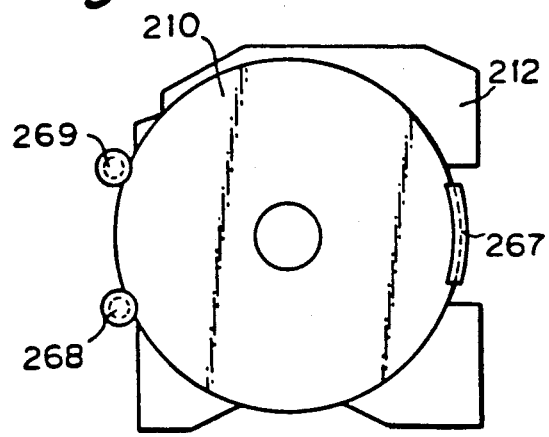
Figure 49B:
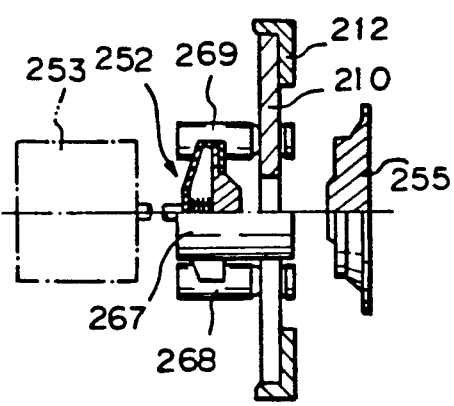
Figure 50A:
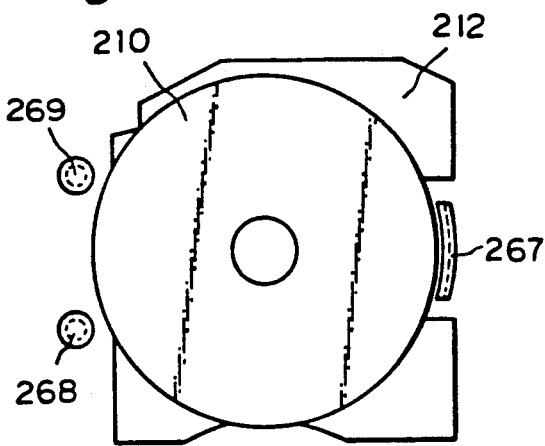
Figure 50B:
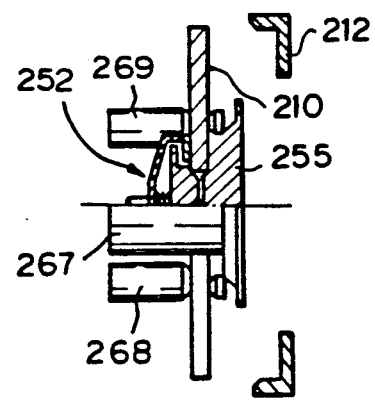

When the ejector member 241 reaches a position to engage the tray carrying the disc 210 to be played back, the motor 248 is energized to cause the movable member 243 to turn the ejector member 241. The tray (e.g., tray B 212) carrying the disc 210 to be played back is ejected from the case 209 of the magazine 205, and the disc 210 is moved into a position concentric with the disc carrying surface of the turntable 252, i.e., into a position directly laterally of the disc carrying surface, as shown in FIGS. 48(a) and 48(b).

Following the ejection of the disc 210 by the movable member 243, the movable member 243 is further moved to rotate the clamping cam member 258 and the rotary member 266. After the tray 212 has been ejected out of the magazine 205, the ejector member 241 and the movable member 243 are disengaged by a release mechanism (not shown).

In response to the rotation of the rotary member 266, the cams thereof cause the gripper members 267, 268, 269 to grip the disc and mount the same on the disc carrying surface of the turntable 252, as shown in FIGS. 49(a), 49(b), 50(a), and 50(b). At the same time, the disc is clamped by the presser 255 in response to operation of the cams of the clamping cam member 258. Thereafter, the gripper members 267, 268, 269 are moved away from the disc 210.

The disc 210 can now be played back. The turntable 252 and the optical pickup (not shown) are then operated to start playing back the disc 210.

After the disc 210 has been played back, the disc 210 is stored back into the magazine 205 in a process which is the reversal of the above disc loading process. The above operation is repeated as many times as the number of musics specified to be played back.

A magazine 205 can be ejected out of the subhousing 202 and hence the disc player by pushing an eject button in the control assembly 203 shown in FIG. 32. At this time, the manual knob 229 shown in FIG. 32 is operated to move the solenoid plunger 230 into a position aligned with the magazine to be ejected.

With the present invention, as described above in detail, a magazine disc player according to the present invention includes a storage unit for storing an array of magazines each for holding a plurality of discs, a playback means for playing back the discs one at a time, a positioning means for guiding and positioning the playback means in a direction in which the magazines are arrayed, and a disc moving means for moving one of the discs at a time between the corresponding magazine and the playback means, the magazines being arrayed in a horizontal direction.

Since the magazines are arrayed and the playback means is movable in the direction in which the magazines are arrayed, many discs can selectively be played back automatically. For replacing one of stored discs with another disc, it is only necessary to remove the magazine containing the disc to be replaced and insert a magazine containing the other disc. The magazine disc player can therefore be operated with ease.

Inasmuch as the magazines are horizontally arrayed, the magazine disc player is horizontally long, has a low center of gravity, and hence is highly stable.

In the magazine disc player, the discs are stored with their recording surfaces lying vertically.

When removing a magazine from or loading a magazine into the disc player, the magazine which is of a flat shape is gripped thereacross in its transverse direction. Consequently, the operator can remove and load the magazine while taking an easy posture without unduly twisting his forearm. The magazine disc player can be operated with ease also from this viewpoint.

Furthermore, the magazine disc player of the invention also has a turntable having a disc carrying surface, a disc clamping mechanism for delivering and clamping the disc on the turntable, and a disc pressing means for cooperating with the disc clamping mechanism in gripping and mounting the disc which has been ejected from the magazine by the disc moving means. The disc ejected from the magazine is delivered by the disc clamping mechanism in a direction (horizontal direction) normal to the disc carrying surface of the turntable, and is then mounted on the disc carrying surface of the turntable. The disc pressing means prevents the disc from being positionally displaced radially due to gravity while the disc is being delivered, and allows the disc to be reliably mounted and clamped on the turntable.

The magazine disc player further includes a disc guide member for guiding the disc by slidingly contacting the lower end of the disc which has been ejected from the magazine so as to be mounted on the turntable by the disc clamping mechanism, and a disc guide member driving means for supporting and moving the disc guide member toward and away from the disc. With this arrangement, while the disc is being delivered by the disc clamping mechanism and the disc pressing means, the disc is not displaced even slightly and can be delivered highly accurately.

The magazine disc player also includes a disc gripping and mounting means for gripping the disc which has been ejected from the magazine by the disc moving means and mounting the disc on the turntable. For mounting the disc ejected from the magazine on the disc carrying surface of the turntable, the disc is delivered in the direction (horizontal direction) normal to the disc carrying surface of the turntable. Because the disc being delivered is firmly gripped by the disc gripping and mounting means, the disc is prevented from being positionally displaced radially due to gravity during the disc delivery, and can reliably installed on the turntable.

Although certain preferred embodiments have been shown and described, it should be understood that many changes and modifications may be made therein without departing from the scope of the appended claims.

What is claimed:

1. A magazine disc player comprising a storage unit for storing an array of magazines each for holding a plurality of discs, playback means for playing back the discs one at a time, positioning means for guiding and positioning said playback means in a direction in which the magazines are arrayed, and disc moving means for moving one of the disc at a time between the corresponding magazine and said playback means, said magazines being arrayed in a horizontal direction, said discs being arranged with recording surfaces thereof lying vertically, said playback means comprising a turntable, a disc clamping mechanism on one side of the turntable, and disc pressing means on an opposite side of the turntable for cooperating with said disc clamping mechanism in gripping the disc which has been ejected from the magazine and mounting the disc on said turntable, and the disc pressing means being movable in a direction perpendicular to a disc carrying surface of the turntable.

2. A magazine disc player according to claim 1, wherein said disc pressing means comprises an abutment member for abutting against the disc, and supporting and driving means for supporting said abutment member and moving the abutment member in the direction substantially perpendicular to the disc carrying surface of said turntable.

3. A magazine disc player according to claim 2, wherein said disc clamping mechanism comprises a rotatable presser means for pressing the disc, and a presser means supporting mechanism for supporting said presser means for rotation and movement in a direction substantially perpendicular to the disc carrying surface of said turntable, said presser means being movable by said supporting and driving means.

4. A magazine disc player according to claim 3, wherein said presser means has a pin receivable in a central hole defined in the disc, said turntable having a centering member receivable in said pin.

5. A magazine disc player according to claim 3, wherein said supporting and driving means includes means for moving said abutment member and said rotatable presser means such that the disc is clamped between the abutment member and the rotatable presser means for mounting of the disc on the turntable, said moving means then disengaging said abutment member from the disc so that the disc is clamped to said turntable by said rotatable presser means.

6. A magazine disc player according to claim 3 wherein said disc clamping mechanism includes a plurality of clamping plates and said presser means is rotatably supported by said clamping plates, and rotatable cam means are provided for operating said clamping plates and said presser means.

7. A magazine disc player according to claim 6 wherein said rotatable cam means includes arcuate slots which receive support pins projecting from said clamping plates, and further includes arcuate cam surfaces slidably engaged with surfaces on said clamping plates.

8. A magazine disc player according to claim 2, which further comprises a rotatable disc guide pin receivable in a central hole defined in the sic, and guide pin driving means for supporting and moving said sic guide pin in a direction substantially perpendicular to the disc carrying surface of said turntable.

9. A magazine disc player according to claim 2, wherein said supporting and driving means comprises a movable operating member movable in a predetermined direction and engaging said abutment member through cam means for causing movement of said abutment member, and drive force imparting means for imparting a drive force to said movable operating member.

10. A magazine disc player according to claim 9, wherein said abutment member is of arcuate construction.

11. A magazine disc player according to claim 9, wherein said supporting and driving means further comprises resilient means for biasing said abutment member relative to said movable member.

12. A magazine disc player according to claim 5, wherein said movable member is rotatably mounted for movement relative to said abutment member.

13. A magazine disc player according to claim 9, wherein the movable member is rotatably mounted for movement relative to said abutment member, said abutment member is of arcuate construction, and said supporting and driving means further comprises resilient means for biasing said abutment member relative to said movable member.

14. A magazine disc player according to claim 2 wherein said driving means for the abutment member of said disc pressing means also operates said disc clamping mechanism.

15. A magazine disc player according to claim 14 wherein separate rotatable cam means are provided for operating said abutment member and said disc clamping mechanism, and means are further provided for interconnecting both of said cam means for rotation in unison.

16. A magazine disc player according to claim 2, wherein said abutment member is of arcuate construction.

17. A magazine disc player according to claim 2, wherein said supporting and driving means includes resilient means for biasing said abutment member relative to said turntable.

18. A magazine disc player comprising a storage unit for storing an array of magazines each for holding a plurality of discs, playback means for playing back the discs one at a time, said playback means including a turntable, positioning means for guiding and positioning said playback means in a direction in which the magazines are arrayed, disc moving means for moving one of the discs at a time between the corresponding magazine and said playback means, said magazines being arrayed in a horizontal direction with said discs having recording surfaces lying vertically, said disc gripping and mounting means for gripping the disc ejected from the magazine, delivering the disc in an axial direction of said turntable, and mounting the disc on said turntable, said disc gripping and mounting means comprising a plurality of gripper members for gripping the periphery of the disc in a radially inward direction, and gripper member driving means for supporting and moving said gripper members in directions substantially parallel and perpendicular to a disc carrying surface of said turntable, to grip the peripheral edge of the disc for positioning of the disc axially on and removal of the disc axially from said turntable.

19. A magazine disc player according to claim 18 wherein said gripper driving means comprises a rotary cam member supported by projecting guide pins received in arcuate guide slots in the rotary cam member, said rotary cam member also including first and second cam means each having multilevel surfaces for moving the gripper means in the parallel and perpendicular directions, respectively.

20. A magazine disc player according to claim 19 wherein at least one of the gripper members includes a groove portion at a distal end for receiving the outer periphery of the disc.

21. A magazine disc player according to claim 20 wherein said gripper members include flexible portions by which said gripper members are mounted on an adjacent support member to permit their movement in the parallel and perpendicular directions.

22. A magazine disc player comprising a storage unit for storing an array of magazines each for holding a plurality of disc-supporting flat trays for holding a plurality of discs, playback means for playing back the discs one at a time, positioning means for guiding and positioning said playback means in a direction in which the magazines are arrayed, tray moving means for moving one of the trays and one of the discs therein between the corresponding magazine and said playback means, said playback means comprising a turntable, a disc clamping mechanism on one side of the turntable, and disc pressing means on an opposite side of the turntable for cooperating with said disc clamping mechanism in gripping said one disc which has been moved to said playback means and for mounting said one disc on said turntable, the disc pressing means being movable in a direction perpendicular to a disc carrying surface of the turntable, and a single reversible drive means for operating said tray moving means, disc clamping means and disc pressing means.

23. A magazine disc player according to claim 22 wherein said tray moving means is angularly movable, and said disc clamping means and disc pressing means each include angularly movable cam means, and wherein separate means are provided for connecting said single reversible drive means to each of said tray moving means, disc clamping means and disc pressing means.

24. A magazine disc player according to claim 23 wherein said connecting means includes means for interconnecting said disc clamping means and said disc pressing means, and a reciprocable member is connected at one end to said tray moving means, said reciprocable member also having a gear rack for driving at least one of said disc clamping means and said disc pressing means.

25. A magazine disc player comprising a storage unit for storing an array of magazines each for holding a plurality of discs, playback means for playing back the discs one at a time, positioning means for guiding and positioning said playback means in a direction in which the magazines are arrayed, disc moving means for moving one of the discs at a time between the corresponding magazine and said playback means, said magazines being arrayed in a horizontal direction, and said discs being arranged with recording surfaces thereof lying vertically, a disc guide member vertically movable into a position in which it slidingly contacts the lower end of the disc which has been ejected from the magazine, to guide the disc into a position in which it can be mounted on the turntable, the disc guide member also being movable away from the lower end of the disc after the disc has been mounted on the turntable, and disc guide member driving means for supporting and moving said disc guide member vertically into and out of engagement with the lower end of the disc.

* * * * *